United States Patent
Nakagawa et al.

[11] Patent Number: 6,116,260
[45] Date of Patent: Sep. 12, 2000

[54] LIQUID MATERIAL SUPPLYING APPARATUS AND LIQUID MATERIAL SUPPLYING METHOD

[75] Inventors: Kazuhiro Nakagawa, Tokyo; Hiroyuki Hiraiwa, Kanagawa, both of Japan

[73] Assignee: Nikon Corporation, Tokyo, Japan

[21] Appl. No.: 09/051,469

[22] PCT Filed: Aug. 23, 1996

[86] PCT No.: PCT/JP96/02360

§ 371 Date: Apr. 15, 1998

§ 102(e) Date: Apr. 15, 1998

[87] PCT Pub. No.: WO98/07509

PCT Pub. Date: Feb. 26, 1998

[51] Int. Cl.[7] .................................................. F17D 1/18
[52] U.S. Cl. ................. 137/14; 137/565.17; 137/565.23; 137/565.33; 137/208; 137/557; 137/68.25
[58] Field of Search .................................. 137/205, 208, 137/209, 565.33, 565.23, 587, 565.17, 557, 14, 68.25

[56] References Cited

U.S. PATENT DOCUMENTS

| 5,148,945 | 9/1992 | Geatz | 137/208 |
| 5,417,346 | 5/1995 | Ferri, Jr. et al. | 137/208 |

FOREIGN PATENT DOCUMENTS

| 56-172328 | 12/1981 | Japan . |
| 63-97222 | 4/1988 | Japan . |
| 1-22341 | 1/1989 | Japan . |
| 1-128829 | 9/1989 | Japan . |

*Primary Examiner*—A. Michael Chambers
*Attorney, Agent, or Firm*—Foley & Lardner

[57] ABSTRACT

A liquid material supplying apparatus comprises:

vessels 150, 250, each having gas inlet pipe 151, 251, discharge pipe 153, 253, and interconnection pipe 155, 255 capable of making the gas inlet pipe 151, 251 communicate with the discharge pipe 153, 253, the vessels containing a liquid material;

a permanent line P comprising gas line connection pipes 113, 213 detachably connected to the gas inlet pipes 151, 251, gas supply pipe 111 connected to the gas line connection pipes 113, 213 and to pressure gas supply 70, material line connection pipes 123, 223 detachably connected to the discharge pipes 153, 253, material supply pipe 127 connected to the material line connection pipes 123, 223 and to vaporizer 91, and by-pass pipes 129, 229 capable of making the gas supply pipe 111 communicate with the material line connection pipe 123, 223; and a vent line 30 comprising exhaust pipes 131, 231 connected to the gas line connection pipes 113, 213 or to the material line connection pipes 123, 223, and a vacuum pump 135 connected to the exhaust pipes 131, 231.

25 Claims, 30 Drawing Sheets

LIQUID MATERIAL SUPPLYING APPARATUS AND LIQUID MATERIAL SUPPLYING METHOD

TECHNICAL FIELD

The present invention relates to an apparatus for stably supplying a liquid material such as a raw-material solution for glass used in fabrication of optical fiber or synthetic silica glass to an evaporator or the like such as a vaporizer, and to a supplying method thereof.

BACKGROUND ART

With recent increase in integration of LSI, micromachining is being developed to form finer patterns utilizing the photolithography technology for exposure and transfer of integrated circuit onto silicon wafer. For that, wavelengths of light source become shorter and shorter and the silica glass, as an optical element of photolithography exposure apparatus, is demanded to have high transmittancy of light in the ultraviolet region and high uniformity of refractive index. In order to realize the high transmittancy of light in the ultraviolet region, it becomes necessary to lower an impurity concentration in silica glass and the flame hydrolysis process is used as a usual synthesizing method thereof.

This flame hydrolysis process includes heating a liquid material as a raw-material solution for glass at temperatures over the boiling point in a vaporization tank or the like to vaporize it, diluting this raw-material gas with a carrier gas such as oxygen, hydrogen and inert gases, and further blowing this raw-material gas, together with burning flame comprised of oxygen and hydrogen or combustible gas, from a burner for flame hydrolysis toward a target of heat-resisting material. Glass particles synthesized by a chemical reaction in this manner are fused into glass, thus synthesizing silica glass.

In the flame hydrolysis process the liquid material such as silicon tetrachloride is used as a raw material for glass, as described above, and it is used in the vaporized form. Accordingly, all metal impurities contained in the raw material for glass are trapped in the vaporization tank without provision of any special distillation device, which means that the raw material for glass is distilled. This permits high-purity raw-material gas to be supplied. In general, an evaporator such as the vaporizer is used as a device for supplying such high-purity raw-material gas.

This vaporizer is a gas control system for supplying the vaporized raw-material gas to a reaction system. Namely, the liquid material is vaporized under an ambient temperature over the boiling point thereof and the flow rate thereof is controlled stably and precisely by a mass flow controller. This vaporizer is basically comprised of a gas control section and a thermostatic bath.

Further, the glass raw material for optical fiber or silica glass is usually selected from liquid materials of silicon compounds such as silicon tetrachloride. This liquid material is supplied under pressure by nitrogen gas or the like from a vessel such as a bomb to the evaporator such as the vaporizer. More specifically, the supply under pressure of the liquid material to the evaporator is carried out by always keeping a constant pressure (approximately 1 to 2 $kg/cm^2$) in the liquid material vessel through a regulator by nitrogen or inert gas (which may be either one of not only the inert gases in the periodic table, but also gases of low reactivity with the liquid material and which will be called pressure gas hereinafter). This pressurization causes the liquid material to be supplied to the evaporator and the gas is injected into the vessel by an amount of reduction of the liquid material.

A conventional liquid material supplying apparatus of this type is composed of a pressure gas line 10, a material supply line 20, and a vessel 50, as shown in FIG. 1. The pressure gas line 10 is composed of a gas supply pipe 11 through which the pressure gas to be injected into the vessel 50 is fed, a gas inlet pipe 51 fixed to the vessel 50, and a gas line connection pipe 13 having a gas line joint 15, being a joint to this gas inlet pipe 51, at the fore end. Further, the material supply line 20 is composed of a discharge pipe 53 fixed to the vessel 50, a material line connection pipe 23 having a material line joint 25, being a joint to this discharge pipe 53, at the end thereof, and a material supply pipe 27 connected to the vaporizer 91.

Further, the gas supply pipe 11 has an on-off valve as a gas feed valve 41 at the end thereof, and the gas line connection pipe 13 is connected thereto through this gas feed valve 41. This gas line connection pipe 13 branches to a by-pass pipe 29, the by-pass pipe 29 has an on-off valve as a line short valve 43 midway, and the other end of this by-pass pipe 29 is connected to the line connection pipe 23. This material line connection pipe 23 also has an on-off valve as a material acceptance valve 45 midway thereof.

Further, the material line connection pipe 23 is connected through a supply valve 47 to the material supply pipe 27, the by-pass pipe 29 is connected to between the material acceptance valve 45 and the material line joint 25, an exhaust pipe 31 is branched off therefrom between the material acceptance valve 45 and the supply valve 47, and the pipe 23 is connected through the exhaust pipe 31 having an on-off valve as an exhaust valve 49 to a harm eliminating column. Then the material supply pipe 27 is connected to the on-off valve being the supply valve 47 at one end and to the vaporizer 91 at the other end. Further, an on- off valve as a gas inlet valve 61 is provided midway on the gas inlet pipe 51 fixed to the vessel 50. In addition, an on-off valve as a discharge valve 63 is provided midway in the discharge pipe 53.

The above gas supply pipe 11, gas line connection pipe 13, material line connection pipe 23, material supply pipe 27, by-pass pipe 29, and valves etc. provided therein constitute a permanent line, while the above gas inlet pipe 51, discharge pipe 53, and valves provided therein constitute an attached line changed for another together with the vessel 50.

In the above conventional liquid material supplying apparatus, the pressure gas is fed through the gas supply pipe 11, gas line connection pipe 13, and gas inlet pipe 51 into the vessel 50, whereby the liquid material is supplied through the discharge pipe 53, the material line connection pipe 23, and the material supply pipe 27 to the vaporizer 91. When the liquid material remains little in the vessel 50, the gas is first fed through the by-pass pipe 29 and the material line connection pipe 23 into the exhaust pipe 31, thereby discharging the liquid material remaining in the material line connection pipe 23 to the exhaust pipe 31, and thereafter the vessel 50 is removed from the joints 15, 25 to be changed for a new vessel 50. Next, the pressure gas is fed into the vessel 50, thereby first causing the liquid material to push the pressure gas and air in the discharge pipe 53 and material line connection pipe 23 to the exhaust pipe 31, and thereafter supply of the liquid material to the vaporizer 91 is started again. Generally, such operation for discharging the remaining liquid material, the air in pipe, and so on is called a purge and the gas (pressure gas) used at that time is called purge gas.

There were, however, the following problems in supplying the liquid material to the vaporizer by the conventional method using the foregoing conventional apparatus.

First, the conventional method was unable to supply the raw-material gas continuously throughout a long period. Namely, there was a problem that supply of liquid material must be stopped temporarily on the occasion of necessity for replacement of vessel. In addition, upon this replacement of vessel it was necessary to undergo the above conventional purge, which required a long time for replacement of vessel. Therefore, supply of liquid material to the vaporizer was interrupted for a long time in the conventional case.

Because of this, the conventional method had a drawback that the replacement of vessel hindered stable supply of liquid material. Namely, when the liquid material having temporarily been stopped is supplied to the vaporizer after replacement of vessel and when the temperature of the liquid material supplied is low, a supply amount several ten or more times larger than a normal supply amount is supplied into the vaporization tank with a rush. There was thus a problem that the temperature of vaporizer decreased, so as to decrease an amount of gas generated. Then this resulted in changing an amount of gas supplied to the reaction system and in turn disabling stable production in the reaction system. This raised a problem of generating a heterogeneous characteristic called striae upon production of synthetic silica glass.

With the foregoing conventional method the liquid material remained as deposited on the discharge pipe and material line connection pipe, which made it difficult to purge the material from the material supply line completely and which required a very long time therefor. Then the incomplete purge raised the following problems.

Specifically, when a corrosive material such as silicon tetrachloride was used as the liquid material, a metal, even a corrosion resisting material such as SUS316L, touching such a liquid material was corroded by an acid such as hydrochloric acid made by reaction between water in the air and the liquid material. In addition, siloxane based compounds were also made by reaction with water in the air, and such reaction products and metal impurity particles became causes of blocking inside the mass flow controller connected to the vaporizer, and of flow-rate error. Further, there was also a problem that they became a cause of internal leak of valve.

DISCLOSURE OF THE INVENTION

An object of the present invention is to provide a liquid material supplying apparatus that can stably supply the liquid material to the vaporizer for a long period, solving the above conventional problems, and a liquid material supplying method using the apparatus.

Namely, since it is unavoidable to supply the liquid material with the vessel such as a bomb having a finite volume, the present inventors noted the method for supplying the liquid material under pressure to the vaporizer, interruption of supply of the liquid material to the vaporizer upon the operation of replacement of vessel, and prevention of the change in the supply amount of raw material due to restart of supply of liquid material after replacement of vessel and achieved overall improvements therein. As a result, the inventors found that the most effective method for stably supplying the liquid material for a long period was to provide a vessel under supply of liquid material to the vaporizer and a standby vessel standing by for supply, considering restart of supply of liquid material after replacement of vessel.

In addition, as described previously, the conventional purge was carried out under continuous flow of gas, but a long time was necessitated in addition to the difficulty of perfect purge. Then, the present inventors found a purge method capable of effecting a perfect purge in a short time and employed it for the purge upon supply of liquid material to the vaporizer.

A liquid material supplying apparatus of the present invention comprises:

a first vessel having a first gas inlet pipe provided with a first gas inlet valve, and a first discharge pipe provided with a first discharge valve, said first vessel containing a liquid material;

a second vessel having a second gas inlet pipe provided with a second gas inlet valve, and a second discharge pipe provided with a second discharge valve, said second vessel containing the liquid material; and a permanent line comprising a first gas line connection pipe having a joint at one end, said joint being detachably connected to said first gas inlet pipe, and a first gas feed valve at the other end, a second gas line connection pipe having a joint at one end, said joint being detachably connected to said second gas inlet pipe, and a second gas feed valve at the other end, a gas supply pipe one end of which branches into first and second ends to be connected to said first and second gas feed valves, respectively, and the other end of which is to be connected to a first pressure gas supply, a first material line connection pipe having a joint at one end, said joint being detachably connected to said first discharge pipe, and a first supply valve at the other end, a second material line connection pipe having a joint at one end, said joint being detachably connected to said second discharge pipe, and a second supply valve at the other end, a material supply pipe one end of which branches into first and second ends to be connected to said first and second supply valves, respectively, and the other end of which is to be connected to a vaporizer, a first by-pass pipe having a first line short valve and enabling to make said gas supply pipe communicate with said first material line connection pipe, and a second by-pass pipe having a second line short valve and enabling to make said gas supply pipe communicate with said second material line connection pipe.

As described, the above apparatus of the present invention has a plurality of vessels containing the liquid material and the tip of gas supply pipe is branched so as to permit the pressure gas to be injected into each vessel. Further, the material line connection pipes each connected to the discharge pipes of the two vessels are connected each with the branched ends of the material supply pipe and the material supply pipe connects these ends together to one vaporizer. Namely, the plural systems of pressure gas line and material supply line are provided corresponding to provision of the plural vessels. Accordingly, when the liquid material in one vessel is used up, the liquid material is supplied from the other vessel to the vaporizer, whereby the liquid material can be continuously supplied to the vaporizer without interruption.

In a preferred arrangement of the above apparatus of the present invention, said first vessel further comprises a first interconnection pipe having a first pipe connection valve and enabling to make said first gas inlet pipe communicate with said first discharge pipe, and said second vessel further comprises a second interconnection pipe having a second pipe connection valve and enabling to make said second gas inlet pipe communicate with said second discharge pipe.

As described, when the liquid material supplying apparatus has the vessels provided with the interconnection pipes for connecting the gas inlet pipe with the discharge pipe, the purge line can be formed through the joint for connection of the discharge pipe, using the pipe connection valve provided in the interconnection pipe. Therefore, a purge can be completed as surely removing the liquid material and material gas from near the joint separated upon detachment of vessel within a short time.

In another preferred arrangement, the above apparatus of the present invention further comprises a vent line (harm eliminating line), said vent line having a liquid trap, a harm eliminating column, a first vacuum pump, and an exhaust pipe one end of which branches into first and second ends connected to said first and second material line connection pipes (if the apparatus of the present invention has said interconnection pipes, connected to said first and second material line connection pipes or to said first and second gas line connection pipes), respectively, and having first and second elimination valves, respectively, and the other end of which is connected via said liquid trap and harm eliminating column to said first vacuum pump.

As described, when the vent line having the vacuum pump is connected to the material line connection pipes or to the gas line connection pipes, it becomes possible to perform the-purge to change the material line connection pipe etc. into the reduced pressure state, and the purge can be completed as surely removing the liquid material and material gas from the material line connection pipe and discharge pipe within a short time.

Further, the above apparatus of the present invention may be constructed in such a manner that said vent line further comprises a second vacuum pump and the other end of said exhaust pipe may branch into a first end to be connected to the first vacuum pump and a second end to be connected to the second vacuum pump. Also, the other end of said gas supply pipe may branch into a first end to be connected to the first pressure gas supply and a second end to be connected to a second pressure gas supply.

As described, if the liquid material supplying apparatus has a plurality of vent lines (vent units) and/or pressure gas supplies and when the vent line or the pressure gas supply under use shows a drop of performance, it may be replaced with another to continue the purge or supply of pressure gas. Accordingly, it becomes possible to supply the liquid material more stably and to replace the vacant vessel with another surely within a short time.

In a further preferred arrangement, the above apparatus of the present invention further comprises a control unit electrically connected with said each valve and said vacuum pump;

wherein said control unit controls said each valve and said vacuum pump in such a manner as to:

when the liquid material in said vessel becomes smaller than a predetermined amount, stop supply from said vessel and start supply from the other vessel, return the liquid material remaining inside said material line connection pipe and said discharge pipe connected to said vessel of supply stop into said vessel, change the inside of said material line connection pipe and a portion of said discharge pipe (if the apparatus of the present invention has said interconnection pipe, the inside of said material line connection pipe, a portion of said discharge pipe, said gas line connection pipe, and a portion of said gas inlet pipe) connected to said vessel of supply stop into a reduced pressure state by said vacuum pump, introduce a pressure gas into the inside of said material line connection pipe and the portion of said discharge pipe (if the apparatus of the present invention has said interconnection pipe, the inside of said material line connection pipe, the portion of said discharge pipe, said gas line connection pipe, and the portion of said gas inlet pipe) connected to said vessel of supply stop to change the inside into a pressurized state, after said vessel of supply stop has been replaced by a new vessel filled with the liquid material, change the inside of said material line connection pipe and the portion of said discharge pipe (if the apparatus of the present invention has said interconnection pipe, the inside of said material line connection pipe, the portion of said discharge pipe, said gas line connection pipe, and the portion of said gas inlet pipe) connected to said new vessel into the reduced pressure state by said vacuum pump, introduce the pressure gas into the inside of said material line connection pipe and the portion of said discharge pipe (if the apparatus of the present invention has said interconnection pipe, the inside of said material line connection pipe, the portion of said discharge pipe, said gas line connection pipe, and the portion of said gas inlet pipe) connected to said new vessel to change the inside into the pressurized state, and change the inside of said material line connection pipe and the portion of said discharge pipe connected to said new vessel into the reduced pressure state by said vacuum pump and thereafter charge the liquid material into the inside of the material line connection pipe and discharge pipe.

The apparatus of the present invention having such a control unit can efficiently and surely perform the liquid material supplying method of the present invention described below.

A liquid material supplying method of the present invention is a method for supplying a liquid material from either one of said first and second vessels to said vaporizer by feeding a pressure gas from said pressure gas supply to the vessel, using the above liquid material supplying apparatus of the present invention, said method comprising:

a step of, when the liquid material in said vessel becomes smaller than a predetermined amount, stopping supply from said vessel and starting supply from the other vessel, a step of changing the inside of said material line connection pipe and a portion of said discharge pipe (if the apparatus of the present invention has said interconnection pipe, the inside of said material line connection pipe, a portion of said discharge pipe, said gas line connection pipe, and a portion of said gas inlet pipe) connected to said vessel of supply stop into a reduced pressure state by said vacuum pump, a step of introducing the pressure gas into the inside of said material line connection pipe and the portion of said discharge pipe (if the apparatus of the present invention has said interconnection pipe, the inside of said material line connection pipe, the portion of said discharge pipe, said gas line connection pipe, and the portion of said gas inlet pipe) connected to said vessel of supply stop to change the inside into a pressurized state, a step of replacing said vessel of supply stop with a new vessel filled with the liquid material, a step of changing the inside of said material line connection pipe and the portion of said discharge pipe (if the apparatus of the present invention has said interconnection pipe, the inside of said material line connection pipe, the portion of said discharge pipe, said gas line connection pipe, and the portion of said gas inlet pipe) connected to said new vessel into the reduced pressure state by said vacuum pump, a step of introducing the pressure gas into the inside of said material line connection pipe and the portion of said discharge pipe (if the apparatus of the present invention has said interconnection pipe, the inside of said material line connection pipe, the portion of said discharge pipe, said gas line connection pipe, and the portion of said gas inlet pipe) connected to said new vessel to change the inside into the pressurized state, and a step of changing the inside of said material line connection pipe and the portion of said discharge pipe connected to said new vessel into the reduced pressure state by said vacuum pump and thereafter charging the liquid material into the inside of said material line connection pipe and discharge pipe.

As described, when the purge is carried out as repeating the pressurized state and the reduced pressure state before replacement of vessel, the liquid material remaining inside the material line connection pipe etc. can be volatilized under reduced pressure to be sucked to the vent line, and it is pushed by pressurization into the vent line, whereby the purge can be performed surely in a short time. Further, if the purge is also carried out similarly after replacement of vessel and if the liquid material is injected into the inside of the material line connection pipe and discharge pipe in the reduced pressure state, when the liquid material in the other vessel remains little, the vessel can be replaced by another immediately, whereby the liquid material including neither air nor purge gas can be supplied quickly to the vaporizer.

In the case of use of the vessel having the interconnection pipe for connecting the gas inlet pipe with the discharge pipe, the gas under reduced pressure and under increased pressure can be made to flow surely to the portion of joint by performing the purge in the communication state of the gas inlet pipe with the discharge pipe through the interconnection pipe. Accordingly, the purge can be carried out more certainly within a short time.

In a preferred arrangement, the above method of the present invention further comprises a step of returning the liquid material remaining inside said material line connection pipe and said discharge pipe connected to said vessel of supply stop into said vessel.

As described, if the gas is made to flow once from the by-pass pipe to the material line connection pipe so as to return the liquid material remaining inside the material line connection pipe and discharge pipe into the vessel, a drop of performance of the vent line can be prevented and the more certain purge can be performed within a short time.

A liquid material supplying apparatus of the present invention comprises:

a vessel having a gas inlet pipe provided with a gas inlet valve, a discharge pipe provided with a discharge valve, and an interconnection pipe provided with a pipe connection valve and enabling to make said gas inlet pipe communicate with said discharge pipe, said vessel containing a liquid material; and a permanent line comprising a gas line connection pipe having a joint at one end, said joint being detachably connected to said gas inlet pipe, and a gas feed valve at the other end, a gas supply pipe connected at one end to said gas feed valve and at the other end to a pressure gas supply, a material line connection pipe having a joint at one end, said joint being detachably connected said discharge pipe, and a supply valve at the other end, a material supply pipe connected at one end to said supply valve and at the other end to a vaporizer, and a by-pass pipe having a line short valve and enabling to make said gas supply pipe communicate with said material line connection pipe.

As described, if the liquid material supplying apparatus of the present invention has the interconnection pipe for connecting the gas inlet pipe with the discharge pipe in addition to the by-pass pipe for connecting the gas supply pipe with the material line connection pipe, the purge line of from the gas line connection pipe and gas inlet pipe via the interconnection pipe through the discharge pipe and material line connection pipe can be formed by opening the on/off valve in the interconnection pipe upon performing the purge, whereby the liquid material remaining inside the discharge pipe and material line connection pipe can be purged surely within a short time.

In a preferred arrangement, the apparatus of the present invention further comprises a vent line, said vent line comprising a liquid trap, a harm eliminating column, a vacuum pump, and an exhaust pipe one end of which is connected to said material line connection pipe and the other end of which is connected via an elimination valve and via said liquid trap and harm eliminating column to said vacuum pump.

As described, if the apparatus is provided with the vent line including the vacuum pump, vacuumization can be effected upon purge, whereby the liquid material remaining inside the discharge pipe and material line connection pipe can be vaporized by the reduced pressure and can be removed by suction within a short time. Since the vent line has the liquid trap, the liquid material flowing from the material supply line into the vent line can be trapped in the liquid trap. Since the harm eliminating column and vacuum pump are positioned downstream of the liquid trap, a large amount of the liquid material can be prevented from flowing into the harm eliminating column within a short time. It becomes thus possible to effect evacuation by removing the material gas from the material supply line safely and surely and to perform the purge readily by the vacuum pump within a short time.

In a preferred arrangement, the above apparatus of the present invention further comprises a control unit electrically connected to said each valve and said vacuum pump;

wherein said control unit controls said each valve and said vacuum pump in such a manner as to:

when the liquid material in said vessel becomes smaller than a predetermined amount, stop supply from said vessel, return the liquid material remaining inside said material line connection pipe and said discharge pipe connected to said vessel of supply stop into the vessel, change the inside of said material line connection pipe, a portion of said discharge pipe, said gas line connection pipe, and a portion of said gas inlet pipe connected to said vessel into a reduced pressure state by said vacuum pump, introduce a pressure gas into the inside of said material line connection pipe, the portion of said discharge pipe, said gas line connection pipe, and the portion of said gas inlet pipe connected to said vessel to change the inside into a pressurized state, after said vessel has been replaced by a new vessel filled with the liquid material, change the inside of said material line connection pipe, the portion of said discharge pipe, said gas line connection pipe, and the portion of said gas inlet pipe connected to said new vessel into the reduced pressure state by said vacuum pump, introduce the pressure gas into the inside of said material line connection pipe, the portion of said discharge pipe, said gas line connection pipe, and the portion of said gas inlet pipe connected to said new vessel to change the inside into the pressurized state, and change the inside of said material line connection pipe and the portion of said discharge pipe connected to said new vessel into the reduced pressure state by said vacuum pump and thereafter start supply from said new vessel.

The apparatus of the present invention having such a control unit can efficiently and surely carry out the liquid material supplying method of the present invention described below.

A liquid material supplying method of the present invention is a method for supplying the liquid material from the vessel to said vaporizer by feeding a pressure gas from said pressure gas supply to said vessel, using the above liquid material supplying apparatus of the present invention, said method comprising:

a step of, when the liquid material in said vessel becomes smaller than a predetermined amount, stopping supply from said vessel, a step of changing the inside of said material line connection pipe, a portion of said discharge pipe, said gas line connection pipe, and a portion of said gas inlet pipe connected to said vessel into a reduced pressure state by said vacuum pump, a step of introducing the pressure gas into the inside of said material line connection pipe, the portion of said discharge pipe, said gas line connection pipe, and the portion of said gas inlet pipe connected to said vessel to change the inside into a pressurized state, a step of replacing said vessel with a new vessel filled with the liquid material, and a step of starting supply from said new vessel.

As described, when the reduced pressure state is established in the pipes including the discharge pipe and material line connection pipe upon replacement of vessel in the liquid material supplying apparatus, the liquid material in the pipes can be volatilized to be sucked, whereby safe detachment and replacement of vessel can be performed as surely purging the inside of the pipes of the discharge pipe and the material line connection pipe. By repeating injection of the gas into the inside of the discharge pipe and material line connection pipe or the like and reduction of the pressure inside of these pipes by the vacuum pump, the liquid material remaining inside the discharge pipe and material line connection pipe can be removed surely within a short time.

The above method of the present invention may further comprise:

a step of changing the inside of said material line connection pipe, the portion of said discharge pipe, said gas line connection pipe, and the portion of said gas inlet pipe connected to said new vessel into the reduced pressure state by said vacuum pump, a step of introducing the pressure gas into the inside of said material line connection pipe, the portion of said discharge pipe, said gas line connection pipe, and the portion of said gas inlet pipe connected to said new vessel to change the inside into the pressurized state, and a step of changing the inside of said material line connection pipe and the portion of said discharge pipe connected to said new vessel into the reduced pressure state by said vacuum pump and thereafter starting supply from said new vessel.

As described, when the purge is also carried out similarly after replacement of vessel and when supply of liquid material is started after establishing the reduced pressure state in the material line connection pipe and discharge pipe, the liquid material containing neither air nor purge gas can be supplied quickly to the vaporizer.

In another preferred arrangement, the above method of the present invention further comprises a step of returning the liquid material remaining inside said material line connection pipe and said discharge pipe connected to said vessel of supply stop into said vessel.

As described, when the liquid material remaining inside the material line connection pipe and discharge pipe is returned to the vessel, an amount of the liquid material remaining inside the material line connection pipe and discharge pipe becomes small, whereby removal of the liquid material by reduced pressure and increased pressure to follow can be carried out further surely within a short time.

The liquid material supplying method of the present invention may be a method for supplying the liquid material from the vessel to said vaporizer by feeding a pressure gas from said pressure gas supply to said vessel, using the above liquid material supplying apparatus of the present invention, said method comprising:

a step of, when the liquid material in said vessel becomes smaller than a predetermined amount, stopping supply from the vessel, a step of letting the pressure gas flow through said gas line connection pipe, a portion of said gas inlet pipe, a portion of said discharge pipe, and said material line connection pipe connected to said vessel, to said exhaust pipe, a step of replacing said vessel with a new vessel filled with the liquid material, and a step of starting supply from said new vessel.

As described, the inside of the discharge pipe and material line connection pipe can also be purged by feeding the gas to the interconnection pipe, discharge pipe, and material line connection pipe upon replacement of vessel in the liquid material supplying apparatus having the interconnection pipe for connecting the gas inlet pipe with the discharge pipe provided in the vessel, whereby removal of vessel and replacement of vessel can be performed safely.

In the liquid material supplying apparatus of the present invention as described above, preferably, the apparatus further comprises a pressure gage for measuring a pressure in said vessel, a regulator for regulating a pressure of said pressure gas, and a control unit electrically connected to said gas feed valve, said pressure gage, and said regulator;

wherein said control unit controls said valves and regulator so that said pressure in the vessel is in a predetermined range, by intermittently supplying said pressure gas under a pressure 0.5 or more $kg/cm^2$ higher than said pressure in the vessel into said vessel.

If the pressure of the pressure gas is set 0.5 or more $kg/cm^2$ higher than the internal pressure of vessel and if the gas is intermittently supplied only when pressurization is necessary as described, it can stop reverse diffusion of the liquid material and vaporized liquid material component into the pressure gas line.

The liquid material supplying apparatus of the present invention may be arranged to further comprise a burst preventing device for emitting gas in the vessel to the outside when a pressure in the vessel exceeds a predetermined value. Or, the apparatus of the present invention may further comprise a pressure gage for measuring a pressure in said vessel and a control unit electrically connected to said pressure gage and said elimination valve;

wherein said control unit controls said elimination valve so that gas in the vessel is emitted to said vent line when the pressure in said vessel exceeds a predetermined value.

Provision of the burst preventing mechanism as described can prevent the internal pressure of vessel from going in an over pressurized state for some accidental reason.

BRIEF DESCRIPTION OF THE DRAWINGS

Each of FIG. 3

Figure 15:
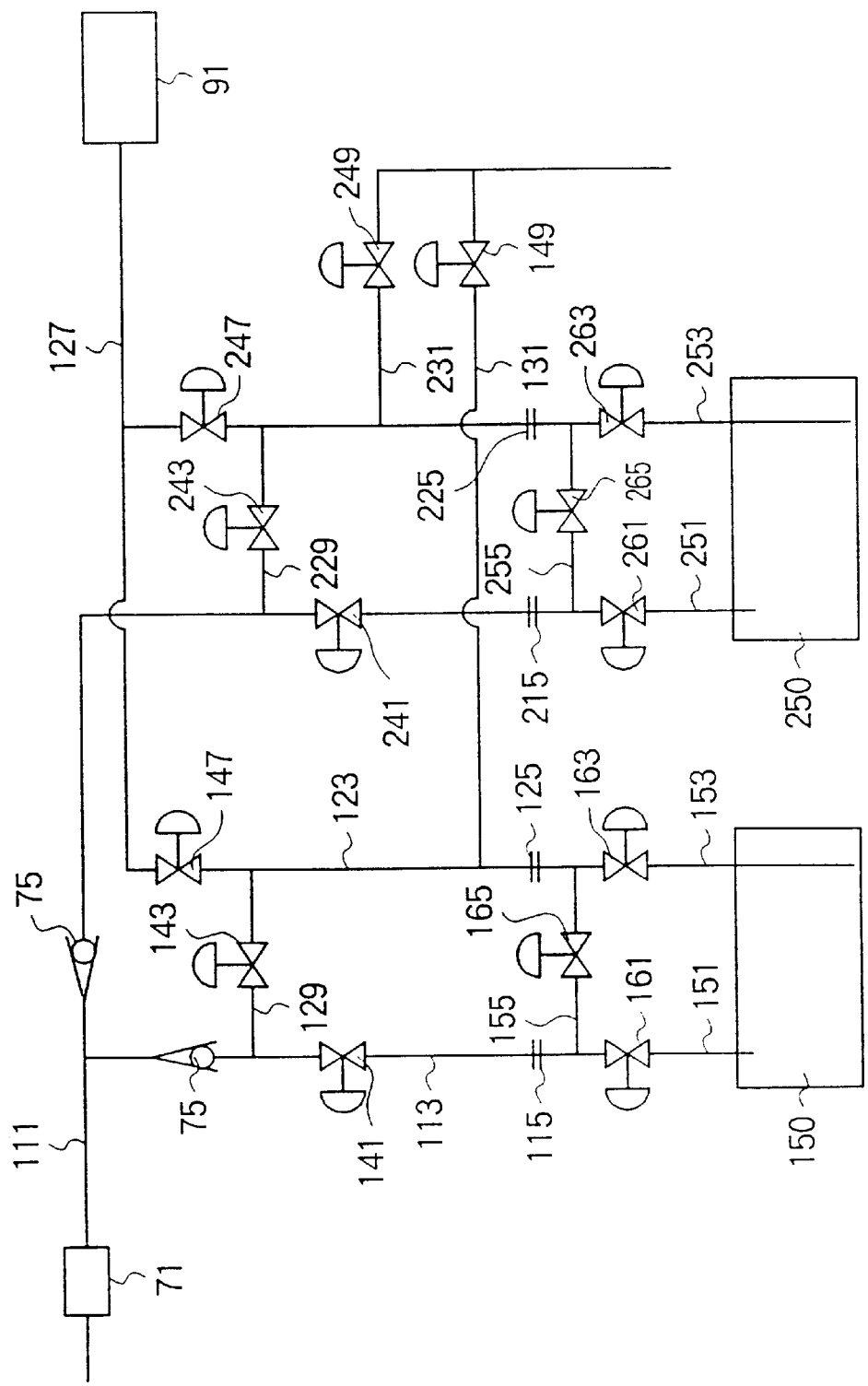
Figure 16:
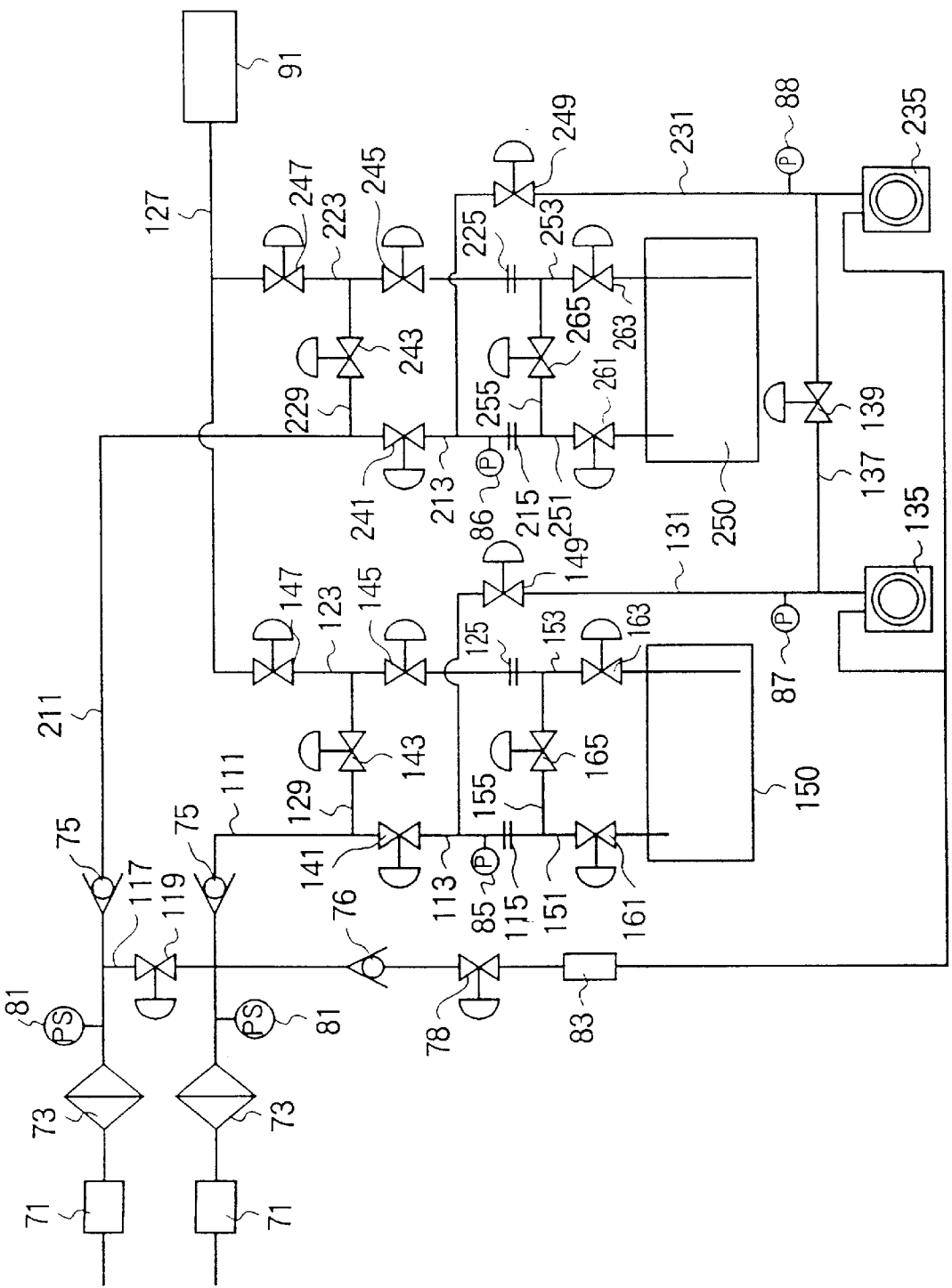
Figure 17:
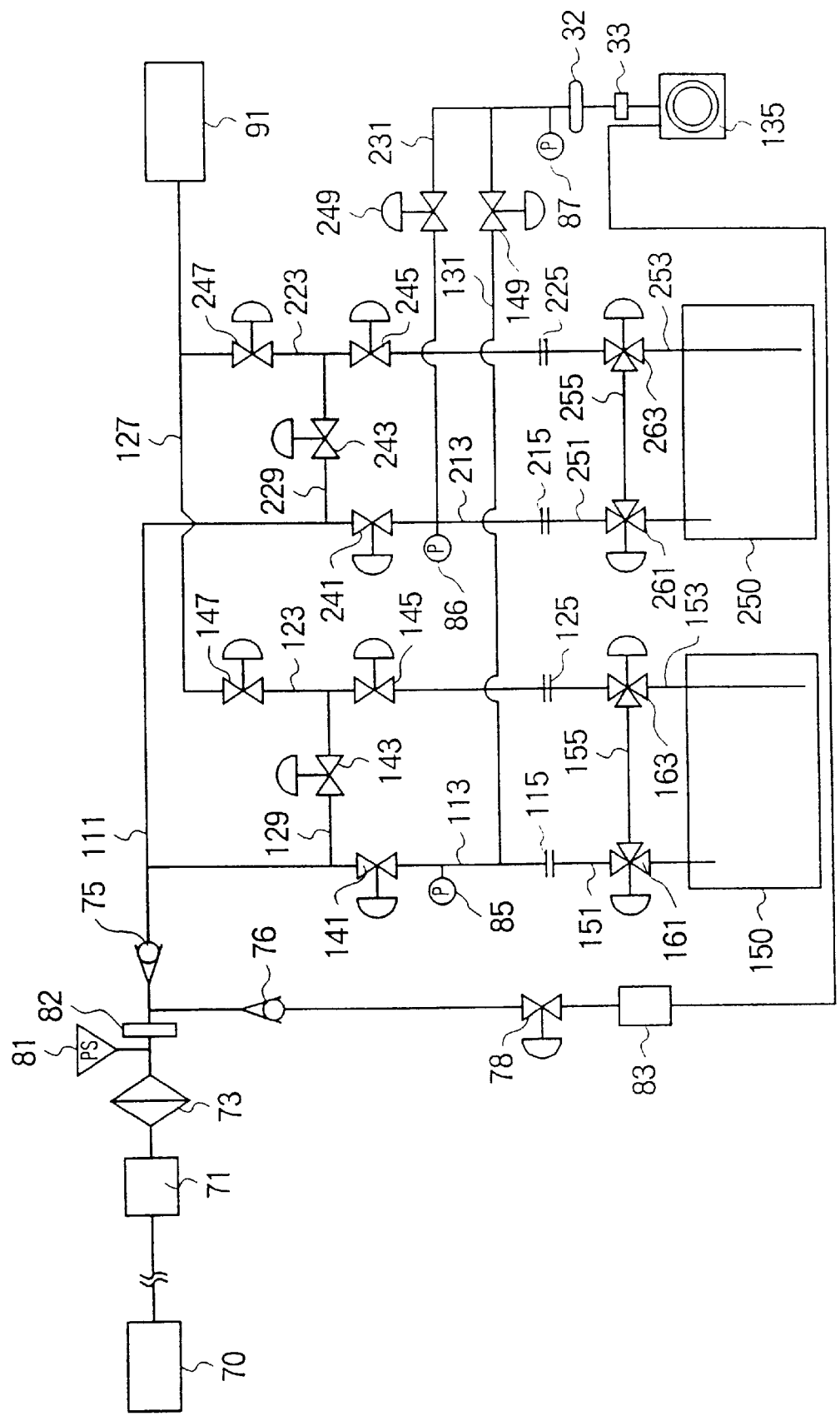

Each of FIG. 15 to FIG. 17 is a schematic drawing of still another example of the liquid material supplying apparatus (an embodiment provided with a plurality of vessels) according to the present invention.

Figure 18:
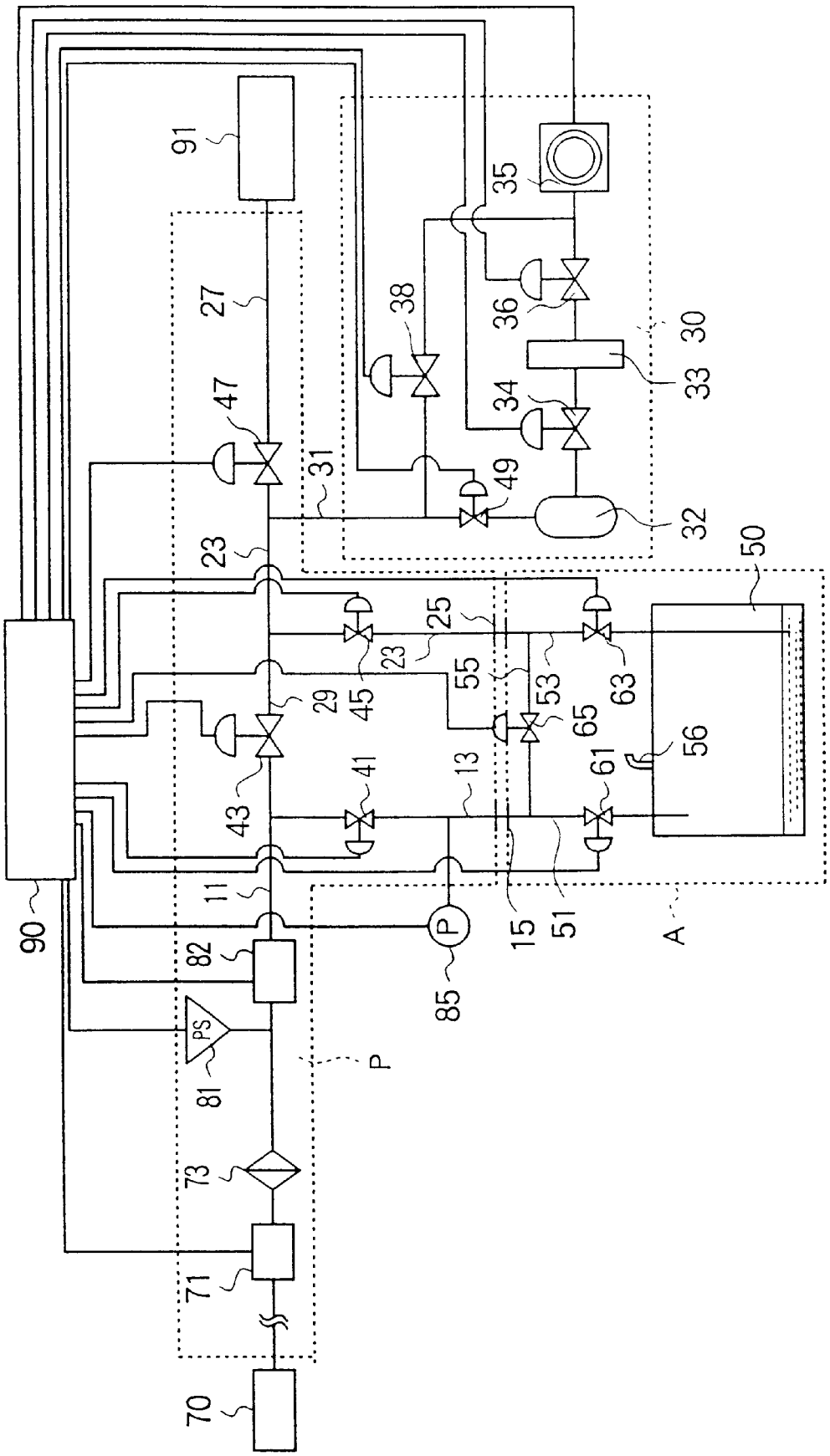

FIG. 18 is a schematic drawing of an example of the liquid material supplying apparatus (an embodiment provided with a vessel) according to the present invention.

Figure 19:
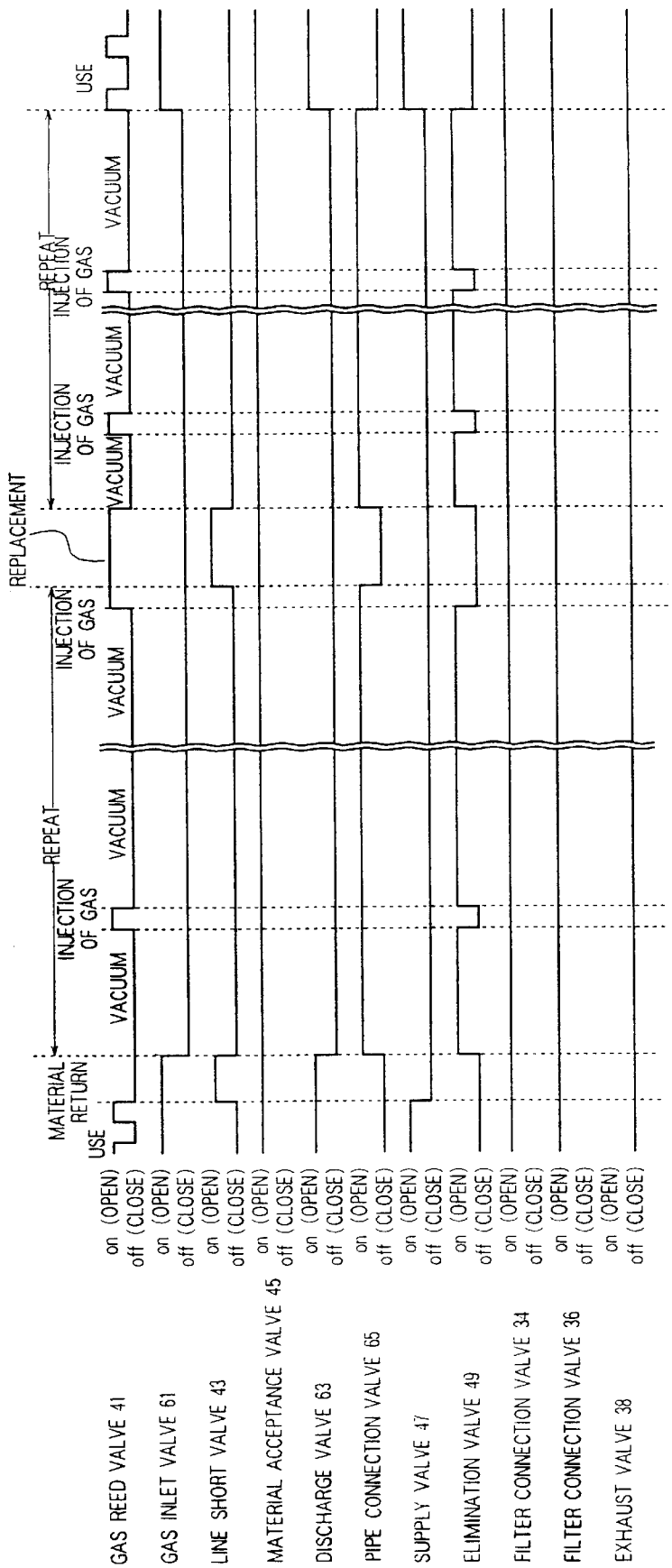

FIG. 19 is a timing chart to show operation of each valve in an example of the liquid material supplying method of the present invention using the apparatus shown in FIG. 18.

Figure 20:
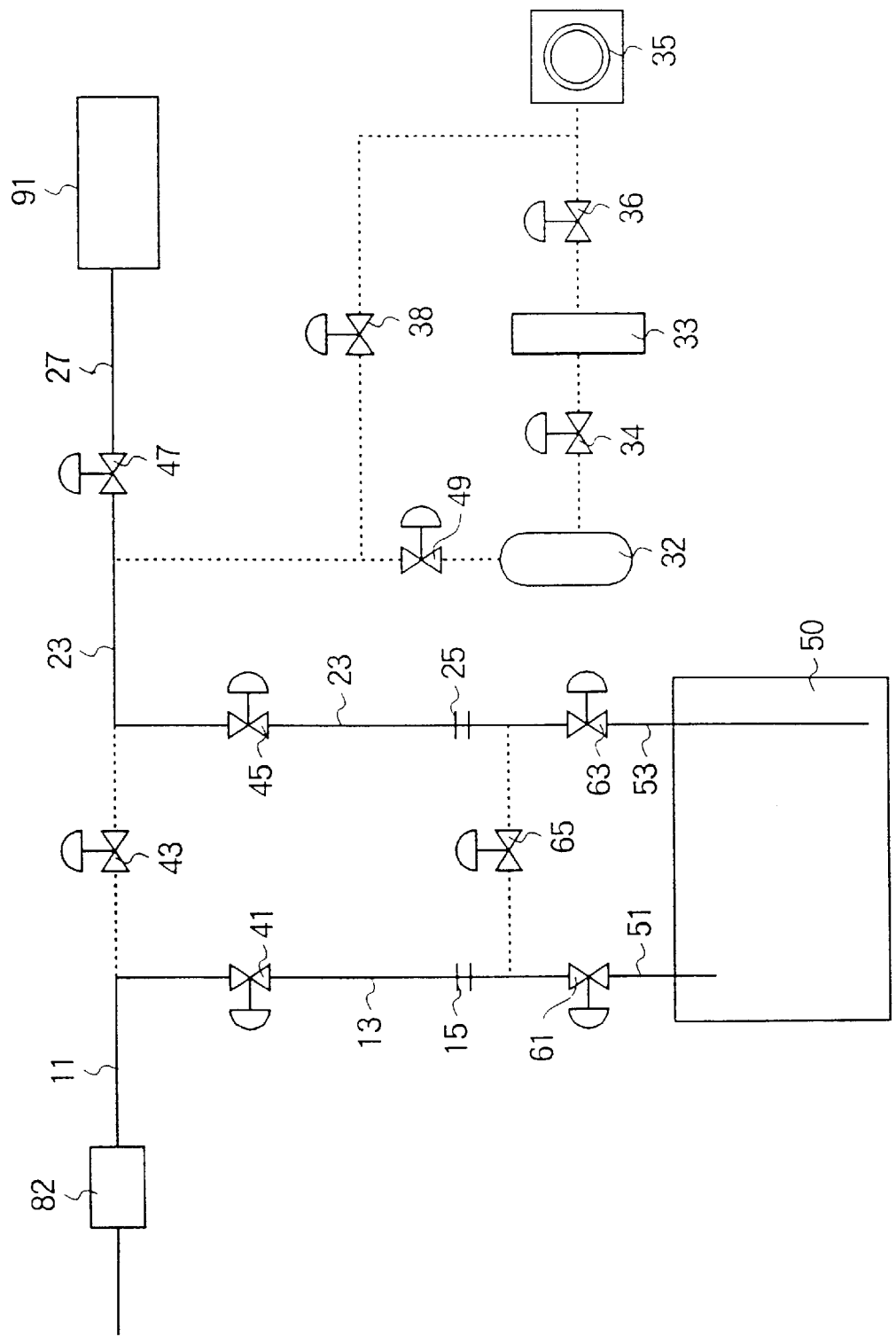

FIG. 20 is a schematic drawing to show the flow of fluid when the apparatus shown in FIG. 18 is in a use state.

Figure 21:
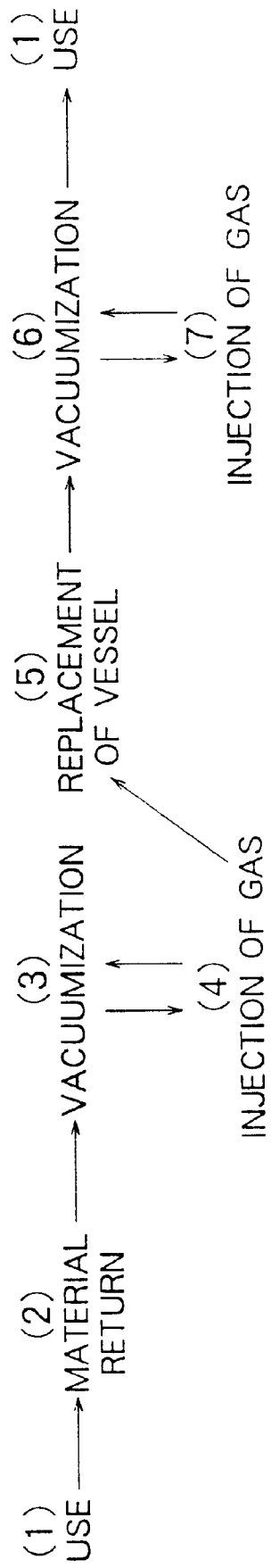

FIG. 21 is an explanatory drawing to show an example of the procedure of vessel replacement in the liquid material supplying method of the present invention using the apparatus shown in FIG. 18.

Figure 22:
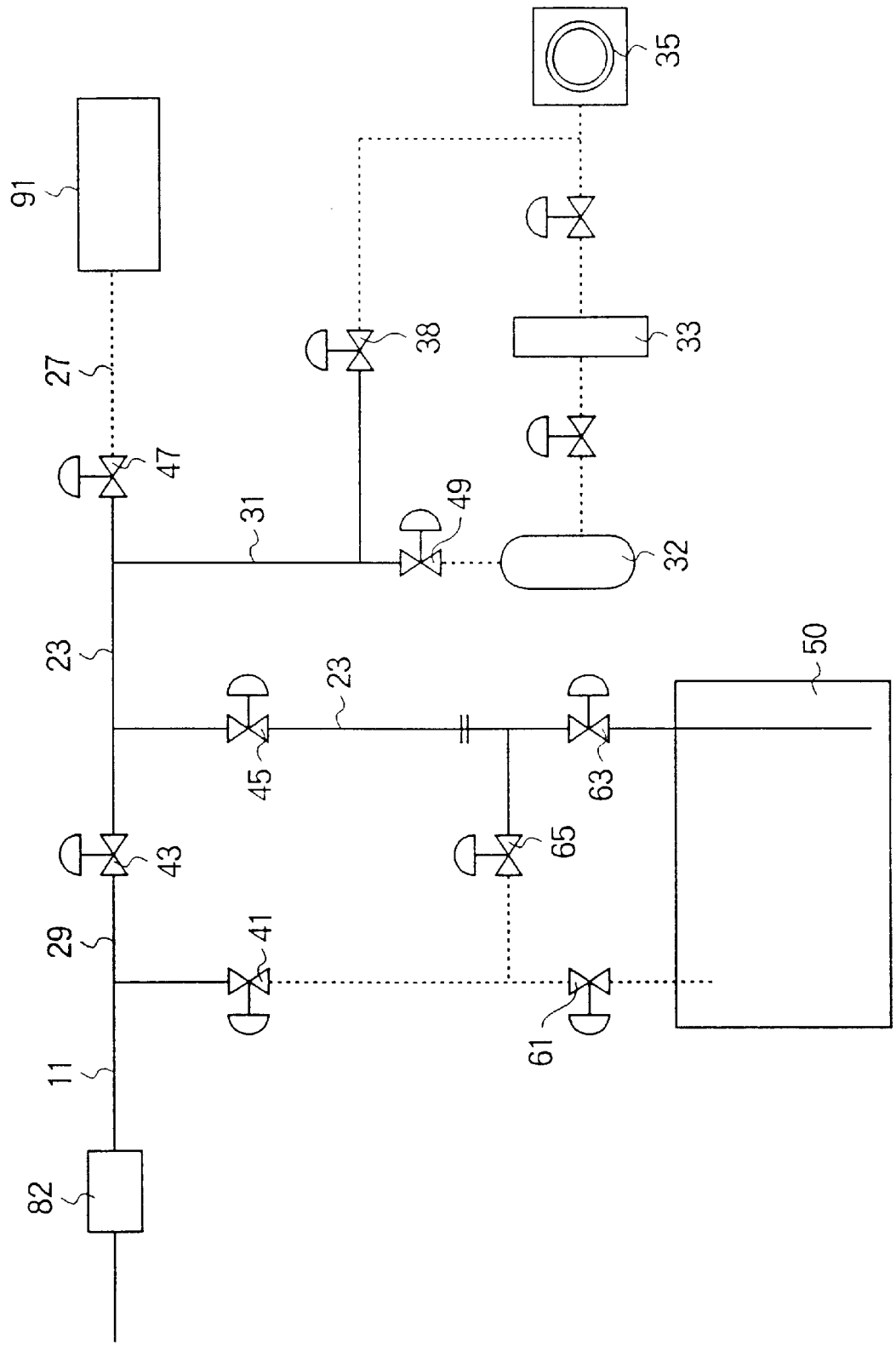

FIG. 22 is a schematic drawing to show the flow of fluid when the apparatus shown in FIG. 18 is in the material return state.

Figure 23:
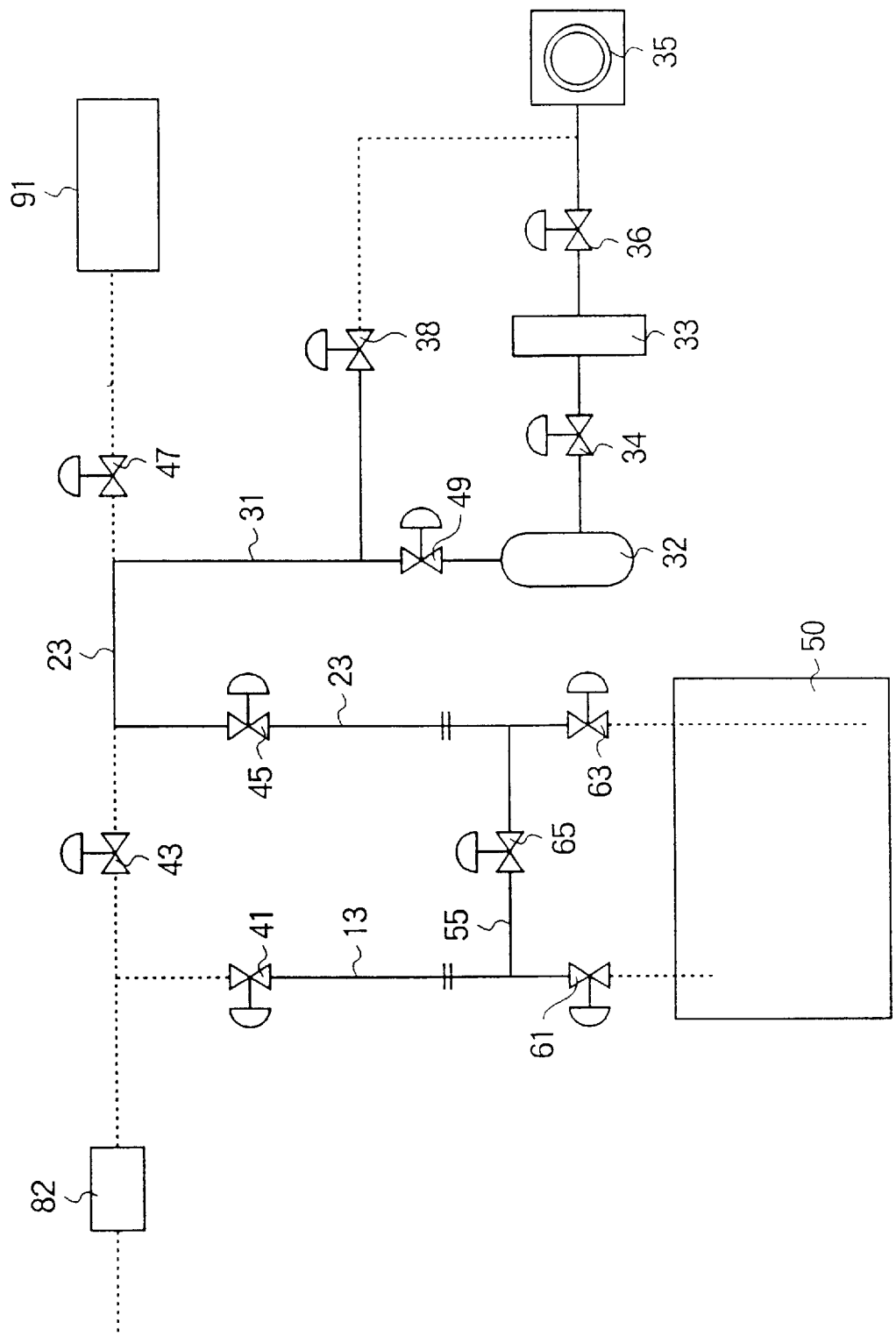

FIG. 23 is a schematic drawing to show the flow of fluid when the apparatus shown in FIG. 18 is in the vacuumizing state.

Figure 24:
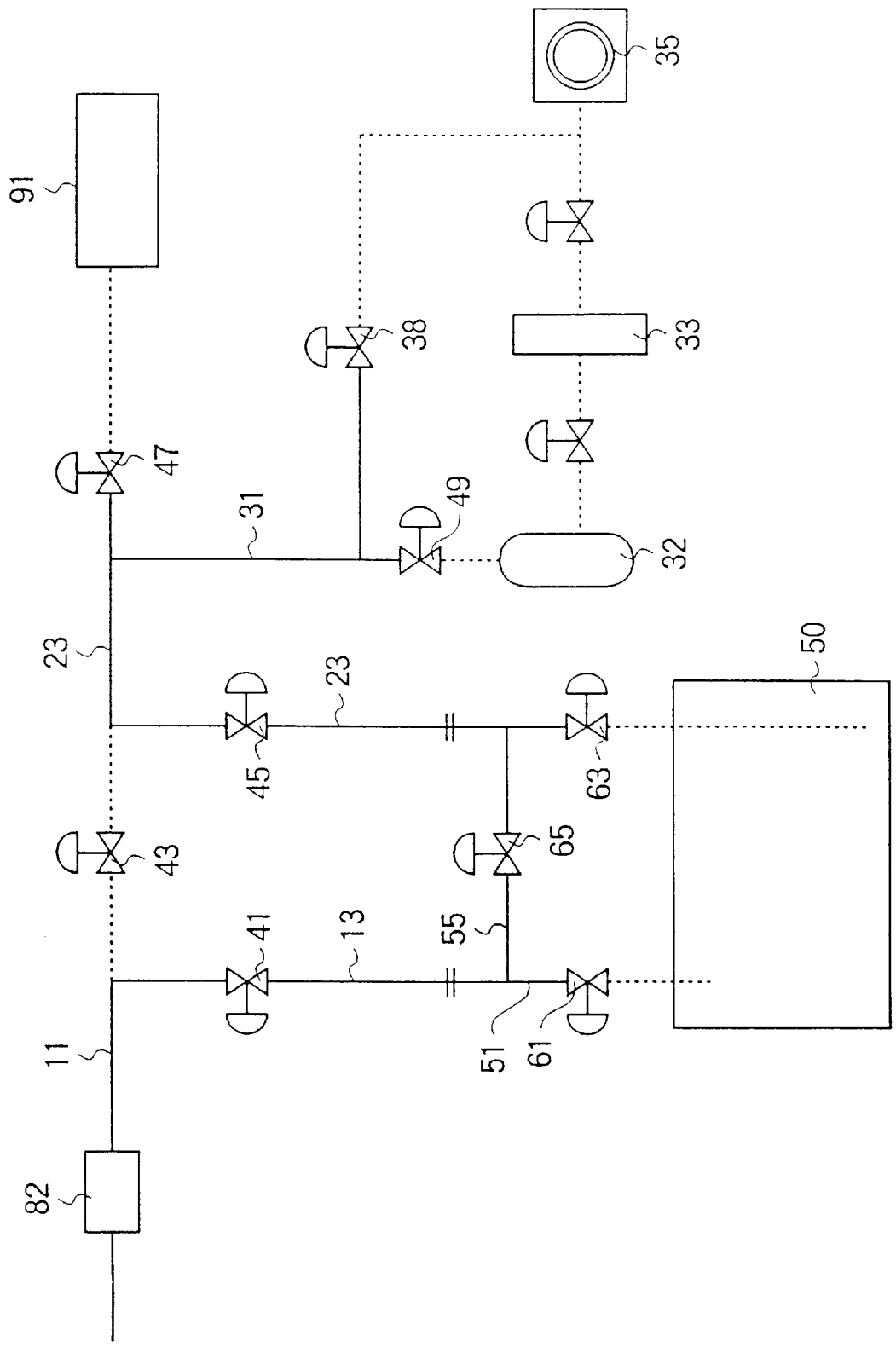

FIG. 24 is a schematic drawing to show the flow of fluid when the apparatus shown in FIG. 18 is in the gas injection state.

Figure 25:
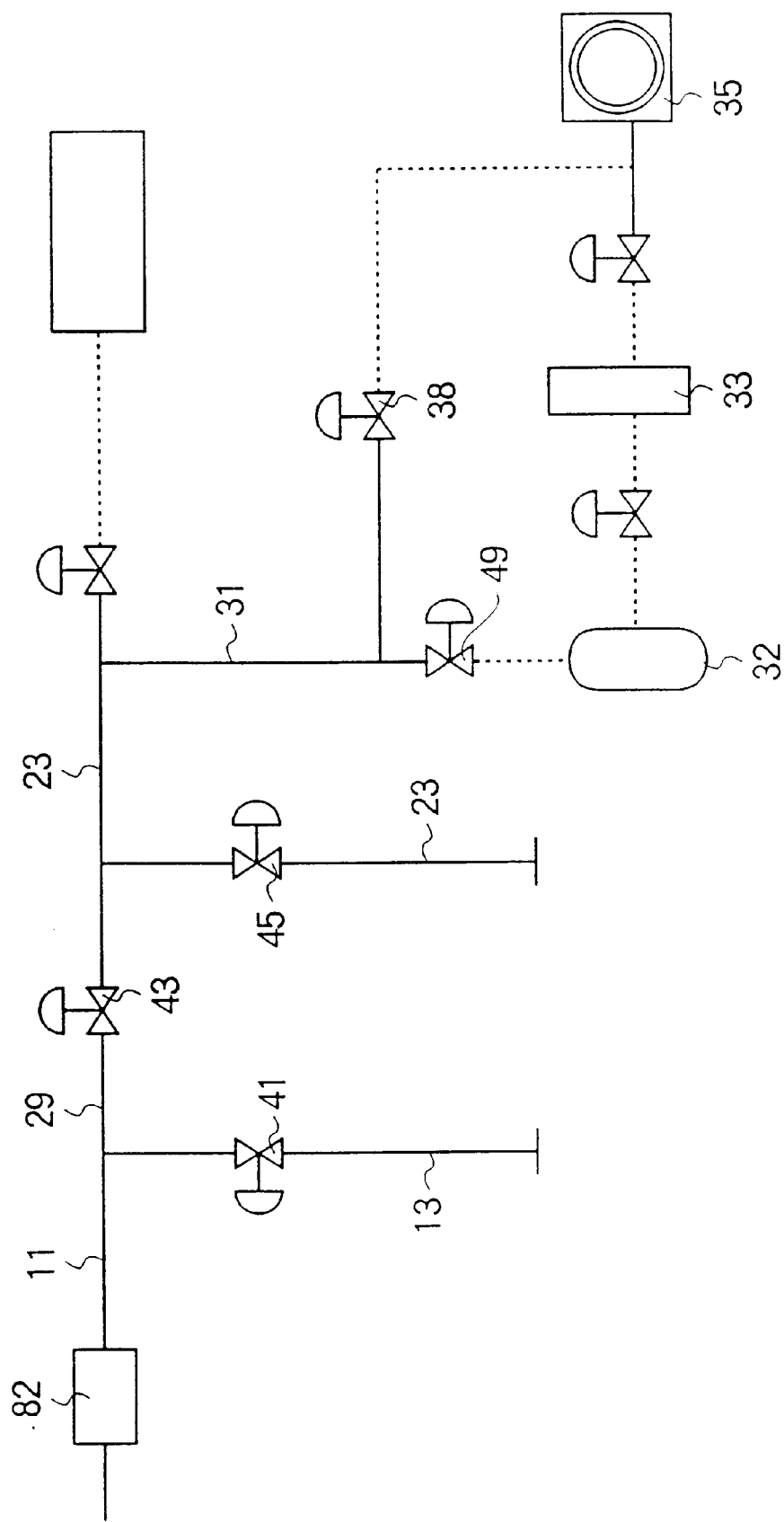

FIG. 25 is a schematic drawing to show the flow of fluid when the apparatus shown in FIG. 18 is in the vessel replacement state.

Figure 26:
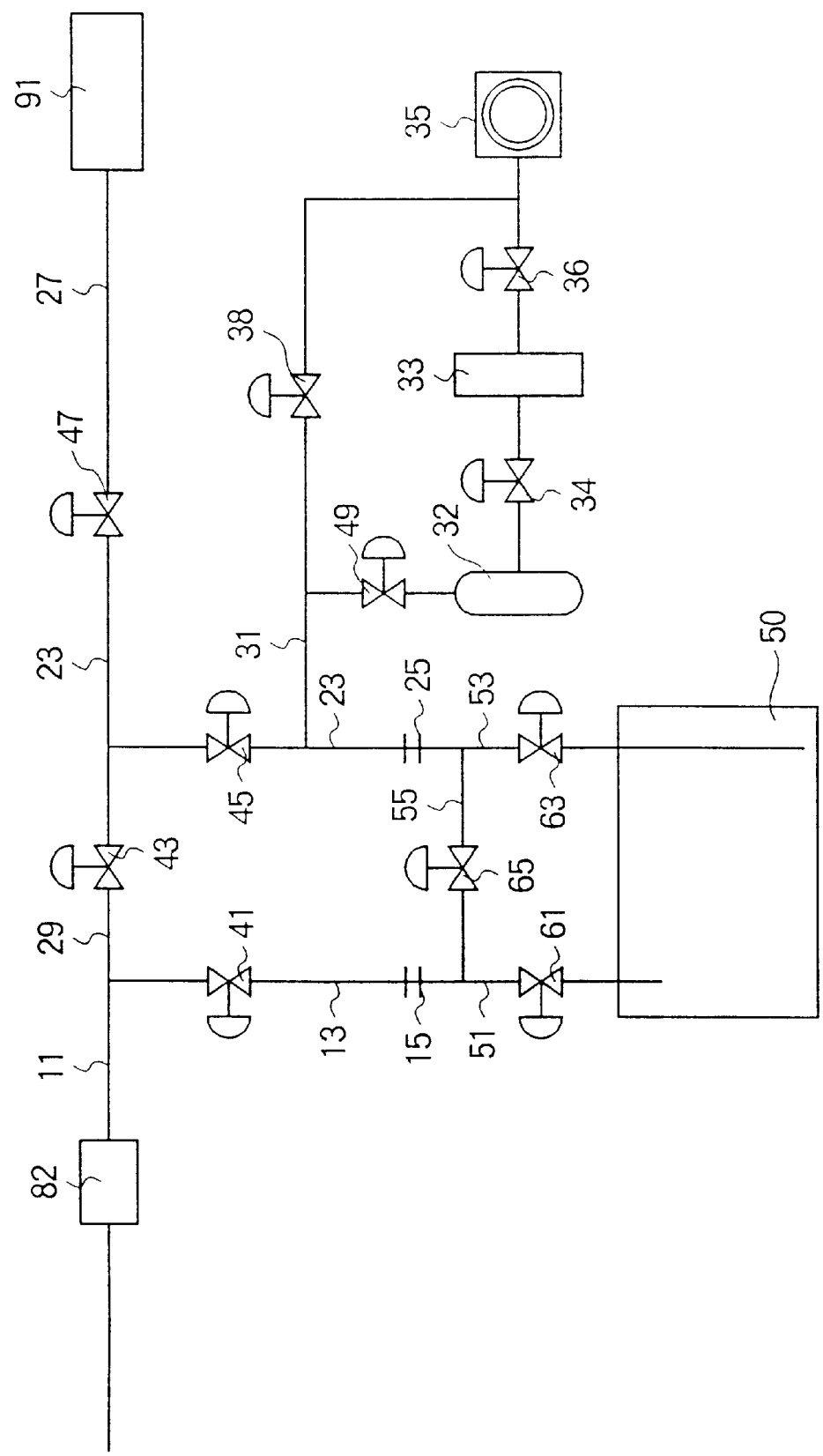

FIG. 26 is a schematic drawing of another example of the liquid material supplying apparatus (an embodiment provided with a vessel) according to the present invention.

Figure 27:
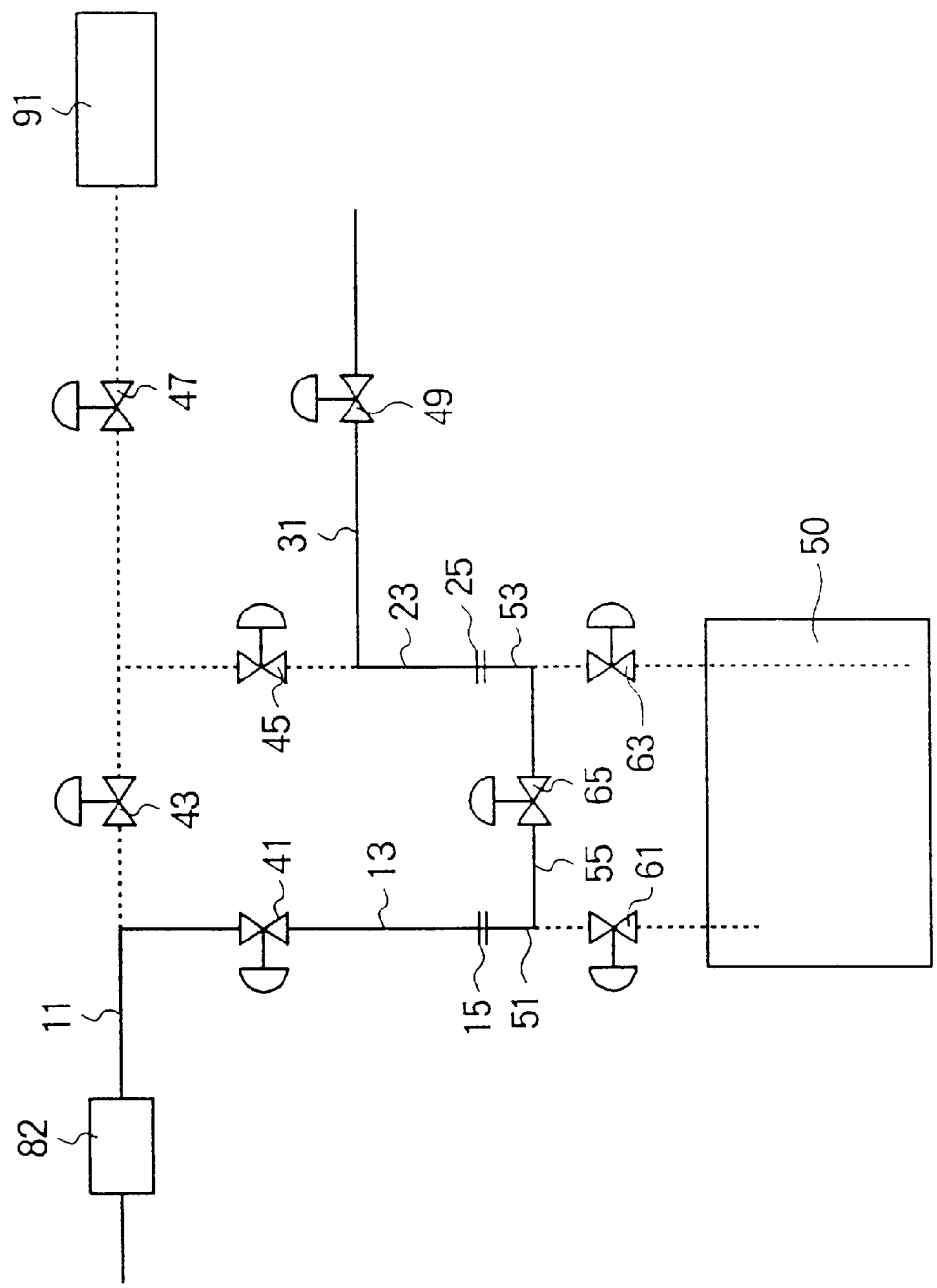
Figure 28:
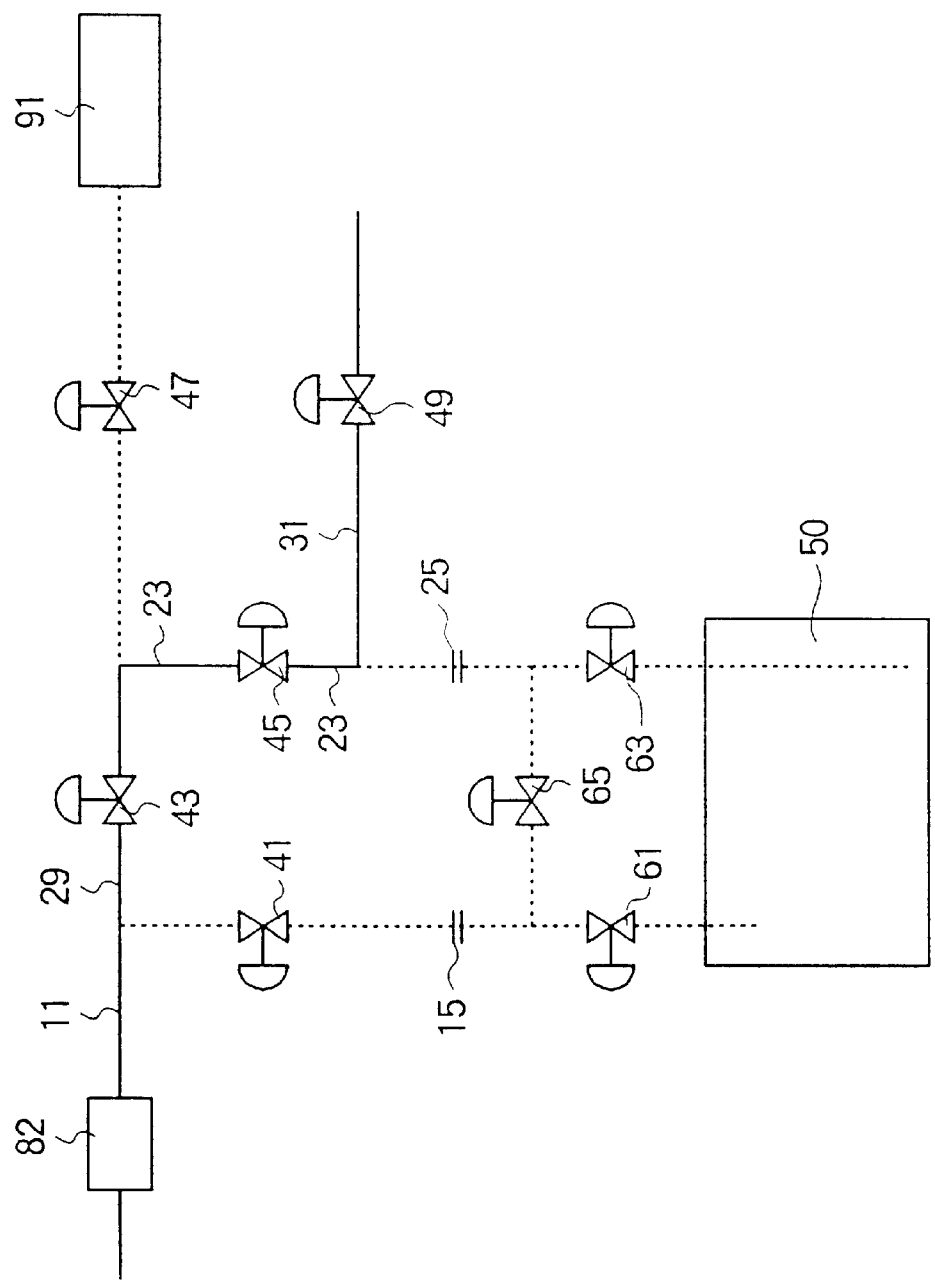

Each of FIG. 27 and FIG. 28 is a schematic drawing to show the flow of fluid when the apparatus shown in FIG. 18 is in a purge state.

Figure 29:
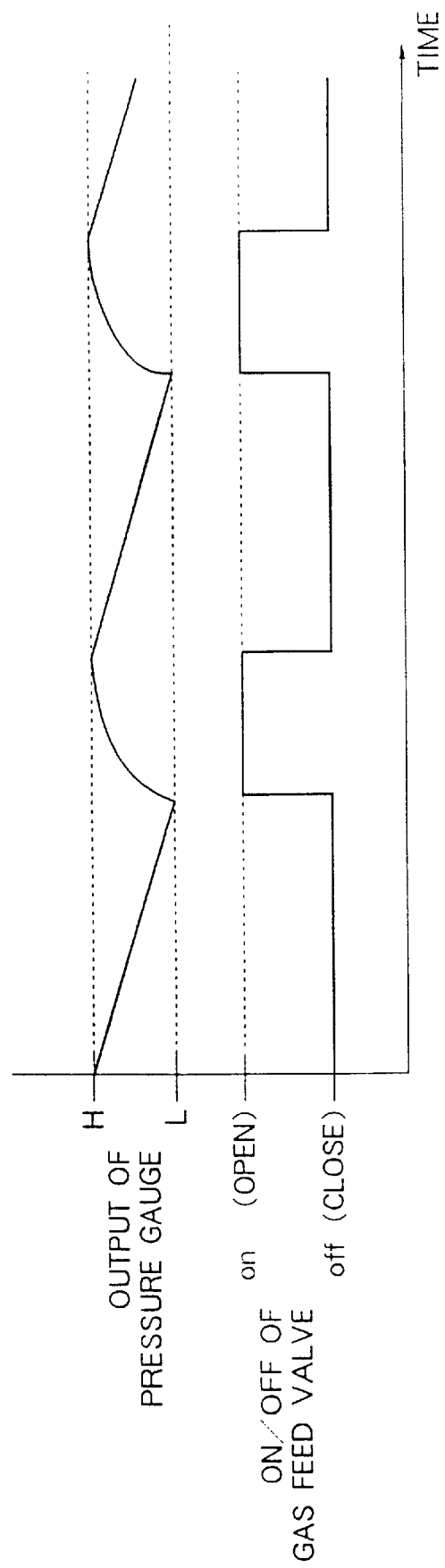

FIG. 29 is a graph of the relationship between output of pressure gage and operation of gas feed valve, showing an example of the pressurizing method of the inside of vessel suitable for the present invention.

Figure 30:
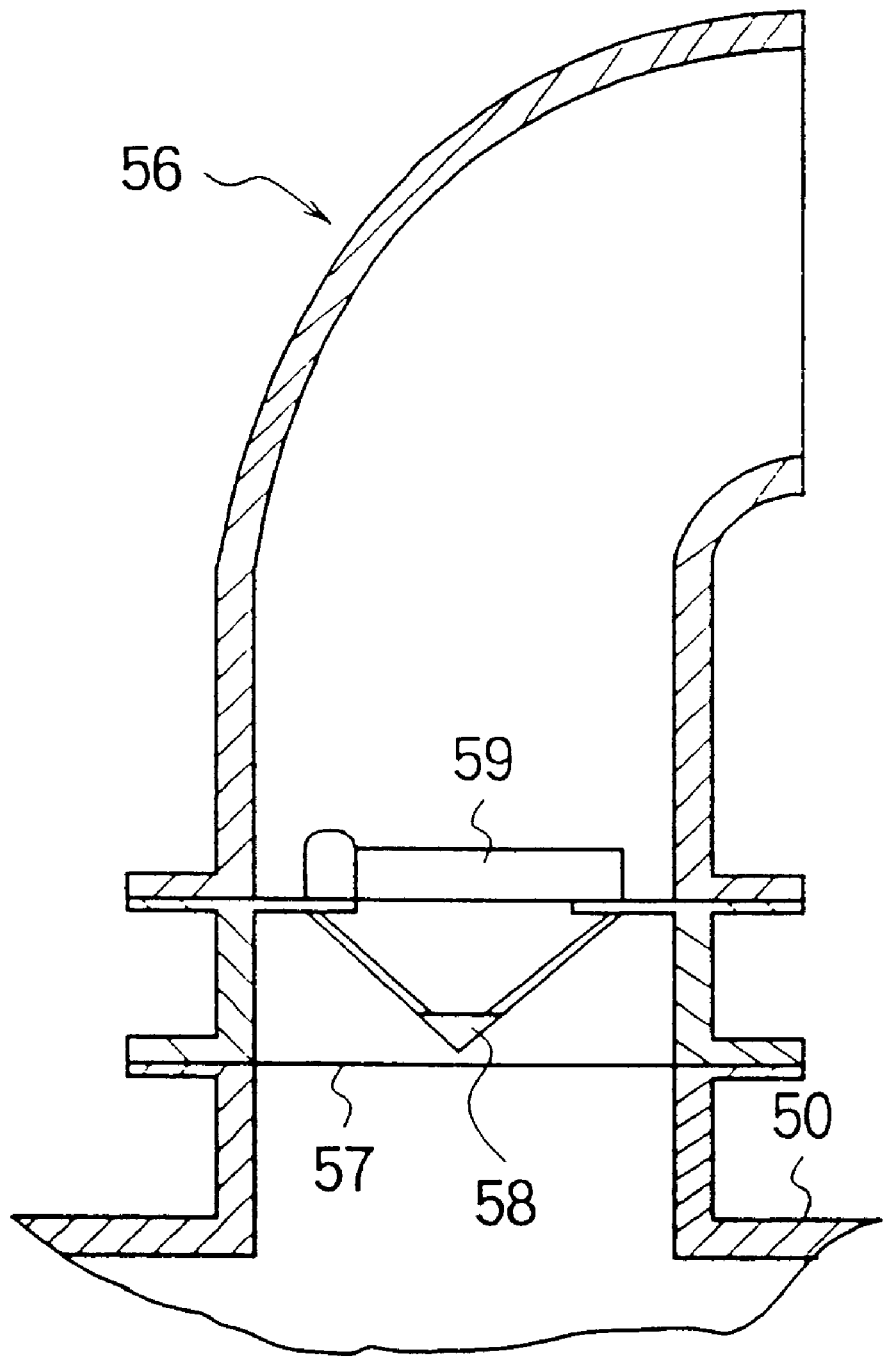

FIG. 30 is a cross-sectional view to show an example of burst preventing device suitable for the present invention.

BEST MODE FOR CARRYING OUT THE INVENTION

Preferred embodiments of the present invention will be described with reference to the accompanying drawings.

Figure 2:
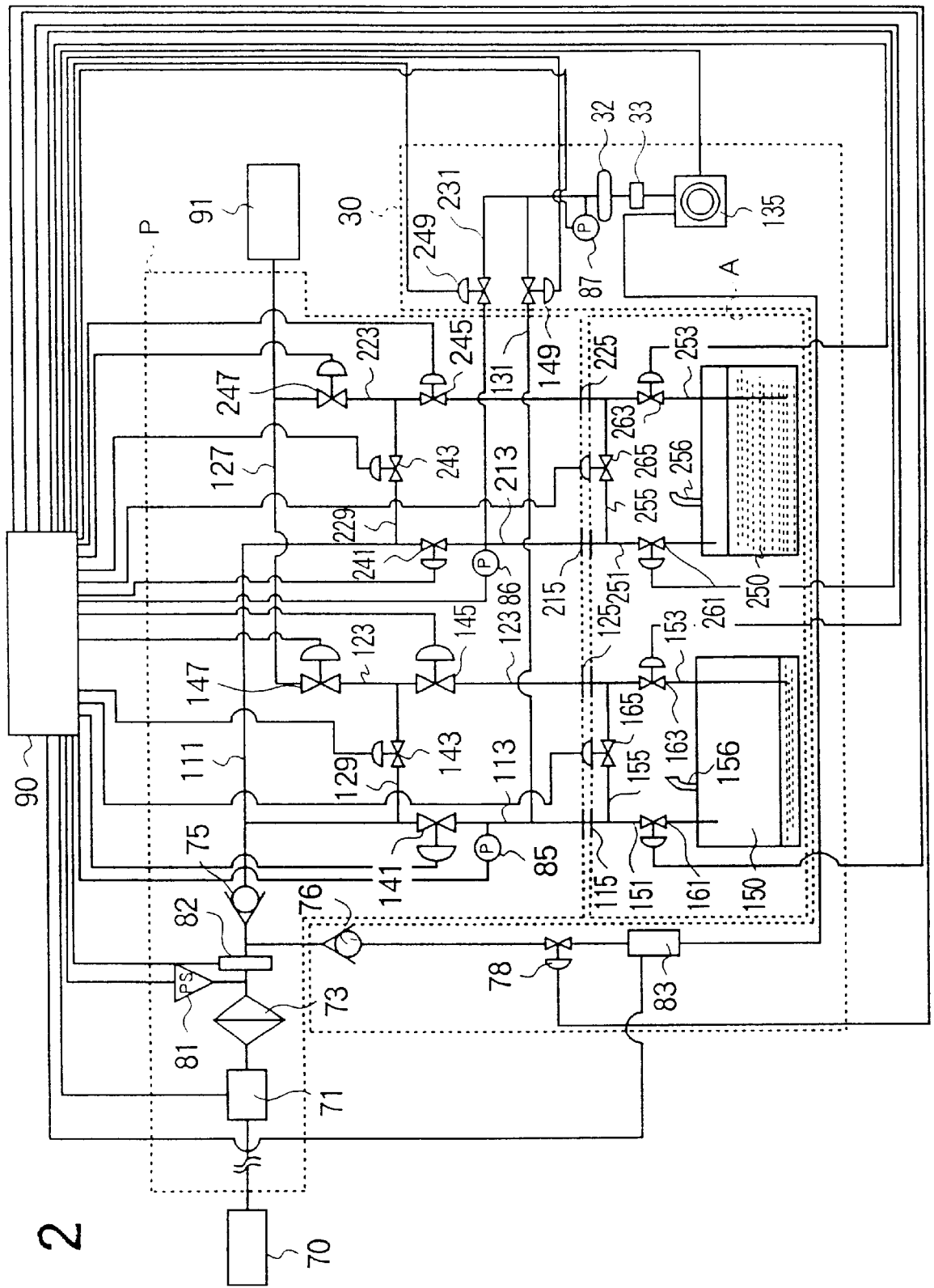
FIG. 2 is a schematic drawing of an example of the liquid material supplying apparatus (an embodiment provided with a plurality of vessels) according to the present invention.

First, the first preferred embodiment of the liquid material supplying apparatus of the present invention will be described referring to FIG. 2. The first embodiment of the apparatus of the present invention has, as shown in FIG. 2, a gas supply pipe 111 and gas line connection pipes 113, 213 for accepting the inert gas from a pressure gas supply 70 through regulator 71, filter 73, and flow-rate meter 82, two vessels 150, 250 to which gas inlet pipe 151, 251 and discharge pipe 153, 253 are fixed and in which the liquid material is enclosed, and material line connection pipes 123, 223 and material supply pipe 127 for feeding the liquid material from the vessel 150, 250 to the vaporizer 91.

This gas supply pipe 111 is connected at one end to the pressure gas supply 70. The other end of the gas supply pipe 111 is bifurcated at the fore end, as shown in FIG. 2. Further, an on-off valve is provided as a first gas feed valve 141 at the first end of this gas supply pipe 111, while an on-off valve is also provided as a second gas feed valve 241 at the second end thereof.

Then the first gas line connection pipe 113 is connected through the first gas feed valve 141 to the first end of this gas supply pipe 111. This first gas line connection pipe 113 is provided with a first gas line joint 115 at the fore end, which is a joint for connecting it with the first gas inlet pipe 151 being a gas inlet pipe of the vessel being the first vessel 150. Further, the second gas line connection pipe 213 is also connected similarly through the second gas feed valve 241 to the second end of the gas supply pipe 111. This second gas line connection pipe 213 is provided with a second gas line joint 215 at the fore end, which is a joint for connecting it with the second gas inlet pipe 251 being a gas inlet pipe of the second vessel 250 as another vessel.

The first vessel 150, receiving supply of pressure gas through the first gas line connection pipe 113, and the second vessel 250, receiving supply of pressure gas through the second gas line connection pipe 213, are vessels of the same structure and the first vessel 150 and second vessel 250 both contain the liquid material inside.

Then the first vessel 150 has an on-off valve as a first gas inlet valve 161 midway in the first gas inlet pipe 151 and also has an on-off valve as a first discharge valve 163 midway in the first discharge pipe 153. Further, there is a first interconnection pipe 155 for connecting the first gas inlet pipe 151 with the first discharge pipe 153 and this first interconnection pipe 155 is also provided with an on- off valve as a first pipe connection valve 165. In addition, the second vessel 250 is also provided similarly with an on-off valve as a second gas inlet valve 261 in the second gas inlet pipe 251 and with an on-off valve as a second discharge valve 263 in the second discharge pipe 253. Further, it has a second interconnection pipe 255 for connecting the second gas inlet pipe 251 with the second discharge pipe 253 and this second interconnection pipe 255 is also provided with an on-off valve as a second pipe connection valve 265. Additionally, the first and second vessels 150, 250 are provided with a burst preventing device 156, 256 described hereinafter.

The interconnection pipe 155, 255 connects a portion of gas inlet pipe 151, 251 on the gas line joint 115, 215 side with respect to the gas inlet valve 161, 261 with a portion of the discharge pipe 153, 253 on the material line joint 125, 225 side with respect to the discharge valve 163, 263.

Further provided are the material line connection pipes 123, 223 for connecting each vessel 150, 250 with the material supply pipe 127. Then the first material line connection pipe 123 connected with the first discharge pipe 153 of the first vessel 150 has the first material line joint 125 at an end and the first material line connection pipe 123 is arranged to have an on-off valve as a first material acceptance valve 145 midway. The other end of this first material line connection pipe 123 is connected through an on-off valve as a first supply valve 147 to the first end of material supply pipe 127.

Similarly, the second material line connection pipe 223 for connection with the second discharge pipe 253 has the second material line joint 225 at an end and the second material line connection pipe 223 is arranged to have an on-off valve as a second material acceptance valve 245 midway. The other end of the second material line connection pipe 223 is connected through an on-off valve as a second supply valve 247 to the second end of the material supply pipe 127.

Also, the material supply pipe 127 is for coupling the pipes from the first end with the first supply valve 147 provided thereat and from the second end with the second supply valve 247 provided thereat with each other to connect them with the vaporizer 91 so as to enable the liquid material from the first vessel 150 and the liquid material from the second vessel 250 to be fed to the vaporizer 91.

Further, this liquid material supplying apparatus is provided with a first by-pass pipe 129 for connecting the gas supply pipe 111 with the first material line connection pipe 123 and an on-off valve as a first line short valve 143 midway in this first by-pass pipe 129. Similarly, there is also provided a second by-pass pipe 229 for connecting the gas supply pipe 111 with the second material line connection pipe 223 and an on-off valve as a second line short valve 243 midway in this second by-pass pipe 229.

Further connected through a first exhaust pipe 131 to the first gas line connection pipe 113 is a vent line (harm eliminator) 30 having a liquid trap 32, a harm eliminating column 33, and a vacuum pump 135, and an on-off valve is provided as a first elimination valve (exhaust valve) 149 midway in this first exhaust pipe 131. Similarly, the vent line 30 having the aforementioned vacuum pump 135 etc. is connected through a second exhaust pipe 231 to the second gas line connection pipe 213, and an on-off valve is provided as a second elimination valve (exhaust valve) 249 midway in this second exhaust pipe 231.

There is further provided a pipe used as a pump exhaust line from the gas supply pipe 111 to the vacuum pump 135, and this pipe as the pump exhaust line is provided with a check valve 76, an on-off valve as a pump exhaust valve 78, and a flow-rate meter 83. This pump exhaust line continuously supplies a small amount of gas (inert gas) from the gas supply pipe 111 to the vent line 30, thereby enabling to remove water or oxygen in the vacuum pump 135 and the like.

Additionally, the gas supply pipe 111 is provided with a pressure switch 81 by which the liquid material supplying apparatus is stopped with occurrence of anomaly in pressure. Further, a pressure gage 85, 86 is given in the first gas line connection pipe 113 or in the second gas line connection pipe 213, respectively, to detect the internal pressure of vessel in the first vessel 150 or in the second vessel 250. Further, the exhaust pipe is also provided with a pressure gage 87 to enable to detect the operational condition of vacuum pump 135.

The above gas supply pipe 111, gas line connection pipes 113, 213, material line connection pipes 123, 223, material supply pipe 127, by-pass pipes 129, 229, and valves and the like provided therein constitute a permanent line P, while the above gas inlet pipes 151, 251, discharge pipes 153, 253, interconnection pipes 155, 255, and valves provided therein constitute an attached line A changed together with the vessels 150, 250 for another. The valves applicable in the present invention may be selected from air valves, electromagnetic valves, and so on.

Each of these on-off valves, pressure gages, and vacuum pump is electrically connected to a control unit 90, as shown in FIG. 2, and the control unit 90 controls on/off operation of each valve etc. detailed below. A sequencer or the like incorporating a microcomputer is used as the control unit 90. This arrangement to control the whole of the liquid material supplying apparatus by computer can increase the efficiency of work and prevent erroneous operation. It can also eliminate variation in each operation time or the like upon changeover of vessel, thereby realizing stable supply of liquid material.

Next described referring to FIG. 3 to FIG. 17 is the first preferred embodiment of the liquid material supplying method of the present invention. The first embodiment of the method according to the present invention is carried out using the first embodiment of the above apparatus according to the present invention, and the timing chart thereof is illustrated in FIG. 3 and FIG. 4.

Figure 3:
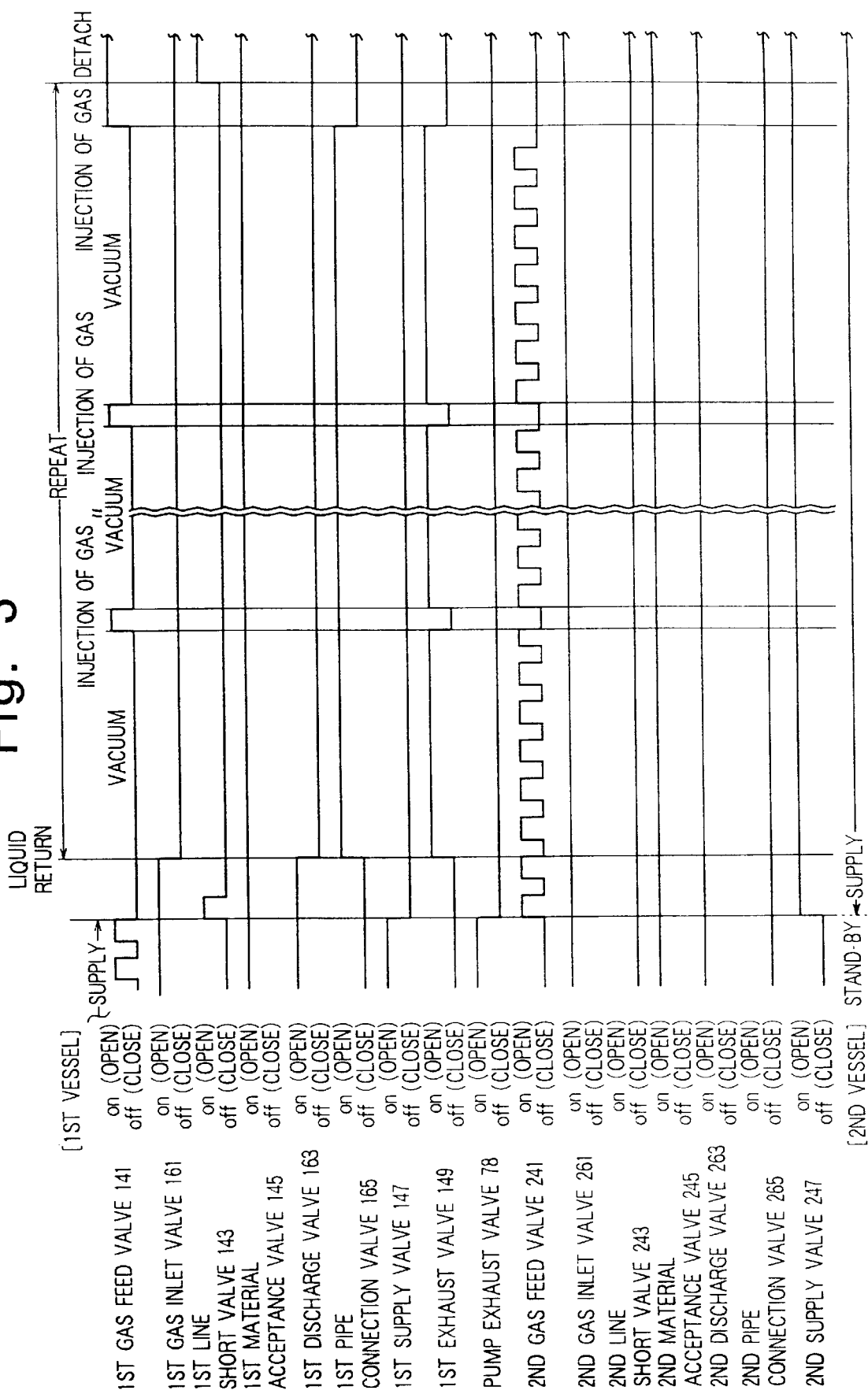
Figure 4:
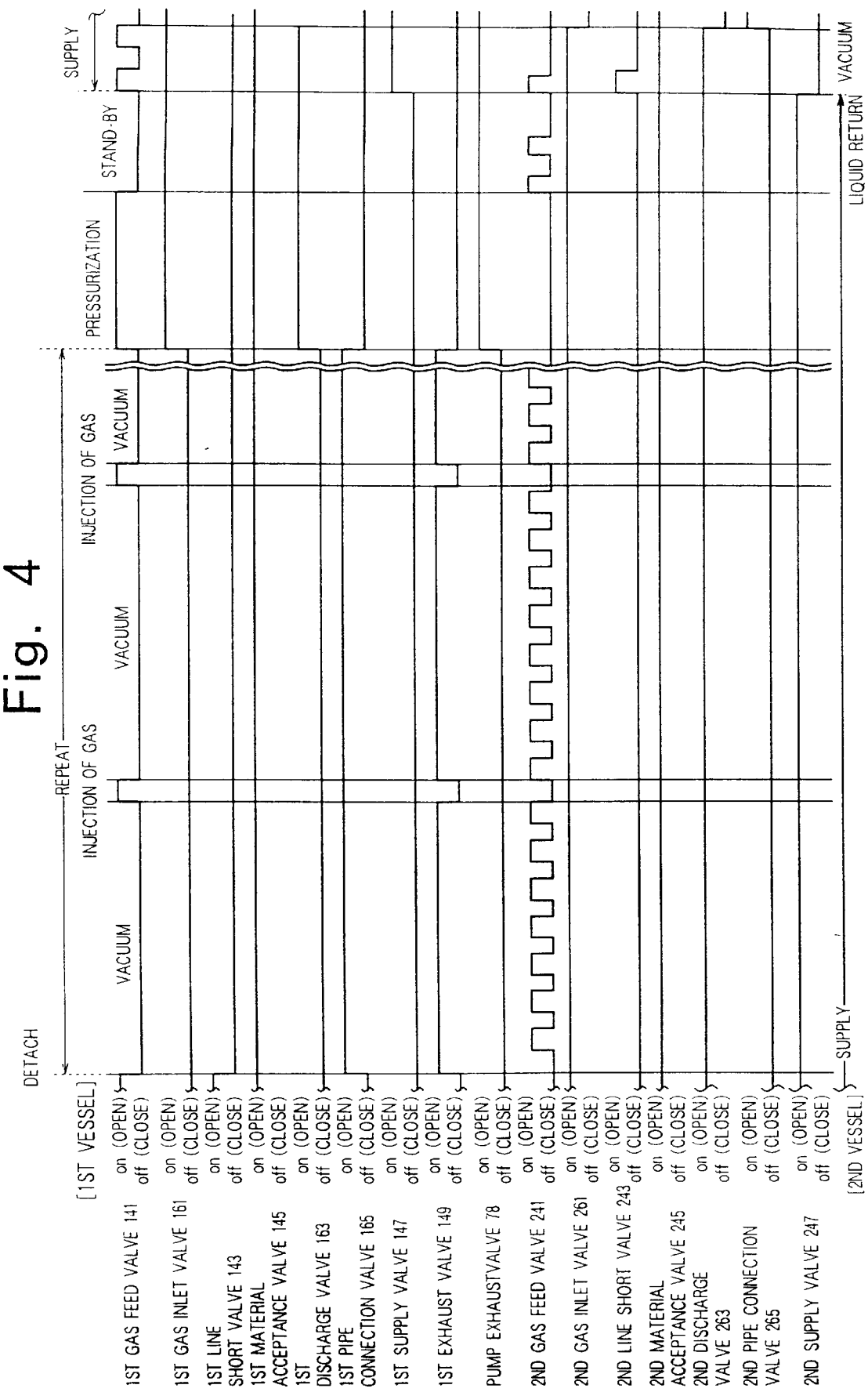
FIG. 4 is a timing chart to show operation of each valve in an example of the liquid material supplying method of the present invention using the apparatus shown in FIG. 2.
Figure 5:
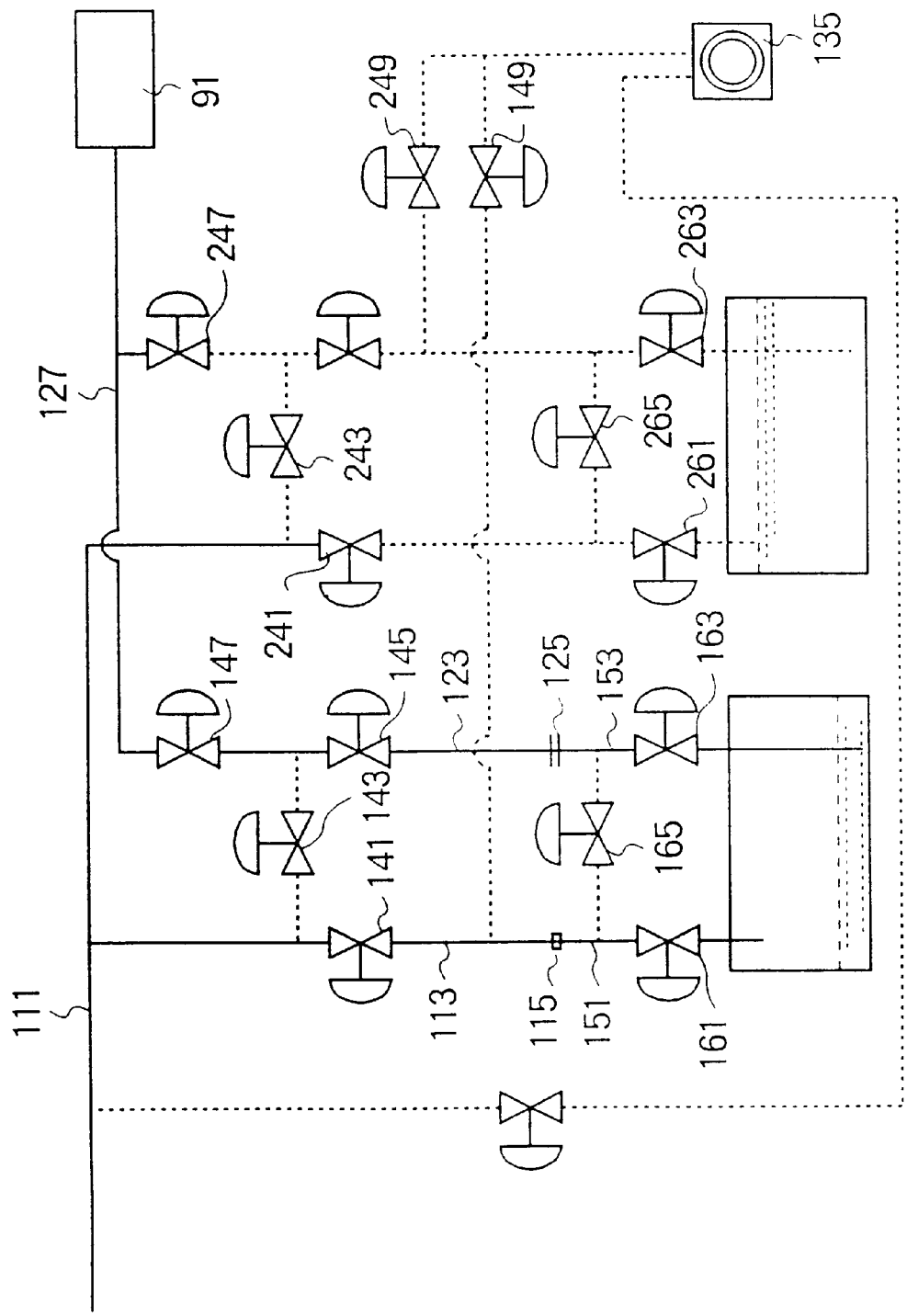
FIG. 5 is a schematic drawing to show the flow of fluid when the apparatus shown in FIG. 2 is in a use state.

For supplying the liquid material to the vaporizer 91 by this liquid material supplying apparatus, as shown in FIG. 3 and FIG. 5, the first gas feed valve 141 and first gas inlet valve 161 are first opened to feed the inert gas as pressure gas from the gas supply pipe 111 to the first vessel 150 and then the first discharge valve 163, first material acceptance valve 145, and first supply valve 147 are opened to feed the liquid material in the first vessel 150 to the vaporizer 91.

On/off of first gas feed valve 141 is controlled as detecting the pressure in the first vessel 150 by the first pressure gage 85 provided in the first gas line connection pipe 113. Specifically, when the pressure in the first vessel 150 drops, the first gas feed valve 141 is opened to raise the pressure in the first vessel 150 back to a constant pressure, thereby controlling the pressure in the first vessel 150 to be always in a predetermined range.

While the liquid material from the first vessel 150 is supplied to the vaporizer 91, the inside of the second vessel 250 is also kept in a pressurized state. Namely, the inside of the second discharge pipe 253 and second material line connection pipe 223 is filled with the liquid material so as to be ready for supply of the liquid material from the second vessel 250 to the vaporizer 91 immediately after opening of the second supply valve 247, thereby keeping the second vessel 250 in a standby state.

Figure 6:
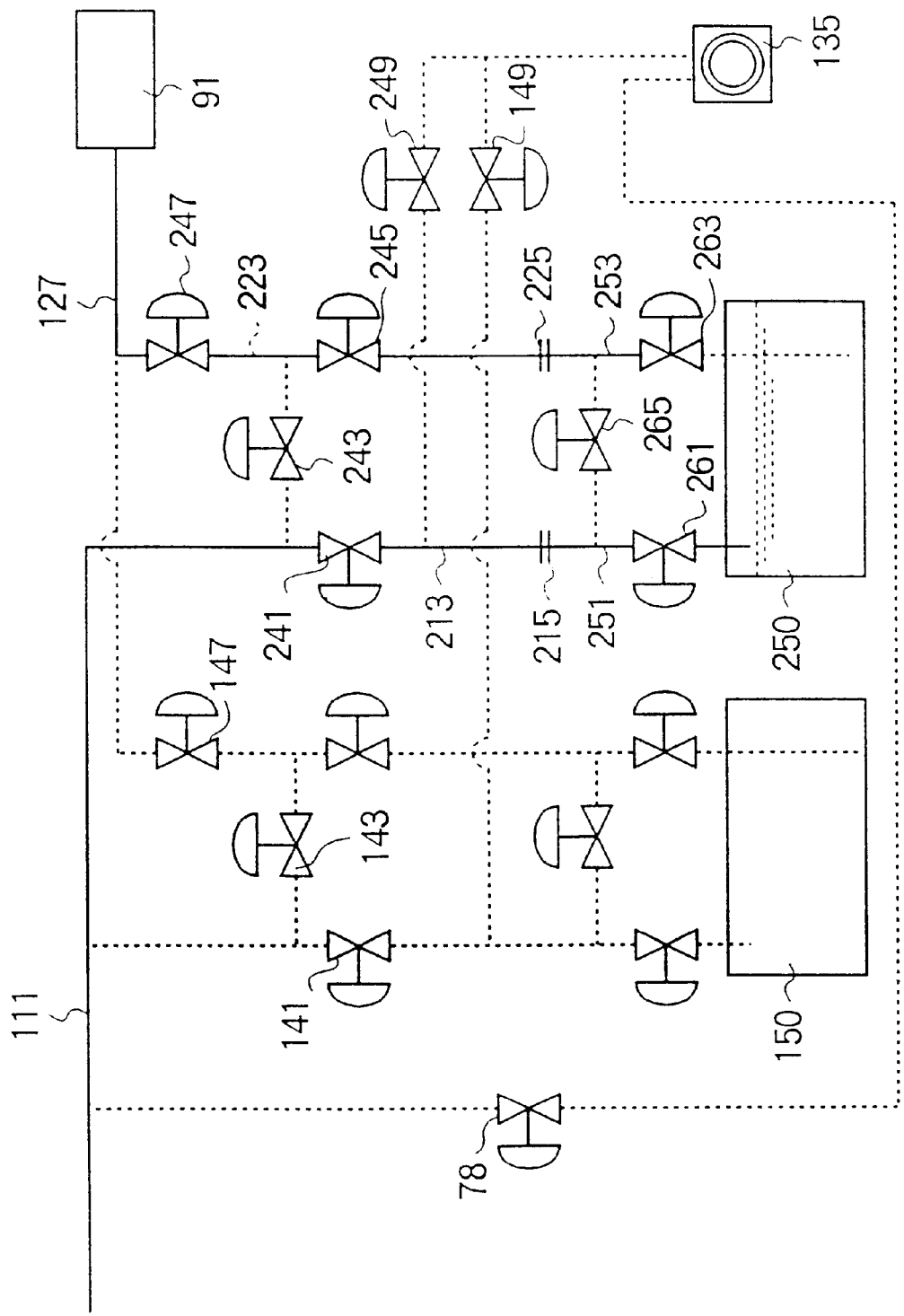
FIG. 6 is a schematic drawing to show the flow of fluid when the apparatus shown in FIG. 2 is in the use state (after changeover of vessel).

When little liquid material remains in the first vessel 150, the second gas feed valve 241 is opened, as shown in FIG. 3 and FIG. 6, to feed the inert gas as pressure gas from the gas supply pipe 111 to the second vessel 250 and the second supply valve 247 is opened to supply the liquid material from the second vessel 250 to the vaporizer 91.

At this time the second gas feed valve 241 is subjected to intermittent on/off operation as detecting the pressure in the second vessel 250 by the second pressure gage 86 provided in the second gas line connection pipe 213, thereby keeping the pressure in the second vessel 250 stabilized in a constant range.

Further, while the liquid material from the second vessel 250 is supplied to the vaporizer 91, the first vessel 150 is changed for another, whereby changeover to the first vessel 150 is carried out at consumption of the liquid material in the second vessel 250, thus preventing the material supply to the vaporizer 91 from being interrupted.

As described, the present embodiment uses the liquid material supplying apparatus with the two vessels and two systems of pressure gas line and material supply line, for stably supplying the liquid material to the vaporizer 91 throughout a long period. While one vessel is supplying the liquid material to the vaporizer 91, the other vessel is kept as a standby vessel under standby of supply. It is, however, noted that the status of the standby vessel is of standby in a ready-for-use state and that the ready-for-use state means a state of completion of purge after replacement of vessel. Accordingly, the standby vessel in the ready-for-use state can supply the liquid material to the vaporizer 91 without a delay by opening the gas feed valve 141, 241 in the pressure gas line and the supply valve 147, 247 in the material supply line.

Figure 7:
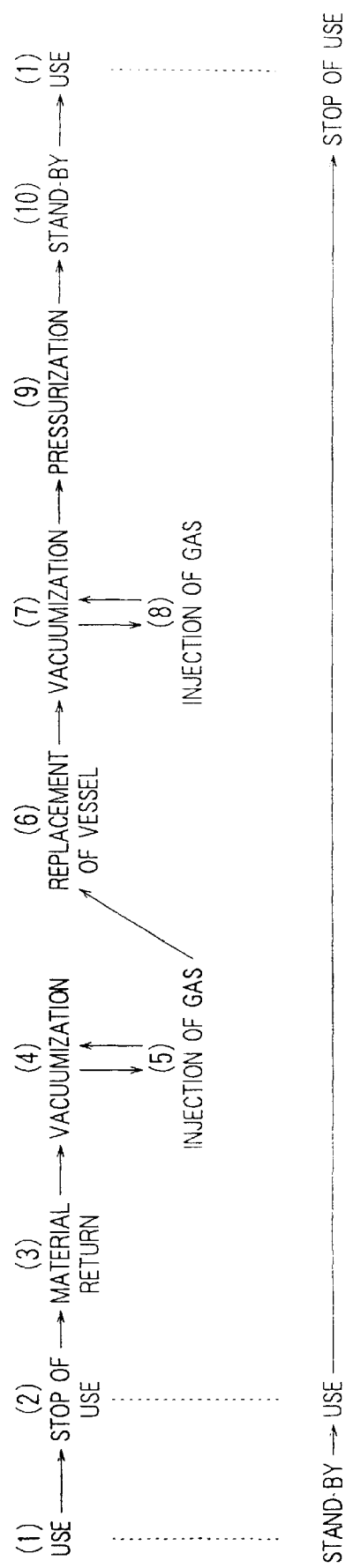
FIG. 7 is an explanatory drawing to show an example of the procedure of vessel replacement in the liquid material supplying method of the present invention using the apparatus shown in FIG. 2.

Then replacement of the first vessel 150 having become vacant is carried out, as shown in FIG. 7, in such a way as to change the second vessel 250 from the standby state into the use state in correspondence to stop of use of the first vessel 150, to turn the first vessel 150 into the use stop state, and thereafter to perform a material return process to the first vessel 150. Thereafter, the purge by vacuumization and gas injection is carried out and then replacement of vessel is made to attach a new vessel. After the purge by vacuumization and gas injection is carried out again, a pressurization process to charge the liquid material into the first discharge pipe 153 and first material line connection pipe 123 of the new first vessel 150 is carried out to keep the new first vessel 150 in the standby state. On/off states of each valve in such sequential operation are shown in Table 1 below.

TABLE 1

| MODE AIR VALVE | LIQUID RETURN | GAS PURGE | | DETACHMENT | PRESSURIZATION | STAND-BY |
| --- | --- | --- | --- | --- | --- | --- |
| | | VACUUMIZATION | INJECTION OF GAS | | | |
| 1ST GAS FEED VALVE 141 | X | X | ○ | ○ | ○ | X |
| 1ST GAS INLET VALVE 161 | ○ | X | X | X | ○ | ○ |
| 1ST LINE SHORT VALVE 143 | ○ | X | X | ○ | X | X |
| 1ST MATERIAL ACCEPTANCE VALVE 145 | ○ | ○ | ○ | ○ | ○ | ○ |
| 1ST DISCHARGE VALVE 163 | ○ | X | X | X | ○ | ○ |
| 1ST PIPE CONNECTION VALVE 165 | X | ○ | ○ | X | X | X |
| 1ST SUPPLY VALVE 147 | X | X | X | X | X | X |
| 1ST EXHAUST VALVE 149 | X | ○ | X | X | X | X |
| PUMP EXHAUST VALVE 78 | X | X | X | X | ○ | ○ |
| 2ND GAS FEED VALVE 241 | Δ | Δ | X | X | X | Δ |
| 2ND GAS INLET VALVE 261 | ○ | ○ | ○ | ○ | ○ | ○ |
| 2ND LINE SHORT VALVE 243 | X | X | X | X | X | X |

TABLE 1-continued

| | GAS PURGE | | | | | |
|---|---|---|---|---|---|---|
| MODE<br>AIR VALVE | LIQUID<br>RETURN | VACUUMIZATION | INJECTION<br>OF GAS | DETACHMENT | PRESSURIZATION | STAND-BY |
| 2ND MATERIAL AC-<br>CEPTANCE VALVE<br>245 | ○ | ○ | ○ | ○ | ○ | ○ |
| 2ND DISCHARGE<br>VALVE 263 | ○ | ○ | ○ | ○ | ○ | ○ |
| 2ND PIPE CONNEC-<br>TION VALVE 265 | X | X | X | X | X | X |
| 2ND SUPPLY<br>VALVE 247 | ○ | ○ | ○ | ○ | ○ | ○ |

○: OPEN
X: CLOSE
Δ: INTERMITTENT OPEN

Figure 8:
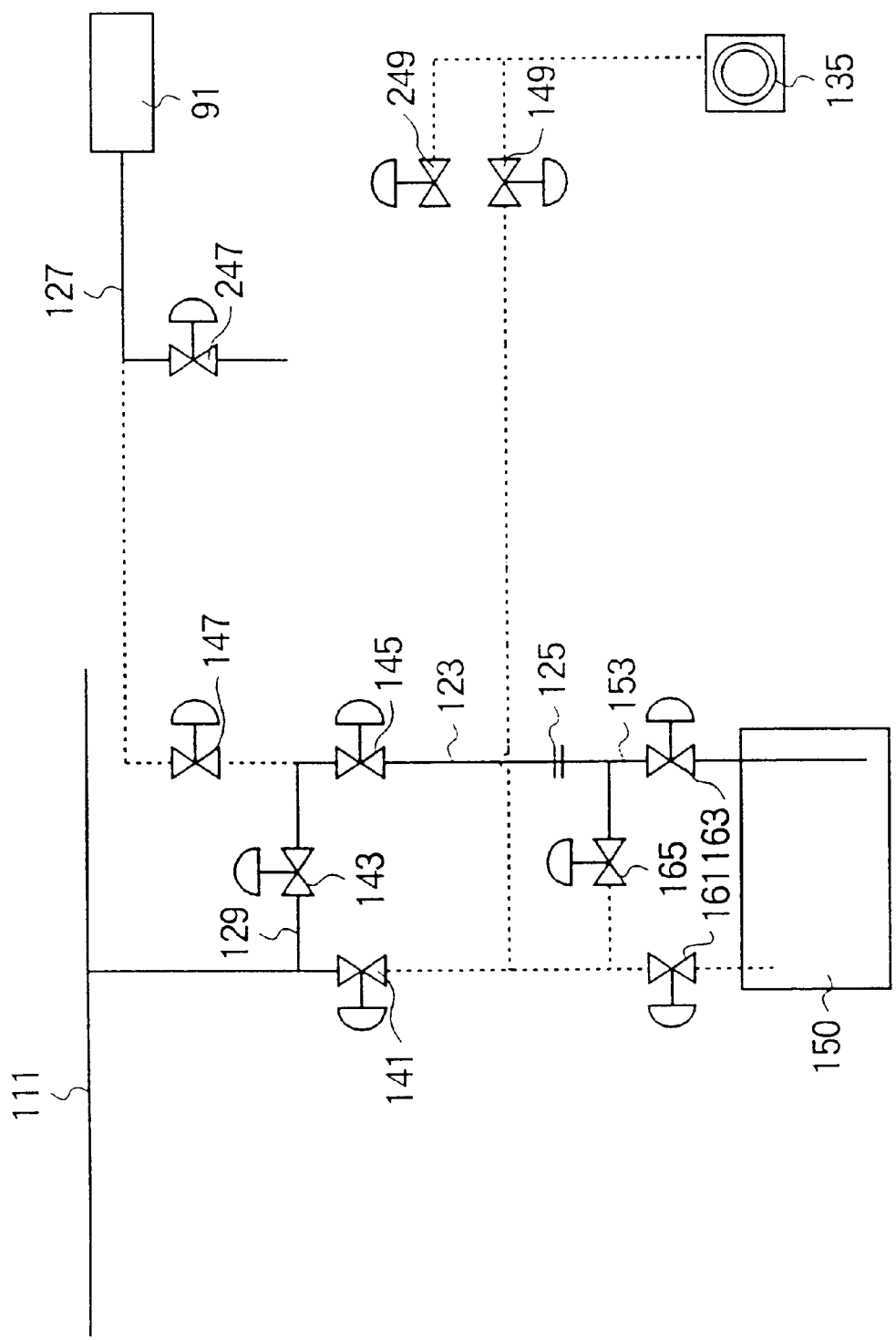
FIG. 8 is a schematic drawing to show the flow of fluid when the apparatus shown in FIG. 2 is in a material return state.

The above material return process is carried out, as shown in FIG. 3, in such a way as to close the first gas feed valve 141 and first supply valve 147 to turn the first vessel 150 into the use stop state and thereafter to open the first line short valve 143. By opening the first line short valve 143 in this way, the gas supply pipe 111 and first material line connection pipe 123 become in communication with each other, as shown in FIG. 8, whereby the pressure gas from the gas supply pipe 111 can be guided to the first material line connection pipe 123. Accordingly, the liquid material remaining inside the first material line connection pipe 123 and first discharge pipe 153 can be returned to the first vessel 150.

At this time the first gas inlet valve 161 may be kept either in an open state, as shown in Table 1, or in a closed state.

Figure 9:
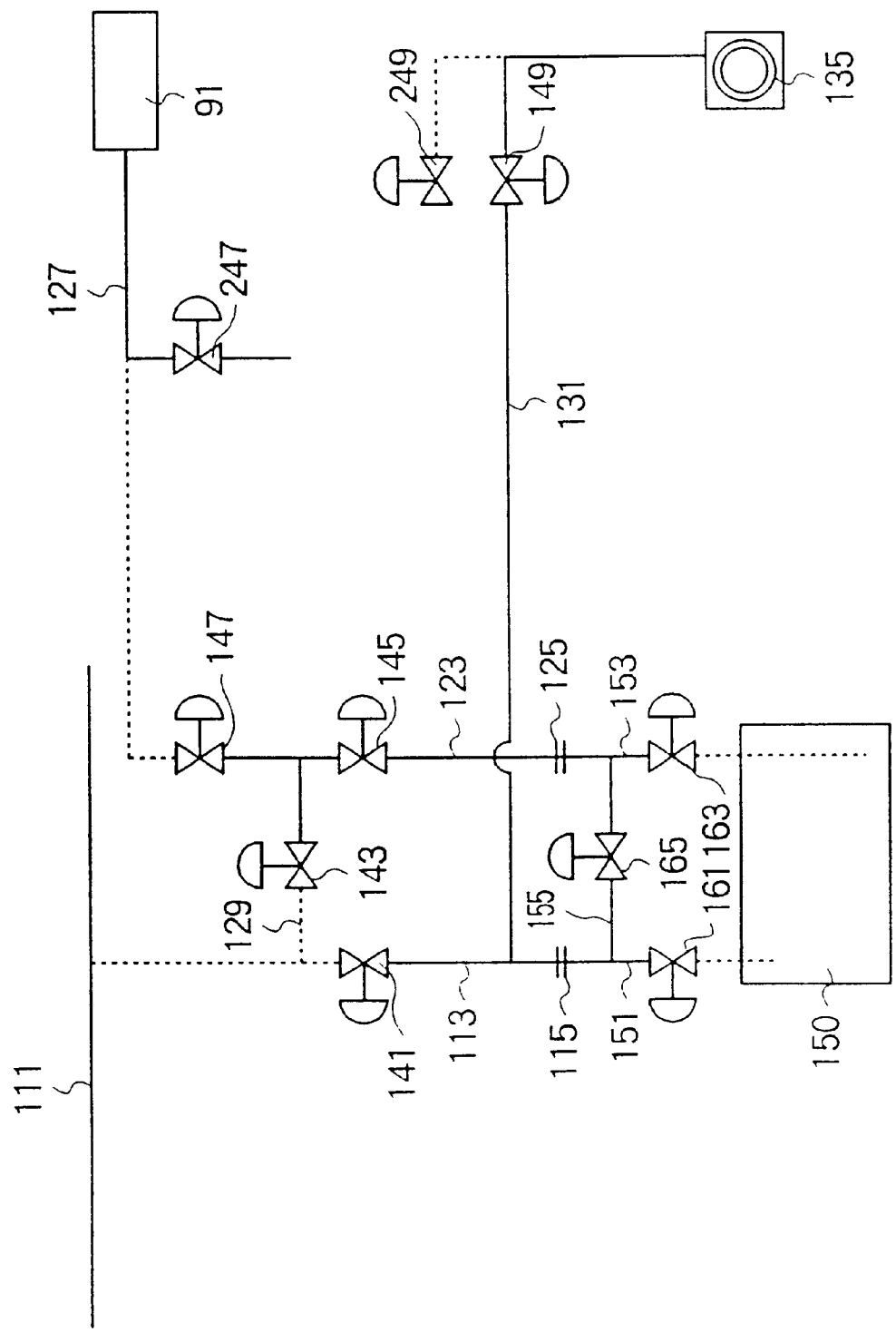
FIG. 9 is a schematic drawing to show the flow of fluid when the apparatus shown in FIG. 2 is in a vacuumizing state.

After the liquid material remaining in the first material line connection pipe 123 and first discharge pipe 153 is returned to the first vessel 150 in this way, the first discharge valve 163 and first gas inlet valve 161 are turned into the closed state and the first line short valve 143 is closed, as shown in FIG. 3 and Table 1. Further, the first pipe connection valve 165 in the interconnection pipe and the first elimination valve 149 are opened and the vacuum pump 135 in the vent line 30 is actuated to change the inside of first discharge pipe 153 etc. into a reduced pressure state, as shown in FIG. 9.

At this time the pump exhaust valve 78 provided in the pump exhaust line is closed, the vacuum pump 135 is actuated, and then the first elimination valve 149 is opened after the vacuum pump 135 brings the pressure of the first exhaust pipe 131 into the stable reduced pressure state.

By opening the first pipe connection valve 165 provided in the first interconnection pipe 155 in this way, the first gas inlet pipe 151 and first discharge pipe 153 can be put into a communicating state. Further, by closing the first gas feed valve 141 and first gas inlet valve 161 and closing the first discharge valve 163 and first supply valve 147, the inside of each of the first gas line connection pipe 113 and first gas inlet pipe 151, being the pressure gas line to-the first vessel 150, and the first discharge pipe 153 and first material line connection pipe 123, being the material supply line of the first vessel 150, can be kept as a closed space. By keeping this closed space in the reduced pressure state by means of the vacuum pump 135, the liquid material remaining deposited inside the first discharge pipe 153 and first material line connection pipe 123 can be evaporated.

Figure 10:
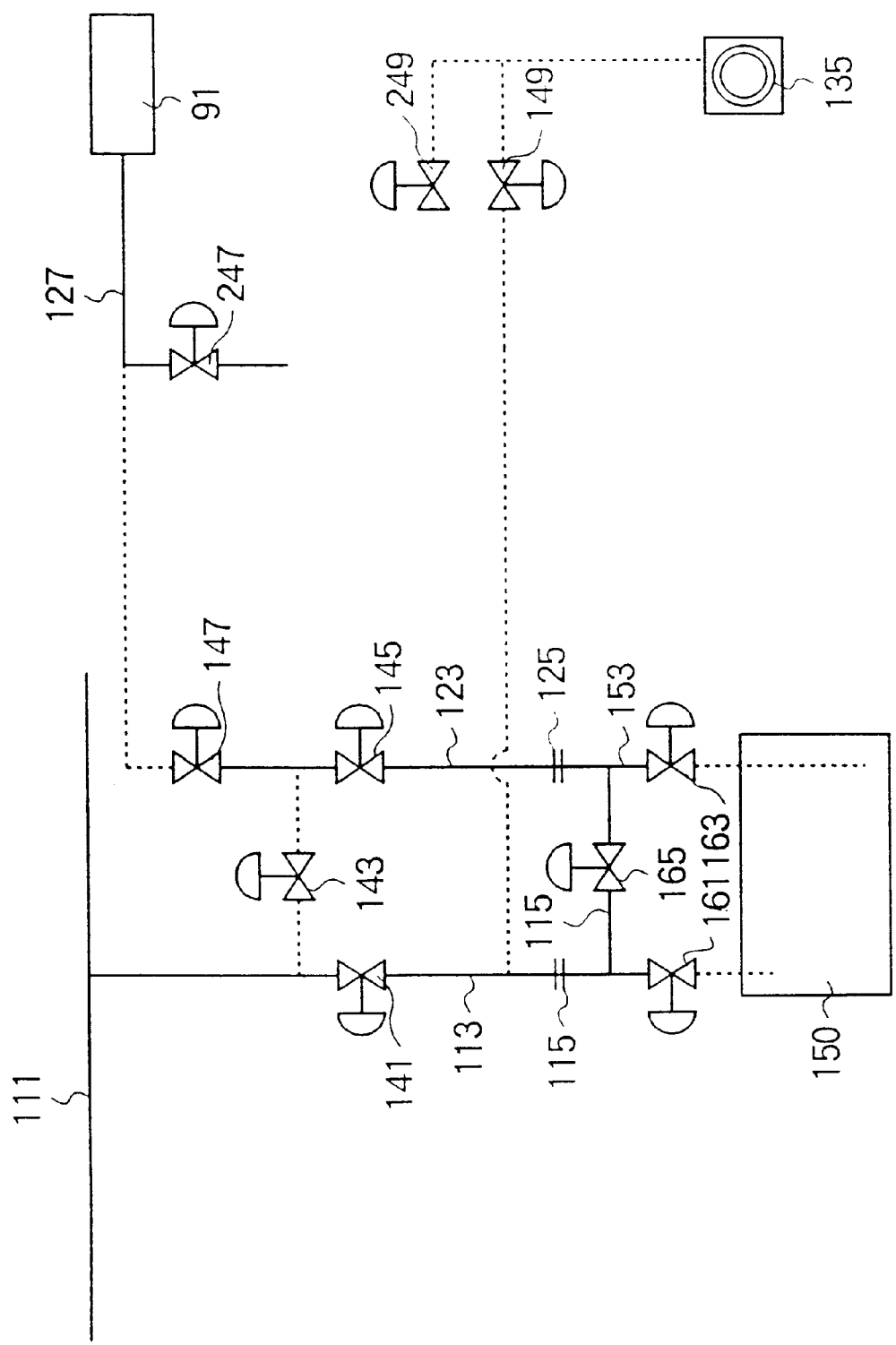
FIG. 10 is a schematic drawing to show the flow of fluid when the apparatus shown in FIG. 2 is in a gas injection state.

Next, the first elimination valve 149 is closed and the first line short valve 143 is opened, thereby feeding the inert gas as pressure gas through the first material line connection pipe 123 to the first discharge pipe 153 or, as shown in FIG. 3 and FIG. 10, the first gas feed valve 141 is opened to feed the pressure gas through the first gas ine connection pipe 113 and the fi rst gas inlet pipe 151 a nd through the first interconnection pipe 155 into the first discharge pipe 153 to establish a gas injection state.

Then, again, the first short valve 143 or the first gas feed valve 141 is closed and the first elimination valve 149 is opened. Therefore, vacuumization can be effected to exhaust the liquid material and the vaporized gas (material gas) of the liquid material, together with the inert gas injected into the closed space of the first discharge pipe 153 etc., to the elimination line 30, and the purge can be carried out by repeating the gas injection and vacuumization.

As described, after the purge by repetition of gas injection and vacuumization is carried out to remove the liquid material and the vaporized gas of the liquid material remaining inside the first discharge pipe 153 and first material line connection pipe 123, replacement of vessel is carried out to remove the first vessel 150 from the first gas line joint 115 and first material line joint 125 and mount a new first vessel 150.

Figure 11:
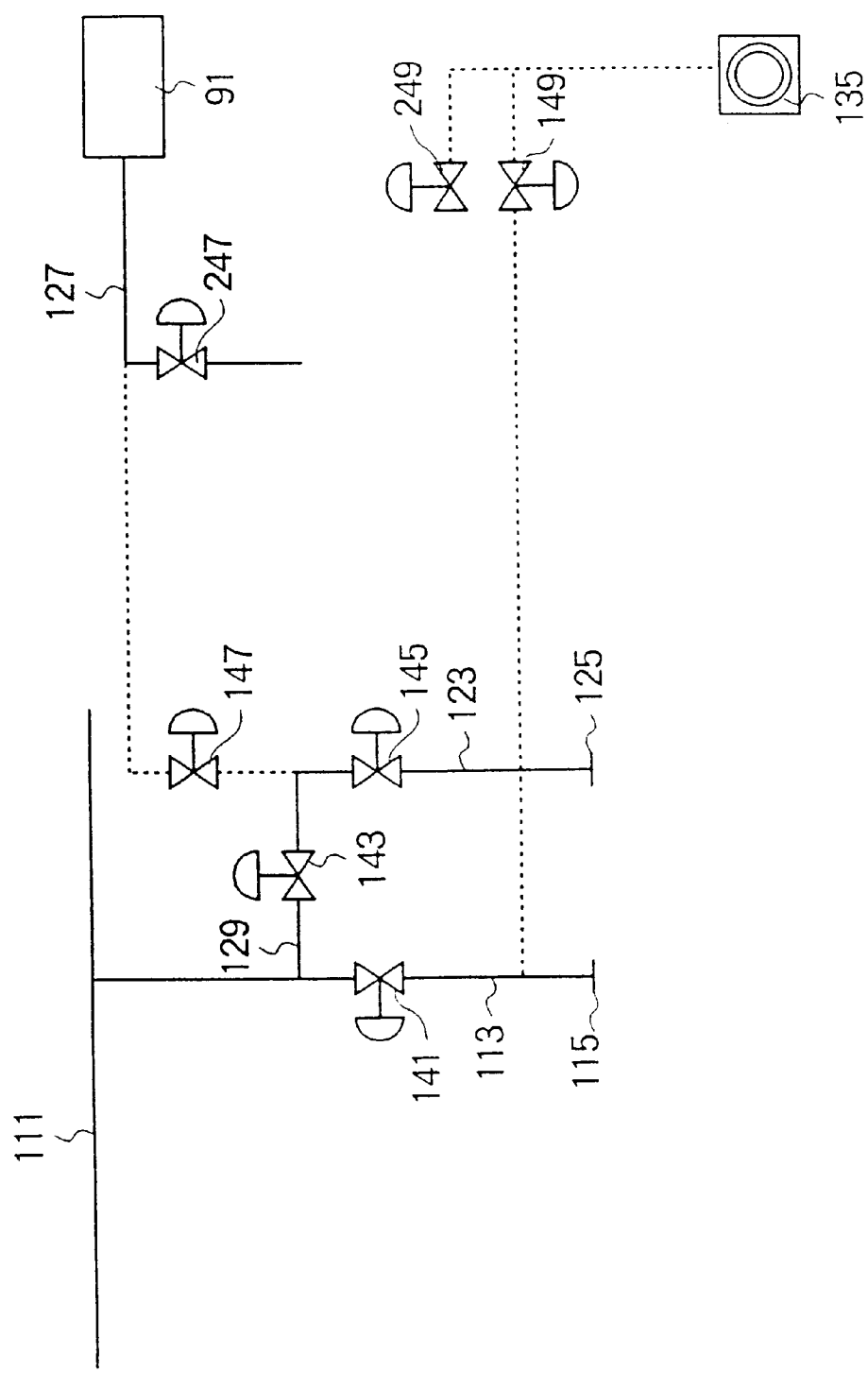
FIG. 11 is a schematic drawing to show the flow of fluid when the apparatus shown in FIG. 2 is in a vessel replacement state.

For removing this first vessel 150, the first elimination valve 149 is closed and the first line short valve 143 and first gas feed valve 141 are opened to turn the inside of the first discharge pipe 153 etc. into a pressurized state, whereupon the first vessel 150 is removed in that state. Accordingly, as shown in FIG. 11, the inert gas from the gas supply pipe 111 blows through the first gas feed valve 141 out of the first gas line connection pipe 113 and the inert gas blows through the first short valve out of the first material line connection pipe 123. By letting the inert gas blowing out of the open ends of the first gas line connection pipe 113 and first material line connection pipe 123 in this way, the external air can be prevented from flowing into the pipes from the ends of gas line connection pipe 113 and material line connection pipe 123 provided with the respective joints 115, 125.

After the new first vessel 150 containing the liquid material is attached, the first line short valve 143 and first gas feed valve 141 are closed and the first pipe connection valve 165 of the first vessel 150 is opened to make the first gas inlet pipe 151 and first discharge pipe 153 communicate with each other, followed by vacuumization as shown in FIG. 4 and FIG. 9.

Further, the first elimination valve 149 is closed, the first line short valve 143 or the first gas feed valve 141 is opened, gas injection is carried out to keep the first discharge pipe 153 etc. in the pressurized state, and the purge by vacuumization and gas injection is carried out to remove water remaining deposited inside of the first discharge pipe 153 etc.

Figure 12:
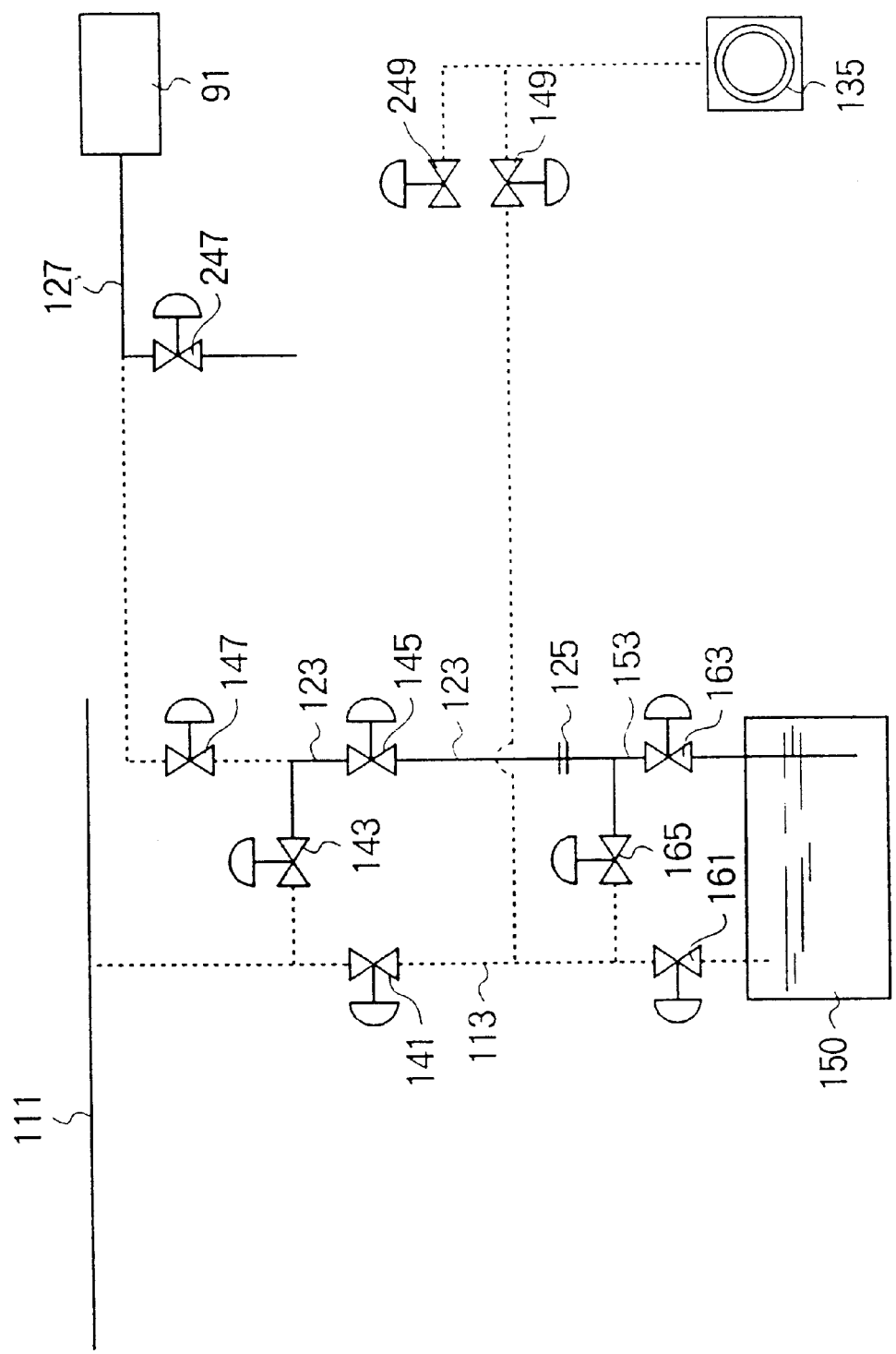
FIG. 12 is a schematic drawing to show the flow of fluid when the apparatus shown in FIG. 2 is in a sucking state of liquid material.
Figure 13:
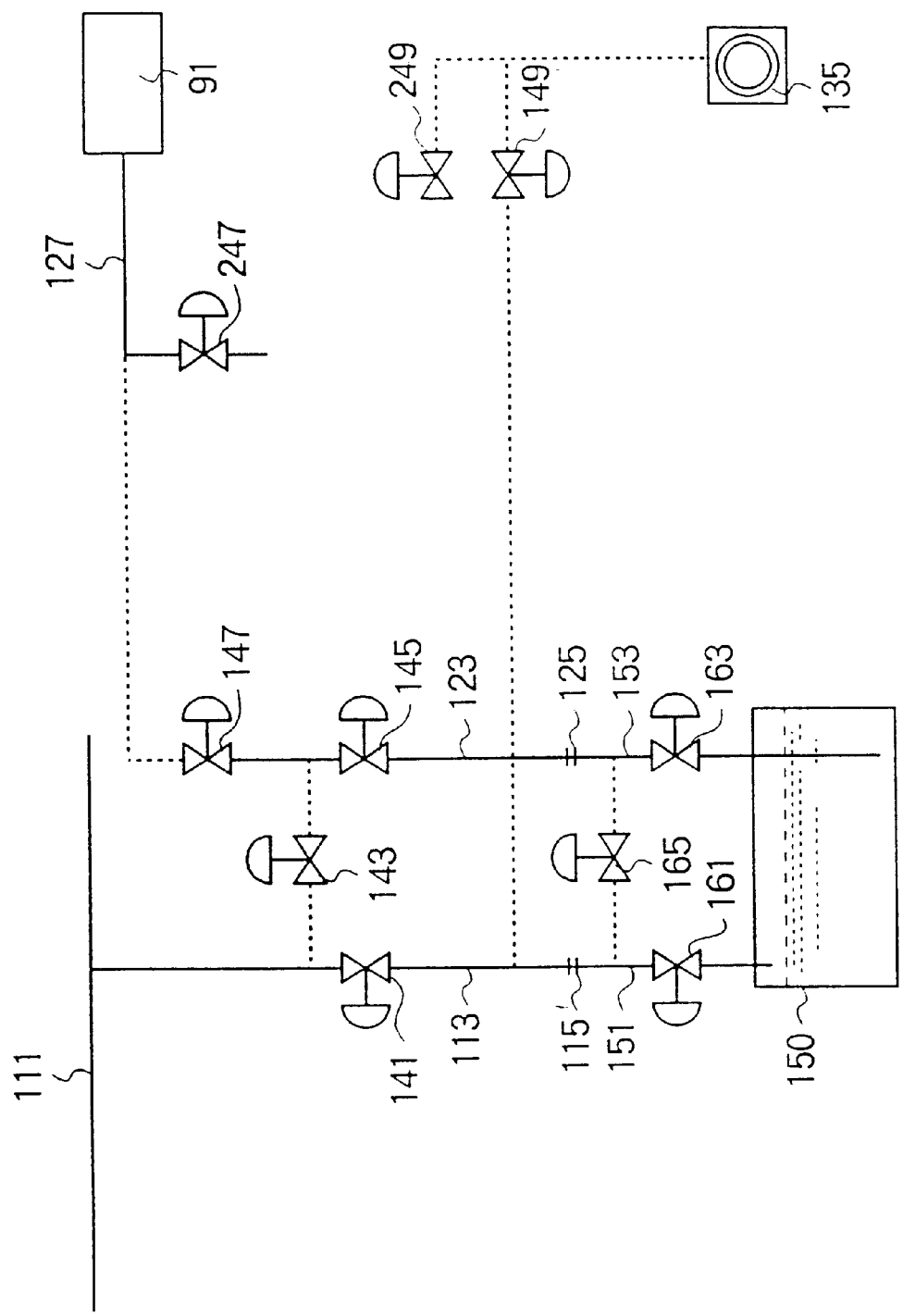
FIG. 13 is a schematic drawing to show the flow of fluid when the apparatus shown in FIG. 2 is in a pressurization and standby state.

After attachment of the new first vessel 150 and execution of the above purge, the first pipe connection valve 165 is closed from the reduced pressure state of the first discharge pipe 153 etc. by the vacuumization shown in FIG. 9 to interrupt communication between the first gas inlet pipe 151 and the first discharge pipe 153. Then, as shown in FIG. 4 and FIG. 12, the first discharge valve 163 is opened to suck the liquid material into the first discharge pipe 153 and the first material line connection pipe 123. Further, the first elimination valve 149 is closed, and the first gas feed valve 141 and first gas inlet valve 161 are opened as shown in FIG. 4 and FIG. 13, to feed the pressure gas into the first vessel 150 to effect the pressurization process on the first vessel 150, whereby the liquid material is charged surely into the first discharge pipe 153 and the first material line connection pipe 123, thereby bringing the first vessel 150 into the standby state.

After that, as shown in Table 1, the standby state of the first vessel 150 is maintain ed while the first gas feed valve 141 is closed. Accordingly, when the liquid material in the second vessel 250 is used up, the liquid material can be supplied from the first vessel 50 to the vaporizer 91 immediately by opening the first supply valve 147 and first gas feed valve 141.

After the liquid material in the second vessel 250 is used up and when supply is switched from the second vessel 250 to the first vessel 150, the same operation is carried out to perform the liquid return of the second vessel 250, purge, replacement of vessel, and purge and pressurization of vessel. Then the second vessel 250 is changed for another vessel during use of the first vessel 150 and the new vessel is brought into the standby state.

Since this liquid material supplying apparatus can be equipped with two vessels as described above, the liquid material can be supplied continuously into the vaporizer 91 by switching of vessel used.

Further, since the vacuum pump 135 is provided in the harm elimination line 30, the purge can be performed surely within a short time by turning the first discharge pipe 153 and the first material line connection pipe 123, or the second discharge pipe 253 and the second material line-connection pipe 223, into the reduced pressure state by means of this vacuum pump 135 to evaporate the liquid material remaining in the pipes. Accordingly, quick and safe replacement of vessel can be carried out.

Further, since the purge is also carried out after replacement of vessel 150, 250 and the liquid material is charged into the inside of the material line connection pipe 123, 223 etc. while keeping the inside of the discharge pipe 153, 253 and material line connection pipe 123, 223 in the vacuumized state, the inside of the material supply line can be kept in a state including neither air nor purge gas. Therefore, upon changeover of vessel 150, 250 used, stable supply of liquid material to the vaporizer 91 can be carried out without mixture of gas or the like into the liquid material.

The above apparatus of the present invention employs the pipe arrangement permitting the work of replacement of vessel and the supply work of liquid material from the vessel to be performed independently. Accordingly, it can solve the problems caused by the replacement of vessel and, in fabrication of synthetic silica glass, silica glass of high quality can be fabricated with causing neither striae nor heterogeneity due to the regular replacement of vessel.

Specifically, if gas remains in the material supply line of liquid material after completion of purge performed after the replacement of vessel, this gas would be fed to the vaporizer 91 at the same time when the liquid material is supplied by switch of vessel used. Since such feed of gas to the vaporizer 91 will cause a state change of vaporizer 91, the line is maintained in a vacuum state after the purge, so as to prevent the gas or the like from remaining in the material supply line. However, since to let the line stand in the vacuum state will be a cause of contamination, the liquid material supplying apparatus is constructed in such an arrangement that the gas inlet valve and discharge valve of the standby vessel are opened and further the gas feed valve and material acceptance valve are also opened to stand by in a state in which the liquid material is charged in each line. Here, if the gas inlet valve and discharge valve of the standby vessel are kept open, the internal pressure of the standby vessel can be monitored at the pressure gage 85, 86, thereby enabling to avoid an over pressure state and to prevent a burst of vessel.

The vent line 30 has, in addition to the vacuum pump 135, the liquid trap 32 and harm eliminating column 33 upstream of the vacuum pump 135, and is arranged in such a manner that the liquid trap 32 stores the liquid material sucked therein from the material line connection pipe 123, 223 or the like, the vaporized gas (material gas) or the like is eliminated by adsorption in the harm eliminating column 33 disposed downstream of the liquid trap 32, and the gas thus sucked is emitted in a harmless form from the material line connection pipe etc. to the atmosphere.

Further, since each vessel 150, 250 has the interconnection pipe 155, 255 for making the gas inlet pipe thereof 151, 251 communicate with the discharge pipe 153, 253, the purge can be carried out quickly and surely by feeding the pressure gas through the interconnection pipe 155, 255 to the discharge pipe 153, 253 and material line connection pipe 123, 223 so as to surely move the gas inside the discharge pipe 153, 253 and inside the material line connection pipe 123, 223.

Figure 14:
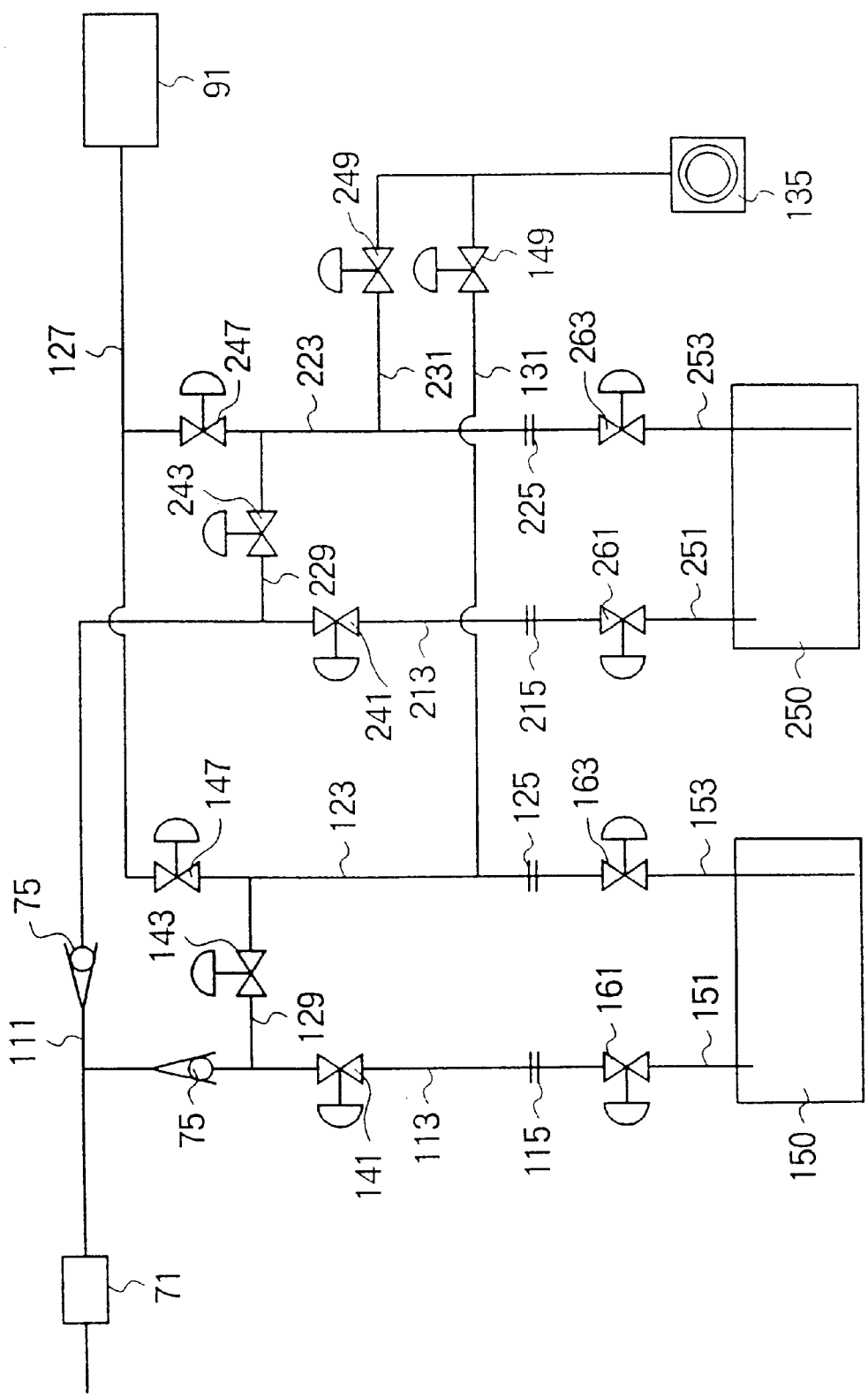
FIG. 14 is a schematic drawing of another example of the liquid material supplying apparatus (an embodiment provided with a plurality of vessels) according to the present invention.

The liquid material supplying apparatus shown in FIG. 2 is constructed in such an arrangement that the first exhaust pipe 131 is connected to the first gas line connection pipe 113 and that the second exhaust pipe 231 is connected to the second gas line connection pipe 213, but the first exhaust pipe 131 and second exhaust pipe 231 may be connected to the first material line connection pipe 123 and to the second material line connection pipe 223, respectively, as shown in FIG. 14.

In the case of another arrangement in which the exhaust pipe 131, 231 is connected to the material line connection pipe 123, 223 with provision of the interconnection pipe 155, 255 for making the gas inlet pipe 151, 251 communicate with the discharge pipe 153, 253 as shown in FIG. 15, without use of the vacuum pump 135 of the vent line 30, the liquid material and the vaporized gas thereof (material gas) can also be eliminated from the inside of the discharge pipe 153, 253 and material line connection pipe 123, 223 by feeding the gas—(pressure gas) through the interconnection pipe 155, 255 to the discharge pipe 153, 253 and letting the gas continuously flow through the discharge pipe 153, 253 and material line connection pipe 123, 223 to the exhaust pipe 131, 231.

Further, the material acceptance valve 145, 245 provided in the material line connection pipe 123, 223 can also be omitted as shown in FIG. 14 and FIG. 15. In such a case that the exhaust pipe 131, 231 is connected to near the material line joint 125, 225, even if the vessel 150, 250 without interconnection pipe 155, 255 is attached as shown in FIG. 14, the purge can be done in such a purge as to let the gas through the by-pass pipe 129, 229 continuously flow immediately near the material line joint 125, 225 being a detached part of vessel 150, 250 or such a combinational purge of gas injection with vacuumization utilizing the vacuum pump.

In combination with the arrangement for permitting two vessels to be attached, two gas supply pipes may be provided as connected to the pressure gas supply 70 so as to accept the inert gas, as shown in FIG. 16. In this case, there are provided first gas supply pipe 111 and second gas supply pipe 211, auxiliary connection pipe 117 for connecting this first gas supply pipe 111 with the second gas supply pipe 211, and an on-off valve as auxiliary connection valve 119 intermediate of this auxiliary connection pipe 117.

Employing this arrangement wherein the first gas supply pipe 111 and second gas supply pipe 211 are provided so as to permit the pressure gas to be supplied to each of the two vessels 150, 250 in this way, it becomes possible to feed the inert gas from the pressure gas supply through the first gas supply pipe 111 to the first vessel 150 and to feed the inert gas from the pressure gas supply through the second gas supply pipe 211 to the second vessel 250. Further, provision of the auxiliary connection pipe 117 with the auxiliary connection valve 119 permits switching of pressure gas supply on the occasion of a trouble occurring in the pressure gas supply, whereby the liquid material can be supplied more certainly to the vaporizer 91 without interruption.

As shown in FIG. 16, the apparatus may be provided with two vacuum pumps 135, 235 in the vent line 30, a first exhaust pipe 131 for connecting the first vacuum pump 135 with the first gas line connection pipe 113 or the first material line connection pipe 123, a second exhaust pipe 231 for connecting the second vacuum pump 235 with the second gas line connection pipe 213 or the second material line connection pipe 223, and an auxiliary exhaust pipe 137 for connecting the first exhaust pipe 131 with the second exhaust pipe 231. An on-off valve is provided as an auxiliary elimination valve 139 in this auxiliary exhaust pipe 137.

In this case, once some trouble occurs in the harm elimination line 30, such as failure of vacuum pump, or a drop of performance of the liquid trap and harm eliminating column, the vacuum pumps 135, 235 can be switched one from another and the purge and replacement of vessel can be carried out thereby.

The first gas line connection pipe 113 and first material line connection pipe 123, and, the second gas line connection pipe 213 and second material line connection pipe 223 are arranged so that the gas inlet pipes and discharge pipes can be attached in connection to the respective connection pipes as setting the first vessel 150 and second vessel 250 close to each other. By disposing the first vessel 150 and second vessel 250 close to each other as described and maintaining one vessel in the standby state, temperatures of the liquid materials in the both vessels 150, 250 naturally become close to each other, so as to cause little change in the temperature of liquid material supplied to the vaporizer 91 at replacement of vessel used, which can prevent variation in vaporization conditions in the vaporizer 91.

Since the present embodiment is arranged to place the vessel and standby vessel under the same environment as described, no difference occurs in the temperature and pressure between the two vessels 150, 250, whereby the temperature and pressure of the liquid material supplied to the vaporizer 91 can be kept constant even after replacement of vessel. As a result, it can stop variation in amount of gas generated in the vaporizer 91 due to the temperature change or the like of the liquid material supplied after replacement of vessel, which has been a problem heretofore.

By constructing the pressure gas lines and material supply lines owned by these vessels 150, 250 in the pipe arrangement for permitting independent work of replacement of vessel and independent supply work of liquid material from vessel, even when one vessel cannot be used because of replacement of vessel or replacement of part or the like, the other vessel can be used to supply the liquid material to the vaporizer 91 without interruption.

Accordingly, continuous supply of liquid material becomes possible by always setting and using two or more vessels capable of supplying the liquid material to the vaporizer 91 as described above.

Each of the above embodiments is provided with the gas inlet valve 161, 261 in the gas inlet pipe 151, 251, the discharge valve 163, 263 in the discharge pipe 153, 253, the interconnection pipe 155, 255 for connecting the gas inlet pipe 151, 251 with the discharge pipe 153, 253, and the pipe connection valve 165, 265 intermediate of this interconnection pipe 155, 255.

However, as shown in FIG. 17, it is also possible to provide cross valves 161, 163, 261, 263 midway in the gas inlet pipe 151, 251 and in the discharge pipe 153, 253 and to provide the interconnection pipe 155, 255 for connecting the gas inlet pipe 151, 251 with the discharge pipe 153, 253, wherein one cross valve 161, 261 is used for changeover among a communication state wherein the inside of interconnection pipe 155, 255 is in communication with the gas line joint 115, 215, a communication state wherein the inside of interconnection pipe 155, 255 is in communication with the inside of the vessel body, and a communication state wherein the inside of the vessel body is in communication with the gas line joint 115, 215 and wherein the other cross valve 163, 263 is used for changeover among a communication state wherein the inside of interconnection pipe 155, 255 is in communication with the material line joint 125, 225, a communication state wherein the inside of interconnection pipe 155, 255 is in communication with the inside of the vessel body, and a communication state wherein the inside of the vessel body is in communication with the material line joint 125, 225. There are some cases to use two cross valves as described above, in place of the arrangement using the three on-off valves, i.e., the gas inlet valve, discharge valve, and pipe connection valve for each vessel 150, 250.

Next, the second preferred embodiment of the liquid material supplying apparatus of the present invention will be described referring to FIG. 18.

The second embodiment of the apparatus according to the present invention has, as shown in FIG. 18, a gas supply pipe 11 and a gas line connection pipe 13 for accepting the inert gas from the pressure gas supply 70 through the regulator 71, filter 73, and flow-rate meter 82, a vessel 50 to which a gas inlet pipe 51 and a discharge pipe 53 are fixed and in which the liquid material is enclosed, and a material line connection pipe 23 and a material supply pipe 27 for feeding the liquid material from the vessel 50 to the vaporizer 91.

Then the pressure gas the pressure of which is regulated constant through the regulator 71 is supplied through the gas supply pipe 11, gas line connection pipe 13, and gas inlet pipe 51 fixed to the vessel 50 to the upper space of the vessel 50. Further, the liquid material in the vessel 50 is fed from the discharge pipe 53 fixed to the vessel 50 through the material line connection pipe 23 and material supply pipe 27 to the vaporizer 91.

Further, the gas line joint 15 detachably connects the gas line connection pipe 13 with the gas inlet pipe 51 and the gas line connection pipe 13 has an on-off valve as a gas feed valve 41 at the other end and is connected to the gas supply pipe 11 by this gas feed valve 41. Also, the material line joint 25 detachably connects the discharge pipe 53 with the material line connection pipe 23 and the material line connection pipe 23 has an on-off valve as a material acceptance valve 45 at the other end and is connected to the material supply pipe 27 by this material acceptance valve 45.

In addition, the gas supply pipe 11 is provided with the pressure switch 81 and mass flow meter 82 and the gas line connection pipe 13 is provided with the pressure gage 85. Then the discharge pipe 53, and the material line connection pipe 23 and material supply pipe 27 connected by the material line joint 25 constitute the material supply line.

In this liquid material supplying apparatus, a by-pass pipe 29 is provided to connect the gas supply pipe 11 with the material line connection pipe 23 and has a line short valve 43 midway therein. The material line connection pipe 23 has a material acceptance valve 45 midway therein, the gas inlet pipe 51 of vessel 50 also has a gas inlet valve 61 midway therein, and the discharge pipe 53 also has a discharge valve 63 midway therein.

Further, this liquid material supplying apparatus is provided with the interconnection pipe 55 for connecting the gas inlet pipe 51 with the discharge pipe 53 and also provided with an on-off valve as a pipe connection valve 65 midway in this interconnection pipe 55. The interconnection pipe 55 connects a portion of the gas inlet pipe 51 on the gas line joint 15 side with respect to the gas inlet valve 61, with a portion of the discharge pipe 53 on the material line joint 25 side with respect to the discharge valve 63.

A by-pass pipe 29 is provided as a branch from the gas supply pipe 11, whereby the pressure gas can be supplied through the by-pass pipe 29 to the material line connection pipe 23 even when the pressure gas is not fed to the gas line connection pipe 13.

Further, the vent line 30 is connected through an exhaust pipe 31 between the material acceptance valve 45 and the supply valve 47 of the material line connection pipe 23. This vent line 30 has the liquid trap 32 and harm eliminating column 33 and connects the exhaust pipe 31 not only through exhaust valve 38 directly to the vacuum pump 35, but also through elimination valve 49, liquid trap 32, harm eliminating column 33, and filter connection valves 34, 36 to the vacuum pump 35.

The above gas supply pipe 11, gas line connection pipe 13, material line connection pipe 23, material supply pipe 27, by-pass pipe 29, and valves etc. provided therein constitute the permanent line P, while the above gas inlet pipe 51, discharge pipe 53, interconnection pipe 55, and valves provided therein constitute the attached line A changed together with the vessel 50 for another. The valves in the present invention may be selected from air valves, electromagnetic valves, and so on.

Each of these on-off valves, pressure gages, and vacuum pump is electrically connected to the control unit 90 as shown in FIG. 18 and the control unit 90 controls each valve on/off operation etc. detailed below. A sequencer or the like incorporating a microcomputer is used as the control unit 90. By controlling the whole of liquid material supplying apparatus by computer as described, improvements can be made in efficiency of work and in prevention of erroneous operation. Also, there occurs no variation in each operation time etc. upon replacement of vessel, thus realizing stable supply of liquid material.

Next, the second preferred embodiment of the liquid material supplying method according to the present invention will be described referring to FIG. 19 to FIG. 28. The second embodiment of the method according to the present invention is carried out using the second embodiment of the above apparatus according to the present invention and its timing chart is illustrated in FIG. 19.

In this liquid material supplying apparatus, when the exhaust valve 38 and elimination valve 49 of the harm elimination line 30 are closed to close the exhaust pipe 31 and when the line short valve 43 of by-pass pipe 29 and the pipe connection valve 65 of interconnection pipe 55 are closed as shown in FIG. 19, the pressure gas can be supplied through the gas supply pipe 11, gas line connection pipe 13, and gas inlet pipe 51 into the vessel 50, as shown in FIG. 20. Then the liquid material contained in the vessel 50 can be supplied through the discharge pipe 53, material line connection pipe 23, and material supply pipe 27 to the vaporizer 91.

Upon replacement of vessel, since this liquid material supplying apparatus is provided with the interconnection pipe 55 for connecting the gas inlet pipe 51 with the discharge pipe 53 and also provided with the pipe connection valve 65 in this interconnection pipe 55, the liquid material such as silicon tetrachloride remaining inside the discharge pipe 53 and material line connection pipe 23 can be removed surely by opening the pipe connection valve 65 provided in this interconnection pipe 55.

Specifically, in this liquid material supplying apparatus, when the liquid material remains little in the vessel 50 to raise a need for replacement of vessel 50 containing the liquid material, the supply valve 47 is first closed, the gas inlet valve 61 and discharge valve 63 are closed, and thereafter the elimination valve 49 is opened. opening the elimination valve 49 in this way forms a purge line of exhaust pipe 31 for connecting the material line connection pipe 23 with the vent line 30. Then the purge can be carried out by opening the pipe connection valve 65 to make communication between the gas inlet pipe 51 and the discharge pipe 53.

When the pipe connection valve 65 provided in the interconnection pipe 55 is opened as described instead of the line short valve 43 provided in the by-pass pipe 29, the pressure gas flows from the gas supply pipe 11 through the gas line connection pipe 13, across the gas line joint 15, and through the gas inlet pipe 51 and interconnection pipe 55 on the vessel 50 side into the discharge pipe 53. Then the pressure gas passes from the discharge pipe 53 across the material line joint 25 through the material line connection pipe 23 and through the exhaust pipe 31 into the harm elimination line 30. Accordingly, the gas flows inside the discharge pipe 53 and material line connection pipe 23 located before and after the material line joint 25, so that the liquid material remaining inside the discharge pipe 53 and material line connection pipe 23 can be eliminated quickly and surely.

Further, since this liquid material supplying apparatus has the vacuum pump 35 in the harm elimination line 30, when the gas feed valve 41 or the pipe connection valve 65 is closed while keeping the gas inlet valve 61 and discharge valve 63 closed, a reduced pressure state can be established inside of the material line connection pipe 23 and inside of the discharge pipe 53 connected to this material line connection pipe 23 by the material line joint 25.

As described, not only by feeding the pressure gas to the exhaust pipe 53 and material line connection pipe 23, but also by turning the inside of the exhaust pipe 53 and material line connection pipe 23 into the reduced pressure state, the liquid material remaining in the discharge pipe 53 and material line connection pipe 23 can be removed as being vaporized and dried by the reduced pressure so as to realize a purged state quickly and surely, whereupon the material line joint and the like can be disconnected. Accordingly, the work of replacement of vessel can be performed safely.

Then the vent line 30 is constructed of the liquid trap 32, harm eliminating column 33 provided downstream thereof, and vacuum pump 35 provided further downstream thereof. Accordingly, the liquid material in the discharge pipe 53 and material line connection pipe 23, when vacuumized, becomes volatilized and sucked to flow into the liquid trap 32 in this vent line 30. After that, the gas of liquid material volatilized in the liquid trap 32 is eliminated by the harm eliminating column 33 to be emitted through the vacuum pump 35 into the air or to be exhausted to a harm eliminating device (not shown) attached outside.

This harm eliminating column 33 includes an absorbent for absorbing the liquid material inside. It absorbs the liquid material and material gas flowing thereinto and lets harmless nitrogen gas or the like pass. However, if a lot of liquid material directly flows into the column, the absorbent will fail to absorb the material completely and the liquid material will flow into the vacuum pump 35. If a large amount of liquid material flowed into the harm eliminating column 33, the absorbent would undergo a chemical reaction to raise a risk of heat generation or ignition. Therefore, the liquid trap 32 is provided upstream of the harm eliminating column 33, thereby preventing the liquid material from directly flowing into the harm eliminating column 33.

As described, the liquid trap 32 plays a role to prevent the gas of liquid material from flowing into the harm eliminating column 33, so as to protect the harm eliminating column 33 and so as to raise harm eliminating efficiency. The harm eliminating column 33 functions not only to eliminate the gas of liquid material, but also to prevent reverse diffusion of oil from the vacuum pump 35 of oil rotary type.

Use of such vent line 30 having the vacuum pump 35 allows a perfect purge to be performed within a short time from the inside of the discharge pipe 53 and material line connection pipe 23, which were not easy to purge sufficiently even with a sufficient time before.

This liquid material supplying apparatus is not arranged only simply to continue flow of the pressure gas or reduced-pressure suction in replacement of vessel 50, but is arranged to perform each of the processes of material return, vacuumization, and gas injection as shown in FIG. 21 by operation of each valve, thereby carrying out the purge of the discharge pipe 53 and material line connection pipe 23 further more surely. In this case, when a vacant vessel 50 is removed, the liquid material can be prevented from leaking out of the end of discharge pipe 53 and of the material line joint 25 and harmful volatile components or the like can be surely prevented from being scattered. On/off states of each valve in such sequential operation are shown in Table 2 below.

TABLE 2

| MODE VALVE | MATERIAL RETURN | PURGE VACUUM-VACUUMIZATION | INJECTION OF GAS |
|---|---|---|---|
| GAS FEED VALVE 41 | X | X | ○ |
| GAS INLET VALVE 61 | ○ | X | X |
| LINE SHORT VALVE 43 | ○ | X | X |
| MATERIAL ACCEPTANCE VALVE 45 | ○ | ○ | ○ |
| DISCHARGE VALVE 63 | ○ | X | X |
| PIPE CONNECTION VALVE 65 | X | ○ | ○ |
| SUPPLY VALVE 47 | X | X | X |
| ELIMINATION VALVE 49 | X | ○ | X |
| FILTER CONNECTION VALVE 34 | ○ | ○ | ○ |
| FILTER CONNECTION VALVE 36 | ○ | ○ | ○ |
| EXHAUST VALVE 38 | X | X | X |

Specifically, the procedure of this replacement of vessel is such that the supply valve 47 is closed from the state shown in FIG. 20 to cut material supply to the vaporizer 91 and, as shown in FIG. 19 and FIG. 22, the gas feed valve 41 is closed to stop supply of pressure gas through the gas inlet pipe 51 into the vessel 50. Further, the line short valve 43 in the by-pass pipe 29 is opened to feed the pressure gas directly to the material line connection pipe 23, thereby returning the material remaining inside of the material line connection pipe 23 and discharge pipe 53 into the vessel 50.

At this time the gas inlet valve 61 and pipe connection valve 65 are preferably closed as shown in Table 2.

Then the vacuum pump 35 of the vent line 30 is actuated, the discharge valve 63 in the discharge pipe 53 and the line short valve 42 in the by-pass pipe 29 are closed while keeping the gas inlet valve 61 and pipe connection valve 65 closed, and the elimination valve 49 is opened. In this way the pressure is reduced at least inside of the discharge pipe 53 and material line connection pipe 23. Further, as shown in FIG. 19 and FIG. 23, vacuumization may be carried out as also keeping the inside of the gas line connection pipe 13 in the reduced pressure state, as well as the inside of the material line connection pipe 23, by opening the pipe connection valve 65.

After execution of vacuumization as described, as shown in FIG. 19 and FIG. 24, the elimination valve 49 is closed, and the gas feed valve 41 is opened to effect gas injection to turn the inside of the discharge pipe 53 and material line connection pipe 23 into a pressurized state. Thereafter, the gas injection and vacuumization process are repeated by manipulating on/off of the elimination valve 49 and gas feed valve 41.

At this time, as shown in Table 2, the valves other than the gas feed valve 41 and elimination valve 49 can be fixed in an open state or in a close state.

This purge is a purge by repetition of vacuumization and gas injection, as described above. If vacuumization could achieve a high vacuum, the liquid material would be volatilized and sucked perfectly. However, the degree of vacuum achieved by the vacuum pump 35 is approximately 0.01 to 0.1 atm, and thus vacuumization is carried out several times.

After repeating the gas injection and vacuumization a necessary number of times as described, the line short valve 43 is opened from the state of gas injection and the vessel 50 is removed from the gas line joint 15 and material line joint 25, thereby permitting the vessel 50 to be replaced by a new vessel 50.

Changeover between gas injection and vacuumization can be carried out not only by the on/off switching operation of the gas feed valve 41 and elimination valve 49, but also by the on/off switching operation of the pipe connection valve 65 and elimination valve 49.

On this occasion, the vessel 50 is removed as opening the line short valve 43 of the by-pass pipe 29 from the state in which the inside of the gas inlet pipe 51 and discharge pipe 53 is pressurized by the pressure gas, whereupon, as shown in FIG. 25, the pressure gas from the gas supply pipe 11 is emitted from the end of the gas line connection pipe 13 and the pressure gas can also be emitted through the by-pass pipe 29 from the end of material line connection pipe 23.

By removing the vessel 50 as emitting the pressure gas from the end of gas line connection pipe 13 and from the end of material line connection pipe 23 as described, the outside atmosphere can be prevented from flowing into the gas line connection pipe 13 and into the material line connection pipe 23 from which the vessel 50 is removed.

After the new vessel 50 is attached, the line short valve 43 and gas feed valve 41 are closed as shown in FIG. 19 and the elimination valve 49 is opened to achieve the on/off states of valves shown in FIG. 23, followed by vacuumization. After that, gas injection and vacuumization are repeated by performing on/off operation of the elimination valve 49 and gas feed valve 41.

Such execution of purge also after attachment of vessel 50 can surely remove water and atmospheric components attached to the gas inlet pipe 51 and discharge pipe 53 through the vent line 30.

Then, from the state of vacuumization the pipe connection valve 65 and elimination valve 49 are closed and the discharge valve 63 is opened, thereby sucking the liquid material in the vessel 50 into the inside of the material line connection pipe 23 and discharge pipe 53 in the reduced pressure state.

After that, the gas feed valve 41 and gas inlet valve 61 are opened to feed the pressure gas into the vessel 50 and the supply valve 47 is opened, whereby the liquid material in the vessel 50 can be fed to the vaporizer 91.

Further, the liquid material supplying apparatus provided with the interconnection pipe 55 for connecting the gas inlet pipe 51 with the discharge pipe 53 of vessel 50 as described can also perform such a purge as to open the gas feed valve 41 and pipe connection valve 65 and to let the pressure gas continuously flow from the exhaust pipe 31 to the harm eliminating column 33 and the like.

Also in this case, since the pressure gas is made to flow through the material line joint 25 upon removal of vessel 50, the liquid material remaining inside the discharge pipe 53 and material line connection pipe 23 can be fed to the exhaust pipe 31 within a short time even without execution of vacuumization.

In the above embodiment the exhaust pipe 31 branches out from the material line connection pipe 23 on the vaporizer 91 side, but, as shown in FIG. 26, the exhaust pipe 31 may branch out from the joint side in the material line connection pipe 23 with respect to the material acceptance valve 45.

Also in this case, a sure purge can be effected by performing the purge by vacuumization and gas injection according to the procedure shown in FIG. 21.

Further, it is also possible to perform a continuous purge to open the gas feed valve 41 and pipe connection valve 65 and to feed the pressure gas from the exhaust pipe 31 to the harm eliminating column 33 etc., as shown in FIG. 27.

Also in this case, since the pressure gas is made to flow through the material line joint 25 upon removal of vessel 50, the liquid material remaining inside the discharge pipe 53 and material line connection pipe 23 can be fed to the exhaust pipe 31 within a short time.

Further, when the exhaust pipe 31 branches out from the joint side in the material line connection pipe 23 with respect to the material acceptance valve 45, as shown in FIG. 26 and FIG. 27, there are some cases using, together with purge 1 to let the pressure gas flow through the interconnection pipe 55 and discharge pipe 53 as shown in FIG. 27, purge 2 to open the line short valve 43 of by-pass pipe 29 and the material acceptance valve 45 of material line connection pipe 23 to let the pressure gas flow through the by-pass pipe 29 as shown in FIG. 28. Also in this case, the liquid material remaining inside the material line connection pipe 23 can be eliminated within a short time, without using vacuumization in combination.

Next described are preferred conditions in supplying the pressure gas to the vessel in the present invention.

Specifically, in the above liquid material supplying apparatus, as shown in FIG. 2 and FIG. 18, the gas feed valve 41, 141, 241 is set in the pressure gas line for pressure-supplying the liquid material, the pressure gage 85, 86 for monitoring the internal pressure of vessel is set downstream thereof, and these valve and pressure gage are electrically connected to the control unit 90. In the foregoing embodiments, the pressure gas is supplied to the vessel 50, 150, 250 while the pressure of the pressure gas is set to a value at least 0.5 kg/cm$^2$ higher than the internal pressure of vessel, i.e., while a pressure difference becomes at least 0.5 kg/cm$^2$. Then, the internal pressure of vessel can be maintained in a desired range by starting pressurization by the pressure gas when the internal pressure of vessel becomes lower than set lower limit pressure (L) and by stopping pressurization when the internal pressure becomes higher than set upper limit pressure (H), i.e., by opening/closing the gas feed valve 41, 141, 241, based on indications of pressure gage.

Since the valve 41, 141, 241 of the pressure gas line is opened only upon pressurization as described, the liquid material and vaporized material gas can be completely interrupted from reversely diffusing into the pressure gas line. Accordingly, because this valve of the pressure gas line was always opened conventionally, reverse diffusion occurred so as to be causes of corrosion and contamination of the pressure gas line; whereas, it becomes possible to prevent the corrosion and contamination sufficiently by supplying the pressure gas according to the above conditions. Metal touching the ambience of corrosive material, even a corrosion resisting material such as SUS316L, undergoes corrosion with an acid such as hydrochloric acid generated by reaction between the water in the air and the liquid material. Once corrosion occurs, even a little, in the pressure gas line, the inside of vessel and vaporizer will be contaminated by metal impurities, and silica glass synthesized using such material will be degraded in transmittance and in resistance to laser.

The above pressure of pressure gas may be set manually by a pressure regulator, but it may also be electrically set at +0.5 kg/cm$^2$ as feeding the pressure in the vessel back to the control unit. The pressure inside the vessel may be set to 1.2 or more kg/cm$^2$, which is the sum of the internal pressure of vaporizer (usually, 1 kg/cm$^2$) and a pressure loss of pipe (usually, 0.2 kg/cm$^2$). However, the pressure is usually set preferably at 2.0 kg/cm$^2$, in consideration of the change in the temperature, the height of liquid level of liquid material, and so on.

When employing the method for starting pressurization by the pressure gas when the internal pressure of vessel becomes lower than the set lower limit pressure and for stopping pressurization when the pressure becomes higher than the set upper limit pressure as described above, a difference between the set lower limit pressure and the set upper limit pressure is preferably set in a width free of influence of fine pressure change due to on/off of valve. On the other hand, a too small width would cause so-called chattering to repeat frequent on/off of valve in a short time. Therefore, the difference between the set lower limit pressure and the set upper limit pressure is set preferably to be at least 0.2 kg/cm$^2$.

Next described is the burst preventing device suitably applicable to the liquid material supplying apparatus of the present invention.

Specifically, if the internal pressure of vessel should exceed the withstanding pressure of vessel because of a certain cause such as an accident or fire, the vessel could burst. Thus, in order to prevent or avoid a secondary disaster, the vessel 50, 150, 250 in the above liquid material supplying apparatus is provided with the burst preventing device 56, 156, 256 shown in FIG. 30.

Since this is constructed considering the cases wherein the control becomes electrically disabled upon the accident, fire, etc. or the cases wherein anomaly occurs in the supply line of pressure gas so as to pressurize the vessel abnormally, a rupture disc 57 is arranged to burst before the pressure inside the vessel exceeds the withstanding pressure of vessel, thereby preventing a burst of vessel 50.

However, even if the temporal risk could be avoided, continuous emission of liquid material into the air would cause another secondary disaster in some cases. If the burst preventing device is constructed in the structure to be actuated only by pressure, such as a safety valve, there remains some uneasiness on the vessel to be kept in a closed state, during the normal operation of apparatus. Specifically, the inside of vessel could be contaminated with the air and the peripheral devices including the lines could be contaminated thereby.

Accordingly, the above preferred burst preventing device of the present invention is arranged, as shown in FIG. 30, to have a blow-off pipe 56, to fix a rupture disc 57 of a stainless steel thin plate with a seal so as to hermetically close the vessel 50, and to place a sharp cutter 58 outside the rupture disc 57.

By placing the metal rupture disc 57 and cutter 58 as described, when the pressure inside the vessel 50 becomes abnormally high, the rupture disc 57 expands to the outside to burst upon contact with the cutter 58, thereby enabling to emit the gas inside through the opening of the blow-off pipe 56.

In addition, a valve body 59 as a safety valve is further provided outside of this rupture disc 57 and the valve body 59 is arranged to be lifted after the rupture disc 57 has burst to increase the internal pressure of the valve body 59 to a high pressure, thereby releasing the internal pressure. After the internal pressure returns to normal, the valve body 59 is returned by the self weight of valve body 59 or by appropriate force of an elastic member to close the valve, whereby the gas including harmful components in the vessel 50 can be prevented from leaking through this blow-off pipe 56.

As described, the burst preventing device suitable for the present invention has the double structure, wherein when the pressure inside the vessel 50 increases abnormally (8 or more kg/cm$^2$, for example), the SUS thin plate (rupture disc 57) first starts deforming, it will contact the cutter 58 set above it, and the SUS thin plate is cut by this cutter 58. This allows the internal pressure of vessel 50 to escape to between the SUS thin plate and the valve body 59 as a safety valve set thereabove. Here, if the internal pressure of vessel 50 further increases and approaches the withstanding pressure of vessel 50 (9.9 kg/cm$^2$, for example), the safety valve operates to release the internal pressure of vessel 50 into the air. Thereafter, when the internal pressure of vessel 50 becomes greatly lower than the withstanding pressure (2 or less kg/cm$^2$, for example), the safety valve 59 is closed automatically, thereby stopping the release of pressure into the air.

By constructing the burst preventing mechanism in such structure, no liquid material is emitted into the air and contamination of vessel 50 etc. can be prevented even with some trouble such as erroneous operation of the safety valve or failure of on/off, as long as the rupture disc 57 in direct contact with the ambience in the vessel 50 is kept from bursting.

COMPARATIVE EXAMPLE 1

Figure 1:
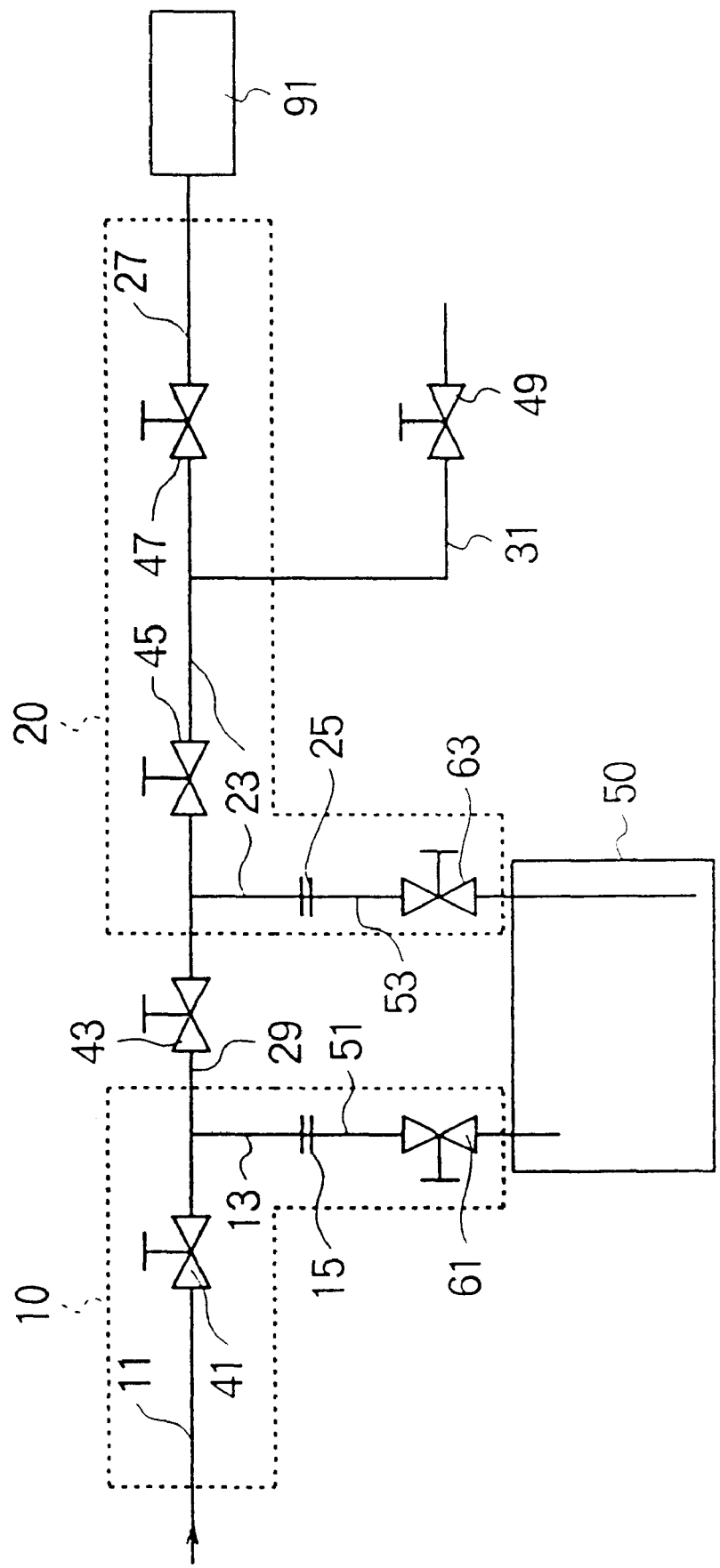
FIG. 1 is a schematic drawing of an example of the conventional liquid material supplying apparatus.

The liquid material of silicon tetrachloride charged in the vessel 50 of the conventional liquid material supplying apparatus shown in FIG. 1 was distilled and vaporized in the vaporizer 91 to generate high-purity silicon tetrachloride gas (raw-material gas). The raw-material gas thus obtained was guided to the reaction system and was ejected from the central portion of a multi-tube burner made of silica glass into the oxyhydrogen flame as diluted with carrier gas, thereby synthesizing a high-purity synthetic silica glass ingot by the method called the so-called direct method (Direct Method). Here, nitrogen gas was used as the pressure gas for pressure-supplying the liquid material of silicon tetrachloride stored in the vessel 50 to the vaporizer 91 and as the pressure gas for purge.

Supply of the liquid material to the vaporizer 91 was carried out as monitoring the weight of vessel 50 and the vessel was interchanged for an alternate vessel, based on a remaining amount of the liquid material (not more than 5 kg). Therefore, the restraint time of worker was long and the work for replacement of vessel 50 required some experience. In addition, the purge was carried out upon replacement of vessel 50 in order to prevent contamination of the pressure gas line 10 and material supply line 20, which resulted in discontinuous supply of the liquid material to the vaporizer 91.

The high-purity silica glass ingot having the diameter of 250 mm and the height of 500 mm was synthesized by the above apparatus. A side surface of this obtained ingot normal to the direction of growth was processed for examination of striae and observed to check striae by the projection method. As a result, striae were detected in the high-purity silica glass ingot. This heterogeneous layer different from the other portions is considered to be formed due to mixture of purge gas and change in amount of gas supplied to the reaction system.

EXAMPLE 1

Using the liquid material supplying apparatus having the two vessels and equipped with the vent line 30 as shown in FIG. 2, high-purity silica glass was synthesized according to the timing charts shown in FIG. 3 and FIG. 4. Specifically, the liquid material of silicon tetrachloride was distilled and vaporized in the vaporizer 91 to generate high-purity silicon tetrachloride gas (raw-material gas). The raw-material gas thus obtained was guided to the reaction system and was ejected from the central portion of the silica glass multi-tube burner into the oxyhydroden flame as diluted with carrier gas, thereby synthesizing high-purity silica glass having the diameter of 250 mm and the height of 500 mm by the direct method. Nitrogen gas was use d as the pressure gas for pressure-supplying the liquid material of silicon tetrachloride stored in the vessel 150, 250 to the vaporizer 91 and as the pressure gas for purge.

Upon replacement of vessel, repetitive purges by the vacuumization using the vacuum pump of the vent line 30 and the gas injection by introduction of gas were carried out for purging the liquid material remaining in the pressure gas line and material supply line. Additionally, control of each valve was automated under computer control, thereby reducing the purge time and eliminating a human operational error. The number of repetitive purges of vacuumization and gas injection was detected by a counter, and pressurization and pressure-reduction times in gas injection and vacuumization were detected by respective timers, thereby allowing free selection of each. Therefore, the conditions such as the time and the number of purges were able to be changed readily.

The method for pressure-supplying the liquid material to the vaporizer 91 will be described specifically with the apparatus of FIG. 2.

The pressure gas was supplied through the regulator 71 and filter 73. In addition to the pressure switch 81 and check valve 75, the gas feed valves 141, 241 and the pressure gages 85, 86 downstream thereof were set in the pressure gas line. The pressure switch 81 was for detecting a decrease in the pressure of the pressure gas, and the pressure gage 85, 86 monitored the internal pressure of vessel 150, 250.

In this example, the pressure gas was set at a pressure value (5 kg/cm$^2$) higher than the internal pressure (2 kg/cm$^2$) of the vessel 150, 250. The gas feed valve 141, 241 in the pressure gas line was opened only upon pressurization in order to prevent the reverse diffusion of liquid material, which could be a cause of contamination of line.

Reflecting the monitoring results of the pressure gage 85, 86, the internal pressure of vessel 150, 250 was set at a desired value throughout supply of liquid material by on/off of the gas feed valve 141, 241. In order to avoid the worst case, for example, an event in which some cause such as an accident or fire could turn the internal pressure of vessel 150, 250 into an over pressure state, so as to result in bursting the vessel 150, 250, there was provided the burst preventing mechanism of vessel for opening/closing the exhaust valve 149, 249, based on the monitor results of the pressure gage 85, 86, to guide the liquid material of line to the vent line 30.

Namely, the program was such that the exhaust valve 149, 249 was normally closed, but it would be opened when the internal pressure of vessel monitored by the pressure gage 85, 86 exceeded 3.0 kg/cm$^2$.

For protection of vacuum pump 135, the harm eliminating column 33 etc. were set upstream of the pump in the vent line 30. This harm eliminating column 33 also functions to stop the reverse diffusion of oil from the vacuum pump 135.

The pressure gage 87 was set so as to permit automatic shutoff of line when upon vacuumization and gas injection, the pressure of the vent line which had the exhaust valves 149, 249 at the respective ends and to the other end of which the vacuum pump was connected became unable to be kept in a vacuum because of a trouble of the vacuum pump or the like. Since the present example is provided with one vent line 30, it is sufficient to detect the pressure at a portion either between the first harm eliminating valve 149 and the vent line 30 or between the second harm eliminating valve 249 and the vent line 30.

With an example wherein the vessel 150, 250 is removed at the joints and the liquid material is supplied from the other vessel, the control operation of each line in supply of liquid material, replacement of vessel, and so on by the apparatus of the two systems will be described every mode, using the timing charts shown in FIG. 3 and FIG. 4 and Table 1.

First, the remaining liquid in the pipes was returned into the vessel for ten seconds (liquid return). Next, vacuumization and gas injection were carried out in the pipes. The inside of the pipes was vacuumized for a time set by the timer (for one minute) by the vacuum pump, and thereafter the inside of the pipes was filled with nitrogen gas (for five seconds). This was repeated a number of times set by the counter (100 time) (purge), thereafter the vacant vessel was disconnected at the joints, and a new vessel filled with the liquid material was connected (replacement of vessel).

Next, for making the vessel standing by in the ready-for-use state, vacuumization and gas injection were again carried out in the same manner as above to remove the air mixed in the pipes because of the replacement of vessel. However, the process was finally ended in a vacuum state so as to prevent the nitrogen gas from remaining in the pipes (purge). Further, the inside of vessel was pressurized with nitrogen gas until the internal pressure of vessel reached the set upper limit of pressure gage, 2.2 kg/cm$^2$, in order to prevent the inside of pipe in the vacuum state from being contaminated and in order to keep the new vessel ready for use at any time (pressurization). Finally, in order to maintain the internal pressure of the new vessel, to keep the liquid material ready for supply at any time, and to detect the over pressure state or anomaly of the internal pressure of vessel, the vessel was made to stand by as monitoring the internal pressure of vessel on the pressure gage (standby).

In the high-purity silica glass ingot obtained by the above apparatus for supplying the liquid material to the vaporizer 91, any striae due to replacement of vessel were not detected, because there was no variation in various conditions upon switch of vessel at all and because stable supply of liquid material was carried out.

The present example was able to make the apparatus cheaper and smaller than the apparatus of Example 2. However, since the pressure gas supply is shared, for example when the joints are disengaged, it is conceivable that the liquid material could reversely diffuse at the other joint from the vessel because of the relation of magnitude of pressure. It was thus necessary to keep the gas feed valve of the used vessel closed on that occasion.

EXAMPLE 2

In the apparatus with the vessels each independently having the pressure gas line, vent line, and so on, as shown in FIG. 16, the liquid material of silicon tetrachloride was used to be distilled and vaporized in the vaporizer 91, thereby generating high-purity silicon tetrachloride gas (raw-material gas). The raw-material gas thus obtained was guided to the reaction system and was emitted from the central portion of silica glass multi-tube burner into the oxyhydrogen flame as diluted with carrier gas, thus synthesizing a high-purity synthetic silica glass ingot by the direct method. Nitrogen gas was used as the pressure gas for pressure-supplying the liquid material of silicon tetrachloride stored in the vessel to the vaporizer 91 and as the pressure gas for purge.

Upon replacement of vessel repetitive purges of vacuumization using the vacuum pump and gas injection were employed as the purge for removing the liquid material remaining in the pressure line and material supply line. It was also automated by computer control, thereby reducing the purge time and completely excluding the human operational errors. The number of repetitive purges of vacuumization and gas injection was arranged to be freely selected by a counter and times of vacuumization and pressurization by gas were also arranged to be freely selected by timer. Therefore, the conditions of the time and number of purges were able to be changed readily.

The method for pressure-supplying the liquid material to the vaporizer 91 will be described specifically based on FIG. 16.

The pressure gas was supplied from each gas supply pipe 111, 211 through the regulator 71 and filter 73. In addition to the pressure switch 71 and check valve 75, there were provided the gas feed valve 141, 241 and pressure gage 85, 86 downstream thereof in each pressure gas line. The two pressure switches 81 provided in the respective gas supply pipes 111, 211 were for detecting a drop in the pressure of the pressure gas, and the pressure gages 85, 86 monitored the internal pressure of vessel 150, 250.

In the present example the pressure gas was set at a pressure value (5 kg/cm$^2$) higher than the internal pressure (2 kg/cm$^2$) of vessel. The gas feed valve 141, 241 in the pressure gas line was opened only upon pressurization in order to prevent the reverse diffusion of liquid material which could be a cause of contamination of line. Reflecting the results of monitor of each pressure gage, the internal pressure of vessel 150, 250 was set at a desired value throughout supply of liquid material by on/off of gas feed valve 141, 241.

In order to avoid the worst case such as a burst of vessel, 150, 250 where the internal pressure of vessel 150, 250 became over pressure due to some cause of accident, fire, or the like, there was provided the burst preventing mechanism of vessel for opening and closing the exhaust valve 149, 249, based on the monitor results of pressure gage 85, 86, to guide the liquid material of line to the vent line.

Specifically, the program was such that the exhaust valve 149, 249 was usually closed, but it would open when the internal pressure of vessel 150, 250 monitored by the pressure gage 85, 86 exceeded 3.0 kg/cm$^2$.

For protecting the vacuum pumps, the vent line 30 was provided with the harm eliminating column and the like upstream of pump. This harm eliminating column also functions to stop the reverse diffusion of oil from the vacuum pump.

The pressure gage 87, 88 was set so as to permit automatic shutoff of line when the pressure of pressure pump line was unable to be kept in a vacuum upon vacuumization and gas injection because of a trouble of the vacuum pump or the like.

With an example wherein the liquid material is supplied from the second vessel 250 after the liquid material of the first vessel 150 has been used up, the control operation of each line in a series of supply of liquid material, replacement of vessel, and so on will be described every mode using Table 3.

TABLE 3

| MODE<br>AIR VALVE | LIQUID<br>RETURN | GAS PURGE | | DETACHMENT | PRESSURIZATION | STAND-BY |
|---|---|---|---|---|---|---|
| | | VACUUMIZATION | INJECTION<br>OF GAS | | | |
| 1ST GAS FEED VALVE 141 | X | X | ○ | ○ | ○ | X |
| 1ST GAS INLET VALVE 161 | ○ | X | X | X | ○ | ○ |
| 1ST LINE SHORT VALVE 143 | ○ | X | X | ○ | X | X |
| 1ST MATERIAL ACCEPTANCE VALVE 145 | ○ | ○ | ○ | ○ | ○ | ○ |
| 1ST DISCHARGE VALVE 163 | ○ | X | X | X | ○ | ○ |
| 1ST PIPE CONNECTION VALVE 165 | X | ○ | ○ | X | X | X |
| 1ST SUPPLY VALVE 147 | X | X | X | X | X | X |
| 1ST EXHAUST VALVE 149 | X | ○ | X | X | X | X |
| PUMP EXHAUST VALVE 78 | X | X | X | X | ○ | ○ |
| 2ND GAS FEED VALVE 241 | Δ | Δ | X | X | X | Δ |
| 2ND GAS INLET VALVE 261 | ○ | ○ | ○ | ○ | ○ | ○ |
| 2ND LINE SHORT VALVE 243 | X | X | X | X | X | X |

TABLE 3-continued

| MODE<br>AIR VALVE | LIQUID<br>RETURN | GAS PURGE | | DETACHMENT | PRESSURIZATION | STAND-BY |
| --- | --- | --- | --- | --- | --- | --- |
| | | VACUUMIZATION | INJECTION<br>OF GAS | | | |
| 2ND MATERIAL AC-<br>CEPTANCE VALVE<br>245 | ○ | ○ | ○ | ○ | ○ | ○ |
| 2ND DISCHARGE<br>VALVE 263 | ○ | ○ | ○ | ○ | ○ | ○ |
| 2ND PIPE CONNEC-<br>TION VALVE<br>265 | X | X | X | X | X | X |
| 2ND SUPPLY<br>VALVE 247 | ○ | ○ | ○ | ○ | ○ | ○ |
| 2ND EXHAUST<br>VALVE 249 | X | X | X | X | X | X |

○: OPEN
X: CLOSE
Δ: INTERMITTENT OPEN

First, for replacement of vessel, the remaining liquid in the material supply line was returned into the first vessel 150 for ten seconds (liquid return). Next, vacuumization and gas injection in the pipes were carried out. The inside of the pipes was vacuumized for a time (one minute) set by timer by the vacuum pump, and thereafter the line partitioned by the on/off states of the valves shown in Table 3 was filled with nitrogen gas (for five seconds). This was repeated a number of times set by counter (100 times) (purge), and thereafter the vacant first vessel 150 was detached to change the old first vessel 150 for a new first vessel 150 (replacement of vessel).

In order to make the new first vessel 150 stand by in the ready-for-use state, vacuumization and gas injection were again carried out in the same manner as above so as to remove the air and water mixed into the line upon replacement of vessel. The process was finally ended in a vacuum state for preventing the gas from remaining in the pipes (purge). Further, in order to prevent the line in the vacuum state from being contaminated and in order to keep the first vessel 150 ready for use at any time, the vessel 150 was pressurized with nitrogen gas until the internal pressure of vessel 150 reached the set upper limit 2.2 kg/cm$^2$ of the pressure gage 85 (pressurization). Finally, for maintaining the internal pressure of first vessel 150, for keeping supply of liquid material ready at any time, and for detecting the over pressure state or anomaly of the internal pressure of vessel, the first vessel 150 was made to stand by as monitoring the internal pressure of first vessel 150 by the pressure gage 85 (standby).

As performing the above control operation, the liquid material was continuously supplied to the vaporizer 91 with replacement of vessel 150, 250, using the apparatus of the present invention.

A side surface, normal to the direction of growth, of the high-purity silica glass ingot having the diameter of 250 mm and the height of 500 mm obtained using this apparatus was processed for examination of striae and was observed to check striae by the projection method. As a result, any striae due to replacement of vessel were not detected in the silica glass ingot obtained.

It was thus confirmed that in the present apparatus there was no variation in the various conditions upon switch of vessel at all and stable supply of liquid material was done.

Since the present apparatus had the two systems of independent pressure gas lines, they were able to be used as a pressure gas line for each vessel. Namely, one was able to be used for pressurization, while the other for purge. Further, valves (not shown) were provided before and after the consumables including the regulator 71, filter 73, pump, and so on so as to make each of them interchangeable. On/off of the auxiliary connection valve 119 permitted supply of the gas for pressurization or purge to be continued without interruption upon replacement of the parts.

Further, the auxiliary exhaust valve 139 was usually closed, and the vacuum pumps 135, 235 in the vent line 30 were able to be used separately for the respective vessels 150, 250. This lengthened the lifetime of vacuum pump. The normal sequential operation of vacuum pump upon vacuumization and upon gas introduction was able to be ensured by the automatic control of on/off of the auxiliary exhaust valve 139 based on detected values of pressure gage 87, 88.

COMPARATIVE EXAMPLE 2

Using the conventional liquid material supplying apparatus shown in FIG. 1, the purge was carried out, the vessel was detached, and the purge state was examined.

The vessel of silicon tetrachloride is connected to the pressure gas line 11 and to the material supply line 21 and the valves 61, 53 are provided for the gas inlet pipe 51 and discharge pipe 53, respectively, fixed to the vessel 50 as shown in FIG. 1. Around it there are a plurality of valves set as shown in FIG. 1.

The purge was carried out using nitrogen gas as the pressure gas while letting the nitrogen gas flowing through the by-pass pipe 29 for one hour with closing the valves 61, 63 of the respective gas inlet pipe 51 and discharge pipe 53 fixed to the vessel. For examining the state of purge, the apparatus was kept to stand for one more hour after completion of purge. After that, the vessel 50 was detached at the joints 15, 25, whereupon the liquid material gushed out of the joint 25.

Therefore, the liquid material remained in the material supply line 21 even with keeping the continuous flow of nitrogen gas in the conventional liquid material supplying apparatus. It was then found that it was almost impossible to remove the liquid material remaining in the material supply line 21 and to purge it without heating to vaporize it.

EXAMPLE 3

In the liquid material supplying apparatus constructed in the structure shown in FIG. 18, the purge was carried out, the vessel was detached, and the purge state was examined.

For increasing the purge efficiency and for performing the purge so as to prevent the liquid material from remaining in the line, the interconnection pipe 55 was provided and the on-off valve 65 was provided in this interconnection pipe 55, thus enabling to form the purge line.

The vent line 30 was provided with the vacuum pump 35 in order to raise the purge efficiency and to realize a perfect purge for the portions which were unable to be purged conventionally. Since direct flow of liquid material into the vacuum pump 35 will degrade and disable the vacuum pump 35, the harm eliminating column 33 was provided upstream of the vacuum pump 35. If a large amount of liquid material flowed into this harm eliminating column 33, it would generate heat because of a rapid reaction, which would invalidate the harm eliminating performance. Thus, the trap 32 of liquid material was provided upstream of the column.

In order to prevent a risk of burst of vessel when the internal pressure of vessel 50 increased abnormally because of heating of vessel due to fire or the like, or because of anomaly of the pressure gas line, the vessel was provided with the rupture disc 57 shown in FIG. 30 as a burst preventing mechanism. The rupture disc 57 was made of SUS316 and the cutter 58 was set above the rupture disc 57. The structure was such that when the pressure inside the vessel increased for some reason, this rupture disc 57 was deformed to be cut by the cutter 58 and the pressure inside the vessel 57 was freed to the atmosphere. Then the safety valve 59 was set above this rupture disc 57 and the safety valve 59 was arranged to free the pressure inside the vessel 50 to the atmosphere when the rupture disc 57 burst and when the pressure inside the vessel 50 was exerted on the safety valve 59. Further, the safety valve 59 was constructed to be closed when the pressure inside the vessel 50 became approximately 2 or less $kg/cm^2$, thereby preventing the liquid material in the vessel 50 from being emitted to the atmosphere.

On/off of the valves in the following purge operation are shown in FIG. 19 (timing chart) and Table 2.

The pressure gas was also used as the purge gas. Since the direct flow of the liquid material remaining in the material line connection pipe 23 through the purge line into the vent line 30 would promote degradation of the vent line 30, the liquid material inside the material line connection pipe 23 being the purge line was returned into the vessel 50 before the purge (material return). This material return was continued for about ten seconds as monitoring the pressure in the vessel on the pressure gage 85.

The purge using the vacuum pump 35 was carried out by repeating the operation of volatilizing and sucking the liquid material in the purge line by the vacuum pump 35 for one minute and thereafter replacing the inside of the purge line with the pressure gas of 5 $kg/cm^2$ (which will be referred to hereinafter as vacuumization and gas injection) 100 times. After that, the vessel 50 was removed from the joints 15, 25, and no liquid material was recognized at all in the material line connection pipe 23 and discharge pipe 53. Then acidity was checked with pH test paper, whereupon no color change was observed at all. This confirmed that the perfect purge was made.

In order to check contamination due to the liquid material in the vacuum pump 35 of the vent line 30, acidity of oil was checked with pH test paper, but no color change was recognized.

Further, with gradually decreasing the number of repetitions of vacuumization and gas injection, it was found that ten repetitions of vacuumization and gas injection were sufficient for the perfect purge of purge line. Even when twenty repetitions of vacuumization and gas injection were employed for safety, the perfect purge was found to be carried out in a half or less of the time needed for the conventional incomplete purge.

The valve control for repeating the vacuumization and gas injection was carried out by switching on/off of valve automatically by the control unit 90 incorporating the computer.

EXAMPLE 4

In the liquid material supplying apparatus of FIG. 26, the purge was carried out, the vessel was removed, and the purge state was examined.

The purge line includes a downstream portion of the gas feed valve 41 in the gas supply pipe 11 and the branched line upstream of the supply valve 47 in the material line connection pipe 23, and the exhaust pipe 31 branches out from near the material line joint 25.

As shown in FIG. 26, the interconnection pipe 55 is provided similarly as in Example 3, for increasing the purge rate and for preventing the material line from remaining in the line.

In the present example the gas was made to flow through the two paths. One is purge 1 with the purge line through the interconnection pipe 55 (FIG. 27). The other is purge 2 with the purge line through the by-pass pipe 29 (FIG. 28). The purge was carried out using these two paths so that the pressure gas flowed to push the liquid material remaining in the material line connection pipe 23 and in the discharge pipe 53.

In order to prevent a risk of burst of vessel when the pressure inside the vessel 50 increased abnormally because of heating of vessel due to fire or the like, or because of anomaly occurring in the gas supply pipe 11 or the like, the rupture disc 53 shown in FIG. 30 was provided. The rupture disc 57 was of SUS316 and the cutter 58 was set above the rupture disc 57. The structure was such that when the pressure inside the vessel 50 increased for some reason, the rupture disc 57 was deformed to be cut by the cutter 58, thereby releasing the pressure in the vessel 50 to the atmosphere.

On/off of the valves in each operation are shown in Table 4 below.

TABLE 4

| MODE | PURGE | |
|---|---|---|
| VALVE | PURGE 1 | PURGE 2 |
| GAS FEED VALVE 41 | ○ | X |
| GAS INLET VALVE 61 | X | X |
| LINE SHORT VALVE 43 | X | ○ |
| MATERIAL ACCEPTANCE VALVE 45 | X | ○ |
| DISCHARGE VALVE 63 | X | X |
| PIPE CONNECTION VALVE 65 | ○ | X |
| SUPPLY VALVE 47 | X | X |
| ELIMINATION VALVE 49 | ○ | ○ |

This purge was carried out using nitrogen gas as the pressure gas while letting nitrogen gas continuously flowing for one hour by switching on/off of the line short valve 43 and pipe connection valve 65. To examine the state of purge, the system was made to stand for one hour after completion of purge.

After that, the vessel 50 was removed from the joints 15, 25, and it was recognized that there remained no liquid material in the line. However, when the pH test paper was put near the joint, change of color to red was recognized. As described, the purge was able to be effected to the extent that no liquid material was observed visually.

COMPARATIVE EXAMPLE 3

Using the conventional liquid material supplying apparatus shown in FIG. 1, synthesis of silica glass was conducted according to the valve on/off operation shown in Table 5 below.

TABLE 5

| MODE VALVE | PURGE | REPLACEMENT OF VESSEL | MATERIAL SUPPLY |
|---|---|---|---|
| 41 | ○ | ○ | ○ |
| 61 | X | X | ○ |
| 43 | ○ | ○ | X |
| 45 | ○ | X | ○ |
| 63 | X | X | ○ |
| 47 | X | X | ○ |
| 49 | ○ | X | X |

The vessel 50 of silicon tetrachloride has the gas inlet pipe and discharge pipe as shown in FIG. 1, each provided with the valve 61, 63. Around it there was provided the valve system as shown in FIG. 1, and the on/off operation of each valve was carried out as shown in Table 5.

Synthesis of silica glass was carried out by supplying nitrogen gas as the pressure gas for pressure-supplying the liquid material of silicon tetrachloride stored in the vessel to the vaporizer and as the purge gas. The internal pressure of vessel and the pressure of the pressure gas line were set to 1.5 kg/cm² (with no pressure difference).

After continuation of use for two weeks, each valve was closed, the entrance side of valve 41 was detached, and the pH test paper was put near it. It showed color change to red, which confirmed that the reverse diffusion of silicon tetrachloride did occur.

EXAMPLE 5

In the apparatus of the present invention shown in FIG. 18, the valves were air valves with high reliability and each operation was automatically carried out by a sequencer program stored in the control unit 90.

On/off of the valves in each operation are shown in Table 6 below.

TABLE 6

| MODE VALVE | PURGE | REPLACEMENT OF VESSEL | MATERIAL SUPPLY | PREVENTION OF BURST |
|---|---|---|---|---|
| 41 | ○ | ○ | Δ | X |
| 61 | X | X | ○ | ○ |
| 43 | X | ○ | X | X |
| 45 | ○ | ○ | ○ | ○ |
| 63 | X | X | ○ | X |
| 65 | ○ | X | X | ○ |
| 47 | X | X | ○ | X |
| 49 | ○ | X | X | ○ |

Selection of each mode of purge, material supply, replacement of vessel, or the like by the control unit 90 obviated a need for complex valve operation. This enabled to prevent the operational errors.

Synthesis of silica glass was carried out as supplying the liquid material of silicon tetrachloride stored in the vessel with nitrogen gas as the pressure gas for pressure-supplying it to the vaporizer and as the purge gas. Supply of the liquid material was conducted under such conditions that the internal pressure of vessel was set at 2 kg/cm² and that the pressure gas was supplied as controlled at 5 kg/cm² by regulator 71. The flow-rate meter of the pressure gas was a metal seal type mass flow meter 82 was able to indicate a minus value for a flow rate of backward flow from the vessel and which had no leak to the outside.

On/off of valve 41 was carried out in such a manner that the contacts became active by the pressure sensor when the internal pressure of vessel became lower than the set lower limit pressure 2.0 kg/cm², thereby pressurizing the inside of vessel 50. The program was arranged so that the pressurization was stopped when the pressure in the vessel 50 became higher than the set upper limit pressure 2.2 kg/cm² (FIG. 29), which was able to completely shut the reverse diffusion of the liquid material component vaporized from the vessel into the pipe.

The program for the burst preventing mechanism was such that it automatically went into the burst preventing mode when the internal pressure of vessel 50 monitored by the pressure gage 85 exceeded 3.0 kg/cm² and that it returned to the mode before change when the internal pressure became lower than 2.0 kg/cm².

After continuation of use for two weeks, each valve was closed, the entrance side of valve 41 was detached, and the pH test paper was put near it. It was confirmed that there was no color change and no reverse diffusion of silicon tetrachloride.

EXAMPLE 6

After the supply of liquid material (silicon tetrachloride) was continued for two weeks in the same manner as in Example 5 except for use of helium gas as the pressure gas, each valve was closed, the entrance side of valve 41 was removed, and the pH test paper was put near it, which confirmed that there was no color change and no reverse diffusion of silicon tetrachloride. In the present example, the valve provided for the bomb was a manual valve and the automatic burst preventing mechanism was thus unable to be provided. Thus, the apparatus was constructed in the structure to output an alarm when the pressure in the vessel exceeded 3 kg/cm².

INDUSTRIAL APPLICATION

Since the supplying apparatus and supplying method of liquid material according to the present invention permits stable supply of the liquid material to the vaporizer without interruption, no variation occurs in the amount of generation or the like of gas in the vaporizer, so that products can be obtained stably. Especially, the proximity arrangement of vessels can prevent the temperature change or the like of the liquid material supplied to the vaporizer upon switch of used vessel, which can prevent the variation in the amount of gas generated in the vaporizer more certainly.

Also, the supplying apparatus and supplying method of liquid material according to the present invention enables to perform a sure purge within a short time upon replacement of vessel and to perform replacement of vessel quickly and safely. In supplying the liquid material from a new vessel to the vaporizer after replacement of vessel, impurities such as air or purge gas can be prevented from remaining in the material supply line, whereby such impurities can be prevented well from being supplied to the vaporizer.

Further, the supplying apparatus and supplying method of liquid material according to the present invention can sufficiently prevent the vaporized liquid material from reversely flowing or reversely diffusing into the pressure gas line and from corroding or contaminating the pressure gas line, thereby enabling a higher-purity material to be supplied to the vaporizer.

What is claimed is:

1. A liquid material supplying method for supplying a liquid material from a vessel to a vaporizer by feeding a pressure gas from a pressure gas supply to said vessel, using said liquid material supplying apparatus, said method comprising:

a step of, when the liquid material in said vessel becomes smaller than a predetermined amount, stopping supply from said vessel, a step of changing the inside of said material line connection pipe, a portion of said discharge pipe, said gas line connection pipe, and a portion of said gas inlet pipe connected to said vessel into a reduced pressure state by said vacuum pump, a step of introducing the pressure gas into the inside of said material line connection pipe, the portion of said discharge pipe, said gas line connection pipe, and the portion of said gas inlet pipe connected to said vessel to change the inside into a pressurized state, a step for replacing said vessel with a new vessel filled with the liquid material, and a step of starting supply from said new vessel.

2. The method according to claim 1, further comprising:

a step of changing the inside of said material line connection pipe, the portion of said discharge pipe, said gas line connection pipe, and the portion of said gas inlet pipe connected to said new vessel into the reduced pressure state by said vacuum pump, a step of introducing the pressure gas into the inside of said material line connection pipe, the portion of said discharge pipe, said gas line connection pipe, and the portion of said gas inlet pipe connected to said new vessel to change the inside into the pressurized state, and a step of changing the inside of said material line connection pipe and the portion of said discharge pipe connected to said new vessel into the reduced pressure state by said vacuum pump and thereafter starting supply from said new vessel.

3. The method according to claim 1, further comprising a step of returning the liquid material remaining inside said material line connection pipe and said discharge pipe connected to said vessel, from which supply is stopped, into said vessel.

4. A liquid material supplying method for supplying a liquid material from a vessel to a vaporizer by feeding a pressure gas from a pressure gas supply to said vessel, using said liquid material supplying apparatus according to claim 3, said method comprising:

a step of, when the liquid material in said vessel becomes smaller than a predetermined amount, stopping supply from the vessel, a step of letting the pressure gas flow through said gas line connection pipe, a portion of said gas inlet pipe, a portion of said discharge pipe, and said material line connection pipe connected to said vessel, to said exhaust pipe, a step of replacing said vessel with a new vessel filled with the liquid material, and a step of starting supply from said new vessel.

5. A liquid material supplying method for supplying a liquid material from either one of first and second vessels to a vaporizer by feeding a pressure gas from a pressure gas supply to the vessel, using said liquid material supplying apparatus according to claim 3, said method comprising:

a step of, when the liquid material in said vessel becomes smaller than a predetermined amount, stopping supply from said vessel and starting supply from the other vessel, a step of changing the inside of said material line connection pipe and a portion of said discharge pipe connected to said vessel, from which supply is stopped, into a reduced pressure state by said vacuum pump, a step of introducing the pressure gas into the inside of said material line connection pipe and the portion of said discharge pipe connected to said vessel, from which supply is stopped, to change the inside into a pressurized state, a step of replacing said vessel, from which supply is stopped, with a new vessel filled with the liquid material, a step of changing the inside of said material line connection pipe and the portion of said discharge pipe connected to said new vessel into the reduced pressure state by said vacuum pump, a step of introducing the pressure gas into the inside of said material line connection pipe and the portion of said discharge pipe connected to said new vessel to change the inside into the pressurized state, and a step of changing the inside of said material line connection pipe and the portion of said discharge pipe connected to said new vessel into the reduced pressure state by said vacuum pump and thereafter charging the liquid material into the inside of said material line connection pipe and discharge pipe.

6. The method according to claim 5, further comprising a step of returning the liquid material remaining inside said material line connection pipe and said discharge pipe connected to said vessel, from which supply is stopped, into said vessel.

7. A liquid material supplying apparatus comprising:

a first vessel having a first gas inlet pipe provided with a first gas inlet valve, and a first discharge pipe provided with a first discharge valve, said first vessel containing a liquid material;

a second vessel having a second gas inlet pipe provided with a second gas inlet valve, and a second discharge pipe provided with a second discharge valve, said second vessel containing the liquid material; and a permanent line comprising a first gas line connection pipe having a joint at one end, said joint being detachably connected to said first gas inlet pipe, and a first gas feed valve at the other end, a second gas line connection pipe having a joint at one end, said joint being detachably connected to said second gas inlet pipe, and a second gas feed valve at the other end, a gas supply pipe one end of which branches into first and second ends to be connected to said first and second gas feed valves, respectively, and the other end of which is to be connected to a first pressure gas supply, a first material line connection pipe having a joint at one end, said joint being detachably connected to said first discharge pipe, and a first supply valve at the other end, a second material line connection pipe having a joint at one end, said joint being detachably connected to said second discharge pipe, and a second supply valve at the other end, a material supply pipe one end of which branches into first and second ends to be connected to said first and second supply valves, respectively, and the other end of which is to be connected to a vaporizer, a first by-pass pipe having a first line short valve and enabling to make said gas supply pipe communicate with said first material line connection pipe, and a second by-pass pipe having a second line short valve and enabling to make said gas supply pipe communicate with said second material line connection pipe.

8. The apparatus according to claim 7, wherein said first vessel further comprises a first interconnection pipe having a first pipe connection valve and enabling to make said first gas inlet pipe communicate with said first discharge pipe, and wherein said second vessel further comprises a second interconnection pipe having a second pipe connection valve and enabling to make said second gas inlet pipe communicate with said second discharge pipe.

9. The apparatus according to claim 8, further comprising a vent line, said vent line having a liquid trap, a harm eliminating column, a first vacuum pump, and an exhaust pipe one end of which branches into first and second ends respectively connected to said first and second material line connection pipes or to said first and second gas line connection pipes and having first and second elimination valves and the other end of which is connected via said liquid trap and harm eliminating column to said first vacuum pump.

10. The apparatus according to claim 9, further comprising a control unit electrically connected with said each valve and said vacuum pump;

wherein said control unit controls said each valve and said vacuum pump in such a manner as to:

when the liquid material in said vessel becomes smaller than a predetermined amount, stop supply from said vessel and start supply from the other vessel, return the liquid material remaining inside said material line connection pipe and said discharge pipe connected to said vessel of supply stop into said vessel, change the inside of said material line connection pipe, a portion of said discharge pipe, said gas line connection pipe, and a portion of said gas inlet pipe connected to said vessel of supply stop into a reduced pressure state by said vacuum pump, introduce a pressure gas into the inside of said material line connection pipe, the portion of said discharge pipe, said gas line connection pipe, and the portion of said gas inlet pipe connected to said vessel of supply stop to change the inside into a pressurized state, after said vessel of supply stop has been replaced by a new vessel filled with the liquid material, change the inside of said material line connection pipe, the portion of said discharge pipe, said gas line connection pipe, and the port-ion of said gas inlet pipe connected to said new vessel into the reduced pressure state by said vacuum pump, introduce the pressure gas into the inside of said material line connection pipe, the portion of said discharge pipe, said gas line connection pipe, and the portion of said gas inlet pipe connected to said new vessel to change the inside into the pressurized state, and change the inside of said material line connection pipe and the portion of said discharge pipe connected to said new vessel into the reduced pressure state by said vacuum pump and thereafter charge the liquid material into the inside of said material line connection pipe and discharge pipe.

11. The apparatus according to claim 9, further comprising first and second pressure gages for measuring a pressure in said first and second vessels, respectively, and a control unit electrically connected to said first and second pressure gages and to said first and second elimination valves;

wherein said control unit controls said elimination valves so that gas in the vessel is emitted to said vent line when said pressure in the vessel exceeds a predetermined value.

12. The apparatus according to claim 9, wherein said vent line further comprises a second vacuum pump and wherein the other end of said exhaust pipe branches into a first end to be connected to the first vacuum pump and a second end to be connected to the second vacuum pump.

13. A liquid material supplying method for supplying a liquid material from either one of first and second vessels to a vaporizer by feeding a pressure gas from a pressure gas supply to the vessel, using said liquid material supplying apparatus according to claim 9, said method comprising:

a step of, when the liquid material in said vessel becomes smaller than a predetermined amount, stopping supply from said vessel and starting supply from the other vessel, a step of changing the inside of said material line connection pipe, a portion of said discharge pipe, said gas line connection pipe, and a portion of said gas inlet pipe connected to said vessel, from which supply is stopped, into a reduced pressure state by said vacuum pump, a step of introducing the pressure gas into the inside of said material line connection pipe, the portion of said discharge pipe, said gas line connection pipe, and the portion of said gas inlet pipe connected to said vessel, from which supply is stopped, to change the inside into a pressurized state, a step of replacing said vessel of supply stop with a new vessel filled with the liquid material, a step of changing the inside of said material line connection pipe, the portion of said discharge pipe, said gas line connection pipe, and the portion of said gas inlet pipe connected to said new vessel into the reduced pressure state by said vacuum pump, a step of introducing the pressure gas into the inside of said material line connection pipe, the portion of said discharge pipe, said gas line connection pipe, and the portion of said gas inlet pipe connected to said new vessel to change the inside into the pressurized state, and a step of changing the inside of said material line connection pipe and the portion of said discharge pipe connected to said new vessel into the reduced pressure state by said vacuum pump and thereafter charging the liquid material into the inside of said material line connection pipe and discharge pipe.

14. The method according to claim 13, further comprising a step of returning the liquid material remaining inside said material line connection pipe and said discharge pipe connected to said vessel, from which supply is stopped, into said vessel.

15. The apparatus according to claim 7, further comprising a vent line, said vent line having a liquid trap, a harm eliminating column, a vacuum pump, and an exhaust pipe one end of which branches into first and second ends connected to said first and second material line connection pipes, respectively, and having first and second elimination valves, respectively, and the other end of which is connected via said liquid trap and harm eliminating column to said vacuum pump.

16. The apparatus according to claim 7, further comprising-a burst preventing device for emitting gas in the vessel to the outside when a pressure in the vessel exceeds a predetermined value.

17. The apparatus according to claim 7, wherein the other end of said gas supply pipe branches into a first end to be connected to the first pressure gas supply and a second end to be connected to a second pressure gas supply.

18. The apparatus according to claim 15, further comprising a control unit electrically connected with said each valve and said vacuum pump;

wherein said control unit controls said each valve and said vacuum pump in such a manner as to:

when the liquid material in said vessel becomes smaller than a predetermined amount, stop supply from said vessel and start supply from the other vessel, return the liquid material remaining inside said material line connection pipe and said discharge pipe connected to said vessel of supply stop into said vessel, change the inside of said material line connection pipe and a portion of said discharge pipe connected to said vessel of supply stop into a reduced pressure state by said vacuum pump, introduce a pressure gas into the inside of said material line connection pipe and the portion of said discharge pipe connected to said vessel of supply stop to change the inside into a pressurized state, after said vessel of supply stop has been replaced by a new vessel filled with the liquid material, change the inside of said material line connection pipe and the portion of said discharge pipe connected to said new vessel into the reduced pressure state by said vacuum pump, introduce the pressure gas into the inside of said material line connection pipe and the portion of said discharge pipe connected to said new vessel to change the inside into the pressurized state, and change the inside of said material line connection pipe and the portion of said discharge pipe connected to said new vessel into the reduced pressure is state by said vacuum pump and thereafter charge the liquid material into the inside of the material line connection pipe and discharge pipe.

19. The apparatus according to claim 7, further comprising first and second pressure gages for measuring a pressure in said first and second vessels, respectively, a regulator for regulating the pressure of said pressure gas, and a control unit electrically connected to said first and second gas feed valves, said first and second pressure gages, and said regulator;

wherein said control unit controls said valves and regulator so that said pressure in the vessel is in a predetermined range, by intermittently supplying said pressure gas under a pressure 0.5 or more kg/cm$^2$ higher than said pressure in the vessel into said vessel.

20. A liquid material supplying apparatus comprising:

a vessel having a gas inlet pipe provided with a gas inlet valve, a discharge pipe provided with a discharge valve, and an interconnection pipe provided with a pipe connection valve that enables said gas inlet pipe to communicate with said discharge pipe, said vessel containing a liquid material; and a permanent line comprising a gas line connection pipe having a joint at one end, said joint being detachably connected to said gas inlet pipe and a gas feed valve at the other end, a gas supply pipe connected at one end to said gas feed valve and at the other end to a pressure gas supply, a material line connection pipe having a joint at one end, said joint being detachably connected to said discharge pipe, and a supply valve at the other end, a material supply pipe connected at one end to said supply valve and at the other end to a vaporizer, and a by-pass pipe having a line short valve that enables said gas supply pipe to communicate with said material line connection pipe.

21. The apparatus according to claim 20, further comprising a vent line, said vent line comprising a liquid trap, a harm eliminating column, a vacuum pump, and an exhaust pipe one end of which is connected to said material line connection pipe and the other end of which is connected via an elimination valve and via said liquid trap and harm eliminating column to said vacuum pump.

22. The apparatus according to claim 21, further comprising a control unit electrically connected to said each valve and said vacuum pump;

wherein said control unit controls said each valve and said vacuum pump in such a manner as to:

when the liquid material-in said vessel becomes smaller than a predetermined amount, stop supply from said vessel, return the liquid material remaining inside said material line connection pipe and said discharge pipe connected to said vessel of supply stop into the vessel, change the inside of said material line connection pipe, a portion of said discharge pipe, said gas line connection pipe, and a portion of said gas inlet pipe connected to said vessel into a reduced pressure state by said vacuum pump, introduce a pressure gas into the inside of said material line connection pipe, the portion of said discharge pipe, said gas line connection pipe, and the portion of said gas inlet pipe connected to said vessel to change the inside into a pressurized state, after said vessel has been replaced by a new vessel filled with the liquid material, change the inside of said material line connection pipe, the portion of said discharge pipe, said gas line connection pipe, and the portion of said gas inlet pipe connected to said new vessel into the reduced pressure state by said vacuum pump, introduce the pressure gas into the inside of said material line connection pipe, the portion of said discharge pipe, said gas line connection pipe, and the portion of said gas inlet pipe connected to said new vessel to change the inside into the pressurized state, and change the inside of said material line connection pipe and the portion of said discharge pipe connected to said new vessel into the reduced pressure state by said vacuum pump and thereafter start supply from said new vessel.

23. The apparatus according to claim 21, further comprising a pressure gage for measuring a pressure in said vessel and a control unit electrically connected to said pressure gage and said elimination valve;

wherein said control unit controls said elimination valve so that gas in the vessel is emitted to said vent line when the pressure in said vessel exceeds a predetermined value.

24. The apparatus according to claim 20, further comprising a burst preventing device for emitting gas in the vessel to the outside when a pressure in the vessel exceeds a predetermined value.

25. The apparatus according to claim 20, further comprising a pressure gage for measuring a pressure in said vessel, a regulator for regulating a pressure of said pressure gas, and a control unit electrically connected to said gas feed valve, said pressure gage, and said regulator; wherein said control unit controls said valves and regulator so that said pressure in the vessel is in a predetermined range, by intermittently supplying said pressure gas under a pressure 0.5 or more $kg/cm^2$ higher than said pressure in the vessel into said vessel.

* * * * *